United States Patent
Woodgate et al.

(10) Patent No.: US 7,058,252 B2
(45) Date of Patent: Jun. 6, 2006

(54) OPTICAL SWITCHING APPARATUS

(75) Inventors: Graham John Woodgate, Oxfordshire (GB); Jonathan Harrold, Warwickshire (GB)

(73) Assignee: Ocuity Limited, Oxford (GB)

( * ) Notice: Subject to any disclaimer, the term of this patent is extended or adjusted under 35 U.S.C. 154(b) by 196 days.

(21) Appl. No.: 10/485,357

(22) PCT Filed: Jul. 31, 2002

(86) PCT No.: PCT/GB02/03513

§ 371 (c)(1),
(2), (4) Date: Feb. 27, 2004

(87) PCT Pub. No.: WO03/015424

PCT Pub. Date: Feb. 20, 2003

(65) Prior Publication Data

US 2004/0240777 A1 Dec. 2, 2004

(30) Foreign Application Priority Data

Aug. 6, 2001 (GB) ................................. 0119176.6

(51) Int. Cl.
*G02B 6/26* (2006.01)
*G02B 27/22* (2006.01)
*G02F 1/133* (2006.01)
*G03B 21/00* (2006.01)

(52) U.S. Cl. ............................ 385/16; 385/15; 385/11; 385/14; 385/129; 385/130; 385/33; 385/901; 349/17; 349/18; 349/41; 349/57; 349/62; 359/464; 359/465; 359/15; 359/23; 353/7; 353/8

(58) Field of Classification Search .................. 385/15, 385/16, 17, 1, 2, 3, 18, 11, 27, 28, 14, 129, 385/130, 131, 33, 901; 349/17, 18, 41, 57, 349/62; 359/464, 465, 494, 15, 497, 23; 353/7, 8

See application file for complete search history.

(56) References Cited

U.S. PATENT DOCUMENTS 2,788,707 A    4/1957  Land ........................ 350/405

(Continued)

FOREIGN PATENT DOCUMENTS

GB         2 171 535         8/1986 ............. 385/147 X (Continued)

OTHER PUBLICATIONS

Commander, LG, et al. M, 1.7 Electrode designs for tunable microlenses, Microlens Arrays, EOS Topical Meeting, National Physical Laboratory, 1997, pp. 48-53.

(Continued)

*Primary Examiner*—Brian M. Healy
(74) *Attorney, Agent, or Firm*—Foley & Lardner LLP

(57) ABSTRACT

A light direction switching apparatus and method is described. The light direction switching apparatus comprises a passive birefringent lens (138), e.g. a birefringent lenticular screen, and a switchable polariser (146). By switching the polariser (146), different directional distributions of output light are provided. The light direction switching apparatus may be used with or incorporated in a display device, such as a liquid crystal display device, to provide a display device switchable between a two dimensional mode and an autostereoscopic three dimensional mode, or to provide a multi-user display device where different images are displayed to different viewers. The light direction switching apparatus may also be used to provide switchable brightness enhancement of reflective or transflective display devices. The light direction switching apparatus may also be used to provide a fiber-optic switching apparatus. The switchable polariser may be mechanically switchable or electrically switchable.

126 Claims, 36 Drawing Sheets

U.S. PATENT DOCUMENTS

| | | | |
|---|---|---|---|
| 3,520,592 | A | 7/1970 | Leib et al. ............... 350/379 |
| 3,536,921 | A | 10/1970 | Caulfield ............... 455/611 |
| 4,717,949 | A | 1/1988 | Eichenlaub ............... 358/3 |
| 4,959,641 | A | 9/1990 | Bass et al. ............... 340/700 |
| 5,175,651 | A | 12/1992 | Marron et al. ............... 359/721 |
| 5,493,427 | A | 2/1996 | Nomura et al. ............... 359/40 |
| 5,500,765 | A | 3/1996 | Eichenlaub ............... 359/463 |
| 5,592,332 | A | 1/1997 | Nishio et al. ............... 359/455 |
| 5,691,788 | A | 11/1997 | Kim ............... 359/40 |
| 5,956,001 | A | 9/1999 | Sumida et al. ............... 345/55 |
| 6,046,787 | A | 4/2000 | Nishiguchi ............... 349/129 |
| 6,069,650 | A | 5/2000 | Battersby ............... 348/59 |
| 6,116,739 | A | 9/2000 | Ishihara et al. ............... 353/31 |
| 6,157,424 | A | 12/2000 | Eichenlaub ............... 349/74 |
| 6,304,381 | B1* | 10/2001 | Hayashi ............... 359/495 |
| 2001/0002165 | A1 | 5/2001 | Shinohara et al. ............... 362/31 |
| 2004/0196253 | A1* | 10/2004 | Eichenlaub ............... 345/102 |
| 2004/0222945 | A1* | 11/2004 | Taira et al. ............... 345/6 |
| 2004/0240777 | A1* | 12/2004 | Woodgate et al. ............... 385/16 |
| 2005/0111100 | A1* | 5/2005 | Mather et al. ............... 359/464 |

FOREIGN PATENT DOCUMENTS

| | | | |
|---|---|---|---|
| JP | 2171535 | 1/1986 | ............ 385/147 X |
| JP | 03-292092 | 4/1990 | ............ 385/147 X |
| JP | 11-271744 | 7/1997 | ............ 385/147 X |
| JP | 0785457 | 7/1997 | ............ 385/147 X |
| JP | 0829743 | 3/1998 | ............ 385/147 X |
| JP | 0829744 | 3/1998 | ............ 385/147 X |
| JP | 2354899 | 10/1999 | ............ 385/147 X |
| JP | 1118883 | 7/2001 | ............ 385/147 X |
| JP | 0721131 | 4/2003 | ............ 385/147 X |
| JP | 0833183 | 6/2004 | ............ 385/147 X |
| JP | 0860728 | 6/2004 | ............ 385/147 X |
| WO | WO 98/21620 | 5/1998 | ............ 385/147 X |

OTHER PUBLICATIONS

Eichenlaub, Jesse B., Developments in Autostereoscopic Technology at Dimension Technologies Inc., SPIE, Stereoscopic Displays and Applications IV, 1993, pp. 177-186, vol. 1915.

Hamada, H., et al., P3.6-1 A New High Definition Microlens Array Built in p-SI TFT-LCD Panel, ASIA Display, 1995, pp. 887-890.

Hamagishi, G., et al., 32.1: Invited Paper : A Display System with 2-D/3-D Compatibility, SID, 1998.

History of Three-Dimensional Imaging Techniques, pp. 12, 14, 20.

Huang, Yi-Pai, et al., 26.3: Multidirectional Asymmetrical Microlens-Array Light Control Firms for High Performance Reflective Liquid Crystal Displays, SID 02 Digest, 2002, pp. 1-4.

ITOH, Yasuhisa, et al., 16.2: Influence of rough surface upon optical characteristics of reflective LCD with a polarizer, SID, 1998.

Leuzinger, Andrew, Liquid-crystal technology implementation for optical switching, ICD - Fiber Optics, Electronics Design Magazine, 2001, pp. 1-4.

Nakayama, E., et al., 2-D/3-D Compatible LC Display without Special Glasses, Proceedings of Third International Displays Workshops, 1996, pp. 453-456, vol. 2.

Pancharatnam, S., Archromatic Combinations of Birefringent Plates, Part 1. An Achromatic Circular Polarizer, Memoir No. 71 of the Raman Research Institute, Bangalore, 1955, pp. 130-136.

Pitcher Graham, Making a display - A Dera spin off is creating lightweight, low power displays, New Electronics, 2000, pp. 71-72.

Suyama, S., et al., 17:4:3-D Display System with Dual-Frequency Liquid-Crystal Varifocal Lens, SID 97 Digest, 1997, pp. 273-276.

Traut, S., Holographically recorded gratings on microienses for a minaturized spectrometer array, Optical Engineering, 2000, pp. 290-298, vol. 39, No. 1.

Trout, T. John, 15.3: Invited Paper: Volume Holographic Components for Display Applications, SID 00 Digest, 2000, pp. 202-205.

Turkatte, Cindana A., et al., Passive Component Technologies for WDM Networks, Fibre Optic Product News, 2000.

Valliath, G. T., Design of Hologram for Brightness Enhancement in Color LCDs, SID, 1998.

Woodgate, Graham J., et al., Flat panel autostereoscopic displays - characterisation and enhancement, SPIE, Steroscopic Displays and Virtual Reality Systems VIII, 2000, pp. 153-164, vol. 3957.

* cited by examiner

OPTICAL SWITCHING APPARATUS

This application is the U.S. national phase of international application PCT/GB02/03513 filed Jul. 31, 2002 which designated the U.S., and which in turn claims the benefit and priority of GB 0119176.6, the entire contents are both of which are hereby incorporated by reference.

A first aspect of the present invention relates to optical switching processes and apparatus. Such an apparatus may be used in a switchable two dimensional (2D)/three dimensional (3D) autostereoscopic display apparatus; for a switchable high brightness reflective display system; for a multi-user display system; for a directional lighting system or for an optical fibre signal switching system. Such systems may be used in computer monitors, telecommunications handsets, digital cameras, laptop and desktop computers, games apparatuses, automotive and other mobile display applications as well as telecommunications switching applications.

A second aspect of the present invention relates to a reflective and transflective display apparatus. Such an apparatus may be used in a high brightness reflective display system. Such a system may be used in computer monitors, telecommunications handsets, digital cameras, laptop and desktop computers, games apparatuses, automotive and other mobile display applications as well as telecommunications switching applications.

3D Displays

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28' to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43 The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width. If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4a shows the ideal viewing windows while FIG. 4b is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

Parallax Barrier Displays

One type of well known flat panel autostereoscopic display comprises a backlight, an array of electronically adjustable pixels (known as a spatial light modulator, SLM) arranged in columns and rows and a parallax barrier attached to the front of the display as illustrated in plan view in FIG. 5.

A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,73, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82 after which is placed a parallax barrier 84 and a parallax barrier substrate 86. The parallax barrier 84 comprises an array of vertically extended transmissive regions separated by vertically extended opaque regions and serves to direct light from alternate pixel columns 69,71,73, 75 to the right eye as shown by the ray 88 for light from pixel 69 and from the intermediate columns 68,70,72,74 to the left eye as shown by the ray 90 (this overall light direction pattern forming another example of a directional distribution of light). The observer sees the light from the underlying pixel illuminating the aperture of the barrier, 92.

In this document, an SLM includes both 'light valve' devices such as liquid crystal displays and emissive devices such as electroluminescent displays and LED displays.

The pixels of the display are arranged as rows and columns separated by gaps, (generally defined by the black mask in a liquid crystal display, LCD) with the parallax barrier being an array of vertically extended slits of pitch close to twice the pitch of the pixel columns. The parallax barrier limits the range of angles from which light from each pixel column can be seen, thus creating the viewing windows at a region in front of the display. The angles of the output cone from the display are determined by the width and shape of the pixel aperture and the alignment and aberrations of the parallax barrier.

In order to steer the light from each pixel to the viewing window, the pitch of the parallax barrier is slightly smaller than twice the pitch of the pixel array. This condition is known as 'viewpoint correction'. In such a display, the resolution of each of the stereo pair images is half the horizontal resolution of the base LCD, and two views are created.

Thus, the light from the odd columns of pixels 68,70,72, 74 can be seen from the left viewing window, and the light from the even columns of pixels 69,71,73,75 can be seen from the right viewing window. If the left eye image data is placed on the odd columns of the display and the right eye image data on the even columns then the observer in the correct 'orthoscopic' position should fuse the two images to see an autostereoscopic 3D image across the whole of the display.

There will be light leakage between the two views such that some of the left eye view will be seen by the right eye and vice versa. This leakage is termed image cross-talk. Cross talk is an important mechanism for generating visual strain when viewing 3D displays, and its control is a major driver in 3D display development. For flat panel autostereoscopic displays (in particular those based on LCD technology), the limitation to window performance is generally determined by the shape and aperture ratio of the pixel and the quality of the optical element.

In a parallax barrier type display, the columns directly under the slits are imaged to a first pair of windows in the zeroeth lobe of the display. The adjacent pixel columns are also imaged to viewing windows, in +1 and −1 lobes of the display. Thus as can be seen in FIG. 3, if the user moves laterally outside the orthoscopic zone then light from the incorrect image will be sent to each eye. When the right eye sees the left eye view and vice versa, the image is termed 'pseudoscopic', compared to the correct orthoscopic condition.

In order to increase the lateral viewing freedom of the display, more than two pixel columns can be placed under each slit of the barrier. For example, four columns will create four windows in which the view is changed for each window. Such a display will give a 'look-around' appearance as the observer moves. The longitudinal freedom is also increased by such a method. However, in this case, the resolution of the display is limited to one quarter of the resolution of the base panel.

Parallax barriers rely on blocking the light from regions of the display and therefore reduce the brightness and device efficiency, generally to approximately 20–40% of the original display brightness.

Parallax barriers are not readily removed and replaced due to the requirements of sub-pixel alignment tolerances of the barrier with respect to the pixel structure of the display in order to optimise the viewing freedom of the display. The 2D mode is half resolution.

Parallax Barrier Optical Components

One type of parallax barrier display in which the parallax barrier elements are placed in front of the display device is disclosed in T. Okoshi "Three Dimensional Imaging Techniques", Academic Press 1976.

In another type of a parallax barrier display, the parallax elements may be embodied as slits behind the display, as disclosed in G. Hamagishi et al "A Display System with 2D/3D compatibility", Proc.SID 1998 pp 915–918. It can be shown that such a display suffers from Fresnel diffraction artefacts, limiting the quality of the viewing windows that can be obtained.

In another type of a parallax barrier display, the parallax elements may be embodied as light lines interspersed by dark regions as disclosed in U.S. Pat. No. 4,717,949. It can be shown that such a display suffers from Fresnel diffraction artefacts, limiting the quality of the viewing windows that can be obtained, G. Woodgate et al Proc.SPIE Vol 3957 "Flat panel autostereoscopic displays—characterisation and enhancement" pp 153–164, 2000.

Lenticular Displays

Another type of parallax optic (cf. parallax barriers) well known in the art for use in stereoscopic displays is called the lenticular screen, which is an array of vertically extended cylindrical microlenses. The term "cylindrical" as used herein has its normal meaning in the art and includes not only strictly spherical lens shapes but also aspherical lens shapes. The pitch of the lenses again corresponds to the viewpoint correction condition. The curvature of the lenses is set substantially so as to produce an image of the LCD pixels at the window plane. As the lenses collect the light in a cone from the pixel and distribute it to the windows, lenticular displays have the full brightness of the base panel.

FIG. 6 shows the structure of a prior art lenticular display device. The device is configured as described in FIG. 5 up to the output polariser 82. The light then passes through a lenticular screen substrate 94 and a lenticular screen 96 which is formed on the surface of the lenticular screen substrate 92. As for the parallax barrier, the lenticular screen 94 serves to direct light from alternate pixel columns 69,71, 73,75 to the right eye as shown by the ray 88 from the pixel 69 and from the intermediate columns 68,70,72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

Lenticular displays are described in T. Okoshi "Three Dimensional Imaging Techniques", Academic Press, 1976. One type of lenticular display using a spatial light modulator is described in U.S. Pat. No. 4,959,641. The invention of '641 describes non-switching lenticular elements in air.

Such a display may suffer from undesirable visibility of the lens surface due to reflections and scatter at and near to the lenses 96 which will degrade the contrast of the image. Reflections could be for example due to Fresnel reflections.

Extended Viewing Freedom

The viewing freedom of the flat panel displays described above is limited by the window structure of the display.

A display in which the viewing freedom is enhanced by measuring the position of an observer and moving the parallax element in correspondence is described in EP0 829 743. Such an observer measurement apparatus and mechanical actuation is expensive and complex.

A display in which the window optical structure is not varied (a fixed parallax optic display for example) and the image data is switched in correspondence to the measured position of the observer such that the observer maintains an substantially orthoscopic image is described for example in EP0721131.

Indicators to Set the Correct Viewing Position

A display in which an indicator is implemented to enable the observer to locate the optimum position for themselves is described in "Proceedings of Third International Display Workshop" volume 2, Nov. 27–29, 1996 E. Nakayama et al, 1996 International Conference Centre, Kobe, Japan. Such an indicator will not give information on the longitudinal position of the observer, or accurate information on the lateral position of an observer.

Another type of indicator [EP0 860 728] uses an image display, a signal display and a parallax optic which has a portion which co-operates with the image display to form a plurality of right and left eye viewing zones in a viewing region, and a second portion which co-operates with the signal display to form a first signal image which is visible in at least one first part of the viewing region and a second signal image which is visible in at least one second part of the viewing region. Such an indicator uses a portion of the display area and thus limits the useful image area. This is particularly disadvantageous for small displays, as it is likely that the indicator height will not scale with display size (for it to maintain its visibility to the user) and thus will cover proportionately a larger area of a small display. Additionally, some resolution is lost so that the 3D display area is no longer a standard image area, such as VGA (640×3×480 pixels) for example.

Additionally, EP0 860 728 does not allow the use of reflected ambient light for the illumination of the indicator when used with a transmissive display. EP0 860 728 also teaches that in order to increase the brightness of the indicator portion for a single portion, the colour filters of the display would have to be changed. This requires a change to the LCD manufacturing process, and can result in a permanent loss of a portion of the display.

2D–3D Switchable Displays

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artefact free 2D mode.

One type of display in which the effect of the parallax optic is removed is Proc.SPIE vol. 1915 Stereoscopic Displays and Applications IV (1993) pp 177–186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diffuser is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artefacts in the 3D mode, as well as from unwanted residual scatter in the diffuser's clear state which will increase the display crosstalk. Therefore, such a display is likely to exhibit higher levels of visual strain.

In another type of switchable 2D–3D display [for example EP0 833 183], a second LCD is placed in front of the display to serve as a parallax optic. In a first mode, the parallax LCD is clear so that no windows are produced and an image is seen in 2D. In a second mode, the device is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D–3D display [EP 0 829 744] a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20–30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15–16 May 1997 L. G. Commander et al "Electrode designs for tuneable microlenses" pp 48–58.

In another type of switchable 2D–3D display [U.S. Pat. No. 6,069,650, WO 98/21620], switchable microlenses comprising a lenticular screen filled with liquid crystal material are used to change the optical power of a lenticular screen.

A 3D display comprising a liquid crystal Fresnel lens is described in S. Suyama et al "3D Display System with Dual Frequency Liquid Crystal Varifocal Lens", SID 97 DIGEST pp 273–276.

Although the use of lenses rather than barriers can be advantageous, e.g. in preserving more of the light, the above mentioned 2D–3D displays comprising switchable lenses however have certain disadvantages. For example, in the case of the electrically switchable birefringent liquid crystal microlenses of the Commander et al reference, the optical properties of the microlenses are limited due to residual unswitched liquid crystal and disclinations generated near the cusps of adjacent microlenses.

The variation of refractive index with temperature of the liquid crystal material will mean that the focal length of the lenses will vary. Thus such a display will have a limited temperature range of operation without temperature control. Additionally, the lenses will be required to have an electrode material deposited on their surface. This will cause a scattering reflection which will degrade the contrast of the image in both 2D and 3D modes of operation. The alignment characteristics, particularly on the lens side, need to be maintained over time, temperature and physical stress, throughout the lifetime of the element.

As another example, in the case of the display disclosed in U.S. Pat. No. 6,069,650 and WO 98/21620, the optical performance of the microlenses will be limited due to the unswitched regions of the lenticular screen as described above. Thus there may be some residual lens function in the 2D, giving some intensity variations in the window plane, and similarly there may be some residual non-lens function in the 3D mode, increasing the display cross talk.

Birefringent Lenses in Relation to 2D Displays

The use of birefringent lenses in displays is well known, for a wide variety of unrelated uses, including for example the following.

Birefringent microlenses are described in Patent Abstracts of Japan pub.no.11271744A for an LCD projector application. The input illumination structure of the system is illustrated in FIG. 7. An array of birefringent microlenses 102 with director direction 104 is positioned over a liquid crystal layer 106 and an array of reflective pixels 108 comprising red data pixels 110, green data pixels 112 and blue data pixels 114. The display is illuminated from a first direction 116 for the red pixels, a second direction 118 for the green pixels and a third direction 120 for the blue pixels. The illumination polarisation direction 124 is parallel to the extraordinary index 104 of the lenses which are immersed in an isotropic material 126.

The illumination of a single colour pixel in JP 1271744A is shown in FIG. 8. An input illumination cone substantially co-directional with input ray 118 with a polarisation state 124 is focussed by the lens 102 on to the pixel 112. Light is modulated by the LC layer 106 and reflected by the pixel 112 so that it has a component of polarisation 128 orthogonal to the input polarisation state 124. Output rays 130 are produced which are collected by a fixed beam-splitting component (not shown) and a projection lens (not shown) and directed towards a projection screen (not shown).

An LCD panel with an array of birefringent microlenses is illuminated by separate linear polarised cones of red, green and blue light. The material surrounding the birefringent lenses has a refractive index substantially the same as the slow axis of the birefringent material. The fast axis of the birefringence of the material in the lenses is arranged so that the lens is analysed by the input linear polarisation. Thus the green light is sent to the green pixel, red to red and blue to blue by the action of the lens. On reflection, the useful light to be sent to the projection screen is in the orthogonal polarisation state. This output polarisation state sees the index matched slow axis of the birefringent microlens and thus no lens is analysed. In this way, the output of the display is not vignetted by the aperture of the microlenses, and the full cone of light from the device can be collected by the projection lens. Such a device can illuminate and collect the light efficiently from a single reflective LCD panel, to produce a low cost and bright projection system. Such a device is not used for a directional display system, nor is the effect of the birefringent lens switchable.

Directional Display Systems

Directional displays in which a different image is viewed from a different direction to enable an interactive image visualisation experience are well known in the art. For example, printed lenticular screens are used to show two different advertising images in different directions.

Fibre-optic Liquid Crystal Switches

Liquid crystal fibre-optic switches using separate lens, liquid crystal layers and polarising beam splitting components are well known in the art. For example "Liquid crystal technology implementation for optical switching" Andrew Leuzinger, Integrated Communications Design—Electronics Design Magazine 4 Mar. 2001 describes a liquid crystal fibre optic switching system to enable control of the coupling efficiency between an input and an output optical fibre.

Reflective Displays

Reflective displays are well known in the art.

In a first class of display (transmissive display operating in reflection), a reflective layer is placed behind a transmissive display. Ambient light falling on the display is reflected by the reflective layer back through the display towards an observer. Such displays suffer from loss of brightness from having two passes through the display and inefficient diffusion from the reflective layer.

In a second class of display (backlit transmissive display operating in reflection), also known as a type of transflective display, the reflective layer at the rear of a transmissive display has an additional light source and light guide such as one or more light emitting diodes or fluorescent tubes. In dimly lit environments, the light source is switched on to increase the brightness of the display. The use of a light source will increase the power consumption of the display.

A third class of display (reflective display) is described for example in "Influence of rough surface upon optical characteristics of reflective LCD with a polariser", Y. Itoh et al, pp. 221–224, SID Digest 1998. A reflective layer is incorporated within the structure of the display, substantially at the pixel plane. The reflector may comprise a rough surface so as to provide diffusion of the incident light. Alternatively, a diffuser may be incorporated on the front surface of the display. Holes may be provided in the reflector so as to provide for transmission of light from a backlight to provide a type of transflective display. Alternatively a front-light may be provided to allow illumination from an auxiliary light source positioned at the front of the panel. Such a display provides increased efficiency of use of ambient light sources, and so is particularly suitable for use in colour reflective displays where increased light losses are associated with the colour filters.

An apparatus to increase the brightness of transmissive and backlit transmissive displays operating in reflection is described in "Volume Holographic Components for Display Applications", T. J. Trout et al, pp. 202–205 Society for Information Display (SID) Digest 2000. A volume reflection hologram is positioned at the rear of a reflective display which directs incident light in a separate direction to the direction of the specular reflection. To provide a colour reflective display, three separate holographic elements are provided within the LCD, which gives a complicated and expensive structure. A focussing and colour splitting hologram element is also shown for a projection system. The hologram serves to focus an off-axis incident white light source separately for red, green and blue pixels. A plane reflective element reflects the light back towards a projection lens, with the holographic lens having no substantial effect on the reflected light. Such a display works for a narrow range of illumination angles and is therefore not suitable for use in a direct view system.

Another apparatus to increase the brightness of transmissive and backlit transmissive displays operating in reflection and reflective displays is described in "Multidirectional Asymmetical Microlens-array light control films for high performance reflective liquid crystal displays", Yi-Pai Huang et al, SID Digest 2002. A structured lens array is provided which focusses and deflects the light from an ambient light source on to a plane reflector in an LCD panel. The lenses provide further deflection on the return path from the reflector, such that the output light is separated from the specular reflection. Such an apparatus has the following disadvantages compared to the present invention:

the optimum viewing zone is very narrow in both lateral and longitudinal directions due to the limitation of the limited optical output cone from the lens elements;

It does not exhibit a switchable brightness mode;

This citation teaches away from the use of a diffuser to increase the reflected cone, by incorporating horizontal and vertical focussing power in the lenses in order to expand the size of the viewing zone to the observer;

In order to remove Moire effects while providing focussing in horizontal and vertical directions, this structure is shown to have feature sizes of less than 10 um. This will create diffraction from the lens structures which will significantly broaden the spot at the reflecting plane and reduce the brightness enhancement.

It requires the use of asymmetric microlenses in order to achieve the focussing and deflecting function. Such lenses are formed from faceted surfaces in order to achieve the required functions. Faceted surfaces will create unwanted image artefacts and light loss due to total internal reflections, diffraction and refraction at the non-lens surfaces.

According to the first aspect of the present invention there is provided an optical switching apparatus comprising:

a fixed (or passive) birefringence lens; and a re-configurable (or switchable or variable) polariser that is aligned such that:

in a first mode it is arranged to transmit light passing parallel to the birefringent optical axis of the birefringent lens, and in a second mode it is arranged to transmit light passing orthogonal to the birefringent optical axis of the birefringent lens.

Alternatively, according to the first aspect of the present invention there is provided a directional display apparatus comprising:

a polarised output spatial light modulator comprising an array of pixels, a parallax optic comprising a microlens array where the microlens array comprises an array of fixed birefringence lenses (where the microlens array may be a lenticular screen); and a polarisation modifying device arranged to analyse the output polarisation from the microlens array such that:

in a first mode the analysed output polarisation state encounters a first refractive index step at the microlens surface with optical power, and in a second mode the analysed output polarisation state encounters a second refractive index step different from the first refractive index step at the microlens optically powered surface.

With the first aspect of the present invention the following features may be optionally applied to particular advantage:

The polarised output spatial light modulator comprises any of:

a phase modulating spatial light modulator an intensity modulating spatial light modulator and a polariser a reflective display a transflective display.

The parallax optic is aligned with respective pixels of the spatial light modulator.

The fixed birefringent lenses are formed with an aligned birefringent material on the surface of an optical power defining surface (and the optical power defining surface may be formed on a non-birefringent (isotropic) optical material).

The first refractive index step is substantially zero [the index of the birefringent material for the analysed output polarisation is substantially matched to the index of the optical power defining surface material] (the image arranged on the display may be a full resolution 2D image).

The second refractive index step is substantially non-zero such that the resulting lens will form an image of the pixel aperture substantially at the window plane of the display (the image arranged on the display may be an interlaced stereoscopic image pair; the image arranged on the display may be an interlaced combination of views for each observer in a multi-viewer display).

The polarisation modifying device (PMD) (or polarisation analysing device) is electrically re-configurable. (The polarisation modifying device may be a switchable 90 degrees polarisation rotator. If so, the 90 degree rotator may have a guiding function, and may be an aligned twisted nematic liquid crystal material positioned between electrodes. The 90 degrees rotator may have a half waveplate function. If so, the half waveplate may be a uniform birefringent liquid crystal layer arranged between electrodes such that the birefringent optical axis of the waveplate can be adjusted by application of a voltage. An additional chromatic compensating waveplate device may be incorporated.

The PMD may be segmented. If so, the gaps between the segment may be arranged to provide the same phase shift as the areas under the electrodes in the 3D mode of operation.

The PMD may be manually re-configurable between the two modes.

The polarisation modifying device may be configured such that in one orientation the polarisation analysed is such that the lenses are analysed (and have optical power) and in a second orientation the lenses are index matched (and have substantially no optical power.)

The PMD may comprise a linear polariser.

The PMD may comprise a linear polariser and a uniform half-waveplate.

For displays with a fixed linear output polarisation, the birefringent microlens array may be arranged following the output polariser of the display with the birefringent optical axis of the birefringent microlens aligned at 45 degrees to the output polarisation of the display device.

In the first mode the analysed output polarisation may be aligned at +45 or −45 degrees to the output polarisation of the display device.

In the second mode the output polarisation may be aligned at the other of +45 or −45 degrees to the output polarisation of the display device The birefringent microlens output may be placed between the phase modulating layer of a phase modulating spatial light modulator and the analysing polariser.

The birefringent optical axis of the birefringent microlens may be aligned at 0 or 90 degrees to the output polarisation state of the phase modulating SLM when operating in its full-on state.

In a first mode of operation the output polariser may be configured to be parallel or orthogonal to the output polarisation of the display when in its full-on state.

In a second mode of operation the output polariser may be configured to be orthogonal or parallel to the output polarisation of the display when in its full-on state.

In the mode of operation in which the output polarisation is orthogonal to the output polarisation of the display when in its full-on state, the electrical response of the display may be adjusted to give appropriate grey scale output.

The phase modulating SLM may be a transmissive liquid crystal display.

If the display has view angle correction films, the birefringent microlenses may be placed between the view angle correction films and the analysing polariser.

The phase modulating SLM may be a reflective liquid crystal display

If the display has contrast and brightness correction films, the birefringent microlenses may be placed between the correction films and the output polariser.

The phase modulating SLM may be a transflective liquid crystal display

The pixel structure of the transflective display may be arranged to give substantially the same optical performance in reflective and transmissive modes of operation.

A grey scale correction apparatus may be used in which the grey scale response of the LCD is corrected for use depending on normally black or normally white mode of operation. If so, a separate correction may be used for red, green and blue channels in the normally black mode of operation, and/or the mode of operation may be detected by an output polariser mode position detector and the greyscale correction applied as appropriate.

The alignment of the birefringent material optical axis in the birefringent microlenses may be substantially parallel to the substrate at a plane substrate and substantially parallel to a microstructure substrate; and if so, the relative alignment of the plane and microstructure substrates may be parallel or the relative alignment of the plane and microstructure substrates may be anti-parallel;

the relative alignment of the plane and microstructure substrates may be set as to provide a rotation of polarisation for the plane of polarisation of the light passing from the plane substrate to the microstructured substrate;this relative alignment may be arranged so that the alignment direction at the microstructured surface may be parallel to the geometrical microlens axis of the cylindrical microlenses. This rotation may be 45 degrees or the alignment of the birefringent material optical axis in the birefringent microlenses may be substantially perpendicular to the substrate at a plane substrate and substantially parallel to a microstructure substrate.

The alignment mechanism of the birefringent lens may be by means of at least one of:

an alignment layer, where
 a layer may be added to the surface of the respective substrate, and if so
  the layer may additionally be rubbed, or
  the layer may additionally be photo-aligned, or
  the layer may be an oblique evaporated material; or
 a layer may be formed as part of the replicated microstructure, and if so
  the layer may be a high frequency diffraction grating, and/or
  the microlens and alignment structures may be replicated in a single replication step; or
an electric field; or
a magnetic field.

The microstructured surface may be formed from an array of microlenses:
  which may be cylindrical;
  which may be an array of negative lenses if the index of the optical power forming surface is matched to the lower value of the ordinary and extraordinary refractive index of the birefringent material;
  which may be an array of positive lenses if the index of the optical power forming surface is matched to the higher value of the ordinary and extraordinary refractive index of the birefringent material;
  which may have an additional microstructured alignment layer formed on the optical surface.

The best focus of the lenticular lenses may be positioned substantially at a plane distinct from the plane of the pixels such that the size of the optical image of the viewer's eye's pupil at the plane of the image pixel is larger than the size of the separation of the liquid crystal layers.

An observer tracking system may be additionally implemented in which the microlens is moved laterally with respect to the image pixels of the display in order to track the measured position of a moving observer with respect to the display.

A sweet spot indicator may be additionally implemented, and may comprise:
  a backlight unit, where:
    the backlight may comprise a light source and diffuser arrangement;
    the backlight may comprise a diffusing mirror, and/or the backlight may comprise part of the backlighting system for the display;
  a window generating mask;
  a parallax optic comprising a microlens array arranged to form an image of the window generating mask at the window plane of the display region, wherein
    the microlens array may comprise a birefringent material substantially the same as that used in the associated 3D display, and
    the microlens array may comprise a non-birefringent material with substantially the same refractive index and dispersion as the extraordinary component of the refractive index for the birefringent material; and
  a mask arranged to block the transmitted-light from alternate microlenses A switchable transflective or reflective display comprising:
  a backlight (for a transflective display),
  a reflective or transflective display comprising an array of pixels,
  an array of passive birefringent microlenses as described in other aspects arranged in rows, wherein:
    the pitch of the rows is substantially the same as the vertical pitch of the pixels of the display, and
    in a first mode the lenses are arranged to substantially image the pixel plane of the display to a nominal observer plane; and
  a polarisation modifying element;
being arranged to switch the output of the display between:
  a first mode which has an increased brightness in defined viewing positions, and
  a second mode which has standard brightness characteristics.

An autostereoscopic display may be configured so that the size of the windows at the viewing plane is substantially the same as the nominal interocular separation of the viewers.

A multi-viewer display may be configured so that the size of the windows at the viewing plane is greater than the interocular separation of the viewers.

In a further aspect, the invention provides
A fibre-optic switching system comprising:
  a birefringent lens
  a polarisation modifying device arranged:
    in a first mode to analyse the polarisation state incident with a refractive index step at the optically powered surface such that the light is imaged substantially to the optical acceptance cone of an output optical fibre, and
    a second mode to analyse the polarisation state incident with a different refractive index step such that the light is imaged substantially away from the optical acceptance cone of the output optical fibre.

Thus, in different aspects, the present invention provides, inter-alia, an optical switching mechanism comprising at least one passive birefringent lens element and at least one separate polarisation modifying element that can be switched between directional and non-directional modes for providing:

an autostereoscopic display means which can conveniently provide a moving full colour 3D stereoscopic image which may be viewed by the unaided eye in one mode of operation and a full resolution 2D image in a second mode of operation.

A switchable high brightness transflective and reflective display system which in a first mode may exhibit substantially non-directional brightness performance and in a second mode may exhibit substantially directional brightness performance a multi-viewer display means which can conveniently provide one moving full colour 2D images to one observer and at least a second different 2D image to at least a second observer in one mode of operation and a full resolution 2D image seen by all observers in a second mode of operation.

A fibre optical switching system capable of switching the optical input from an input optical fibre to an output optical fibre.

Different features of the first aspect of the invention may tend to provide the following advantages singly or in any combination.

This invention enables the generation of autostereoscopic 3D images and full resolution 2D images of high quality with low levels of image cross talk and high brightness.

This invention also enables the generation of a directional multi-viewer display that can be switched between a 2D mode and a mode in which images (which may be different) can be seen by different viewers from a wide range of directions.

By arranging an array of fixed birefringent microlenses as a parallax element, the function of the lenses can be adjusted by controlling the output polarisation of the device.

Artefacts associated with the interface between the liquid crystal layers and the curved surface of the birefringent microlenses, (including but not limited to disclinations), which may form or vary as a voltage is placed across the liquid crystal material are avoided. Therefore the image quality of the display is optimised in both 2D and 3D configurations. The complexity of the birefringent microlenses is minimised by having no electrical addressing layers (or electrodes) or addressing circuitry.

It is not necessary to deposit a transparent conductive electrode on the curved polymer structure of the microlenses, which are less tolerant to temperature during deposition than glass. In addition reflection losses (for example Fresnel reflections) and absorptive losses from the electrode layer are eliminated.

It is not necessary to deal with different electric fields across the liquid crystal resulting from the physical form of the microstructure.

The alignment condition in a passive element need only be maintained during the fabrication process whereas electrically switchable birefringent microlenses of the prior art must maintain the integrity of the alignment throughout the display lifetime and range of operating conditions.

This invention enables the use of cured liquid crystal polymer type materials in the birefringent microlenses. This enables the birefringent properties of the birefringent material to be substantially fixed at the time of manufacture. Variations in liquid crystal birefringence with temperature for nematic phase liquid crystal materials as required in prior art switchable microlens devices means that the optical performance of electrically switched lenses will vary with temperature. This means that the optical quality of the generated windows will also vary with temperature. Therefore, as the temperature of operation of the prior art device varies in the electrically switchable microlens devices, the performance of the mode in which an index matching condition is required (2D mode), and the mode in which high performance windows are required (3D mode), will vary. This will cause the prior art display to operate away from its optimum operating conditions as the temperature is varied.

In aspects of the present invention, the solid polymer material which can be used will maintain optimum operating conditions over a wider operating temperature range than the nematic phase (uncured)-materials needed for electrically switchable lenses. This would be particularly important in environmentally demanding applications, for example automotive applications.

By arranging the microlenses to be internal to the glass substrate, reflections from the surfaces of the lenses can be minimised and the output surface (which may be planar) can be broadband anti-reflection coated.

In the configuration in which the birefringent microlenses are placed after the output polariser of the display,
the brightness of the 2D and 3D modes of the display will be substantially the same.
the contrast viewing angle performance of the display will be substantially the same In the configuration in which the birefringent microlens is placed between the phase modulating layer of the SLM and the output polariser of the display:
the brightness is the same as the base display.
the brightness is the same in both 2D and 3D modes.
the power consumption of the 3D display may be made identical to the power consumption of the 2D display in this mode.
the viewing distance may be made short by incorporation of the lenses within the counter substrate of the device. Fabrication of the device with internal microlenses can take place using known materials and fabrication processes.

The switching rotation function polarisation modifying device (such as a half waveplate) may be manually re-configurable which minimises the additional cost and complexity of the system.

A single SLM & birefringent microlens combination can be used for products with either mechanically switched or electrically switched properties, thus reducing the inventory.

The final product configuration is determined by the choice of subsequently attached polarisation modification device component.

A further advantage of the structure for electrically switching compared to the prior art, is that the active element may be fabricated by commercially proven techniques. The thin flat substrates mean that low voltages may be used. Standard liquid crystal spacing techniques may also be used. This is not the case as for thicker liquid crystal layers as are used for example to cover the microlens form factor.

The electronically switchable waveplate of the present invention may be configured from a nematic liquid crystal or bistable device such as a ferroelectric liquid crystal and thus require no additional power consumption other than when switching between modes.

The switching element may be segmented to allow 2D and 3D zones of the same brightness simultaneously on the display.

The technology may be applied to a wide range of spatial light modulators including transmissive, reflective and transflective liquid crystal displays and emissive displays.

Such a display requires a relatively low precision alignment of a polariser to the output compared to the high precision alignment of the parallax optic with respect to the display. Thus, the high precision alignment is fixed during the manufacture of the display while the low precision alignment is made manually for which only one degree of freedom of alignment is necessary. Therefore the physical mechanism by which the user reconfigures the display is less complex and costly than the case where the parallax optic is attached and detached to the display surface for the conversion between 2D and 3D modes of operation.

The use of lenticular lenses within the substrate means that the Fresnel reflections from the lens surfaces are substantially reduced compared to the element in air. This means that the element has a lower level of scatter and that anti-reflection coatings may be conveniently applied to the plane outer surface of the device. In addition reflections from a high refractive index Indium Tin Oxide (ITO) layer are not present (as would be the case with electrically switched lenses), so the visibility of the element itself in the display will be reduced.

A sweet spot indicator can be configured to have substantially the same optical performance as the display, but does not need to use any of the display area. Such a display is thus particularly suitable for handheld displays in which the area of the display is limited.

The viewing freedom of the display can be enhanced by addition of an observer tracking function which can be implemented by moving the birefringent microlens in synchronisation with the measured position of a moving observer; or adjusting the image presented in correspondence with the measured position of an observer.

A high brightness transflective or reflective display advantageously has a first mode with substantially non-directional properties as defined by the reflector material of the display and in a second mode has directional brightness property such that the display brightness is greater from a defined range of angles. Such a display works in full colour and can be used to increase the brightness of both reflective and transmissive modes of operation. Switching between the modes may be accomplished by means of a electrically switchable polarisation rotator.

A multi-viewer display can be configured so that in one mode of operation all viewers can see the same image and in a second mode of operation different viewers can see different images to allow multiple simultaneous uses of the display.

This can reduce the number of displays and display drivers required in an environment by allowing each observer to see their preferred choice of image from the same display unit.

Such a display may be particularly suitable for systems such as automobile displays, automatic teller machines and seat-back aviation entertainment displays.

A fibre-optic switching system using the present invention allows the generation of a switching technology using a limited number of components and thus reduces cost and complexity.

According to the second aspect of the present invention, there is provided a direct view reflective optical display apparatus, comprising:
an array of lenses capable of forming an array of images of an external light source in an image plane;
reflector means provided substantially in said image plane to reflect said array of images, the reflector means and the array of lenses being arranged such that said array of images are reflected by said reflector means through the array of lenses to direct the light of each image into substantially the same directional distribution; and
an image display apparatus having an array of pixels arranged to modulate the light of the reflected images,
wherein the reflector means is a light-deflecting reflector such that each respective finite portion of the image is reflected through a lens aperture different from the lens aperture to which the lens aperture forming the respective finite portion of the image would be imaged by a planar reflector extending along the image plane.

Alternatively according to the second aspect of the present invention there is provided a direct view reflective display optical apparatus comprising:
a display apparatus;
a lens array, and;
a light deflecting reflector;
where
the lens array is arranged in at least one mode to form first array of images of an external light source substantially at the plane of the light deflecting reflector;
the light deflecting reflector is arranged to direct light rays from a first lens aperture to a second lens aperture.

The second aspect of the present invention (and optionally the first aspect of the invention) relates to a direct view display apparatus which is a display in which the image is seen by the observer substantially at the plane of the spatial light modulator. This contrasts with a projection display apparatus in which the image from the spatial light modulator is magnified by a separate projection lens. The magnified image is seen by the observer either at the plane of a separate projection screen or a magnified virtual image.

With the second aspect of the invention, the following features may be applied to particular advantage:

The position of the second lens aperture is preferably in the plane of the lens array and spatially separated from a third lens aperture
where the third lens aperture is in the plane of the lens array and is in a position at which the first lens aperture would be imaged to by a plane surface substantially at the plane of the deflecting reflector.

Additionally, the apparatus may be switched between:
a first mode which has an increased brightness in defined viewing positions;
a second mode which has brightness characteristics different to the first mode;
where the brightness characteristics are substantially the same as the base display.

The switching between the first and second mode may be achieved by controlling the focal length of the switching lens where:
in a first mode, the lenses have a first focal length arranged to produce a first image an external light source substantially at the plane of a reflector;
in a second mode, the lenses have a second focal length arranged to image the external light source substantially at infinity;

where the switching mechanism is by means of:
active (switching) birefringent lenses;
passive (fixed) birefringent lenses and a polarisation analysing device.

The display apparatus may be:
a transmissive display operating in a reflective mode;
a reflective display;
a transflective display;

where the picture elements of the display apparatus are arranged in rows and columns.

The deflecting reflector may be:
a plane reflector and a diffuser;
where the diffuser is substantially in the same plane as the reflector;
where the reflector and diffuser are combined in to a single element;
the reflector and diffuser may comprise the reflector and diffuser of a reflective display;
a hologram arranged to combine functions of reflection and diffusion.

The diffuser may diffuse light:
in horizontal direction and the lens array provides focussing in the vertical direction;
in horizontal and vertical directions;
without substantial modification to the polarisation of the reflected light.

The reflector may be an array of reflectors separated by an array of apertures:
where the pitch of the array of reflectors is substantially the same as the pitch of the array of lenses;
where the pitch of the pixel elements in a first direction is substantially an integer multiple of the pitch of the array of reflectors in the first direction;
where the first direction is the vertical direction;
where the reflector is an array of tilted surfaces.

The reflector may comprise a polarisation sensitive reflecting film:
where the polarisation axis of the polarisation sensitive film is aligned with the axis of the birefringent material of a birefringent microlens.

The lens array may:
comprise cylindrical lenses;
be aligned parallel to the rows of the display;
comprise lenses with a non-zero curvature about two axes.

The lens array, diffuser and reflector may be combined in to a single aligned element and positioned at the rear of the display.

The lens array may be positioned at the front of the display and the diffuser and reflector may be positioned at the rear of the display.

Thus, in different aspects, the present invention provides a high brightness transflective and reflective display system. Additionally, in a first mode it may exhibit substantially directional brightness performance and in a second mode may exhibit substantially non-directional brightness performance Different features of the second aspect of the invention may tend to provide the following advantages singly or in combination.

This invention enables the generation of a high brightness image on displays operating with a reflective mode for use in ambient lighting environments. Such a mode allows a substantial increase in the brightness of a reflective or transflective display system, for an appropriately positioned observer and light source.

The invention allows the separation of the high brightness viewing region from the specular reflection region from ambient light sources and thus increases the contrast of the viewed image.

The invention also enables a switchable display in which the high brightness mode may be switched off for example for use in adequately lit environments and for use with a backlight.

The invention works in all colours and can achieve this with a single component, not being restricted to a limited colour band. The invention does not require alignment of the optical element with the colour filters of the display, thus reducing cost and complexity.

The refractive and reflective optical components allows for the output uniformity of the display to be high for a broad range of visible wavelengths compared to the use of diffractive optics such as volume reflection holograms.

The lens may be made non switching in order to reduce the cost of the system.

In embodiments comprising a rear reflecting lens and reflector structure, the pitch of the lenses does not need to be set the same as the pixel pitch in a number of configurations. This allows the same element to be used with different pixel pitch base display panels. The lens and reflector elements may be integrated in to a single aligned component to simplify fitting to standard display systems. The pitch of the lenses may be made smaller than the pixel pitch to reduce Moire effects and to reduce device thickness.

In the embodiments comprising a rear reflective polarising film, the reflecting element need not be patterned and can thus be conveniently aligned with respect to the lenses, without requiring a high precision alignment to the panel pixels.

The invention can use active birefringent lenses or passive (non-switching) lenses to reduce the number of optical components in the system.

The passive birefringent lenses have the advantages described elsewhere.

In the embodiments in which the reflector is substantially in the plane of the pixels of the display, then the lens focussing action will increase the cone angle of the illumination on to the panel. Therefore, it may be possible to reduce the r.m.s. value of the surface relief of the bumpy reflector compared to the unmodified display while maintaining the required diffusion characteristics. This has the advantage that the variation of thickness of the liquid crystal layer may be reduced and the uniformity of liquid crystal alignment may be increased and therefore the contrast properties of the liquid crystal mode may be enhanced.

Where external elements are used to enable the brightness enhancing element, they can be advantageously fitted to pre fabricated displays. The external devices do not use a bumpy reflector internal to the pixel, and therefore do not restrict the choice of liquid crystal mode to one that is insensitive to device thickness variations.

The optical switching apparatus in accordance with the first aspect may be used as the lens array in the device in accordance with the second aspect. In such a combination any of the features of the first and second aspects may be combined together.

Embodiments of the present invention will now be described, by way of example only, with reference to the accompanying drawings, in which:

FIG. 11b shows in schematic front section the analysing polariser configuration of FIG. 11a;

FIG. 19a shows the alignment directions for the configuration of FIG. 18a;

FIG. 31a shows the schematic front section of the polarisation configuration for the normally white 2D mode of FIG. 30a;

FIG. 31b shows the schematic front section of the polarisation configuration for the normally white 3D mode of FIG. 30a;

FIG. 32b shows the schematic front section of the polarisation configuration for the 2D mode of FIG. 32a;

FIG. 32c shows the schematic front section of the polarisation configuration for the 3D mode of FIG. 32a;

FIG. 41 shows the schematic window structure for a display of FIG. 40a;

Figure 1A:
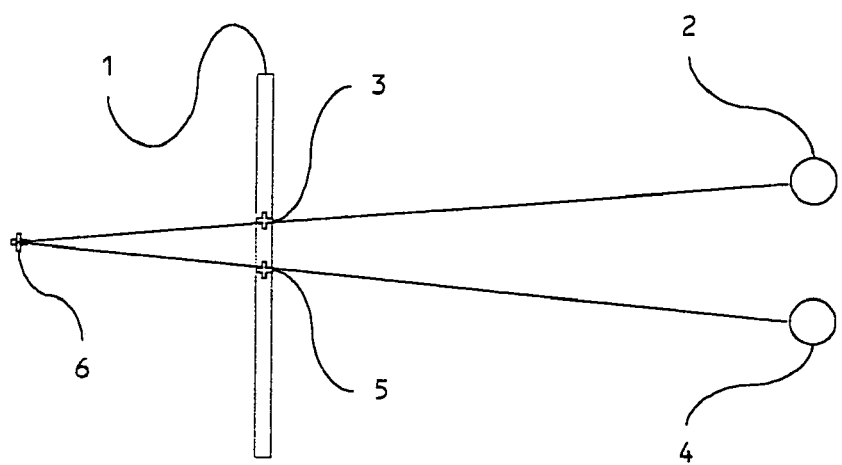
FIG. 1a shows the generation of apparent depth in a 3D display for an object behind the screen plane.
Figure 1B:
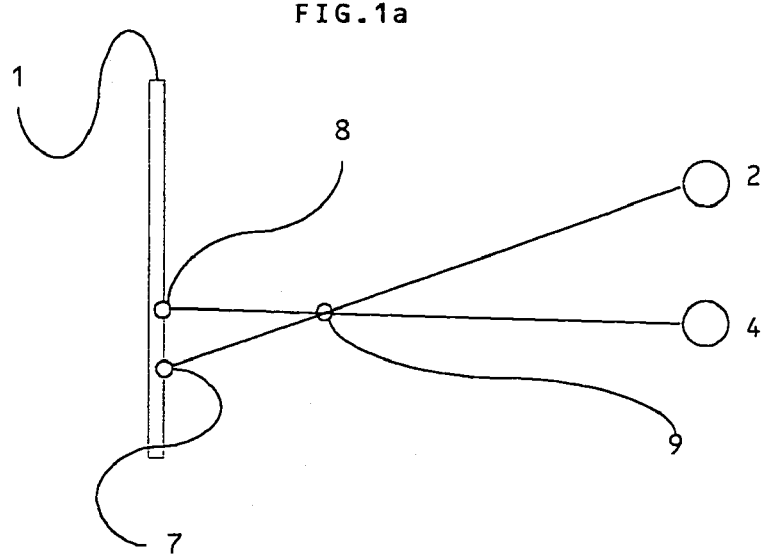
FIG. 1b shows the generation of apparent depth in a 3D display for an object in front of the screen plane.
Figure 1C:
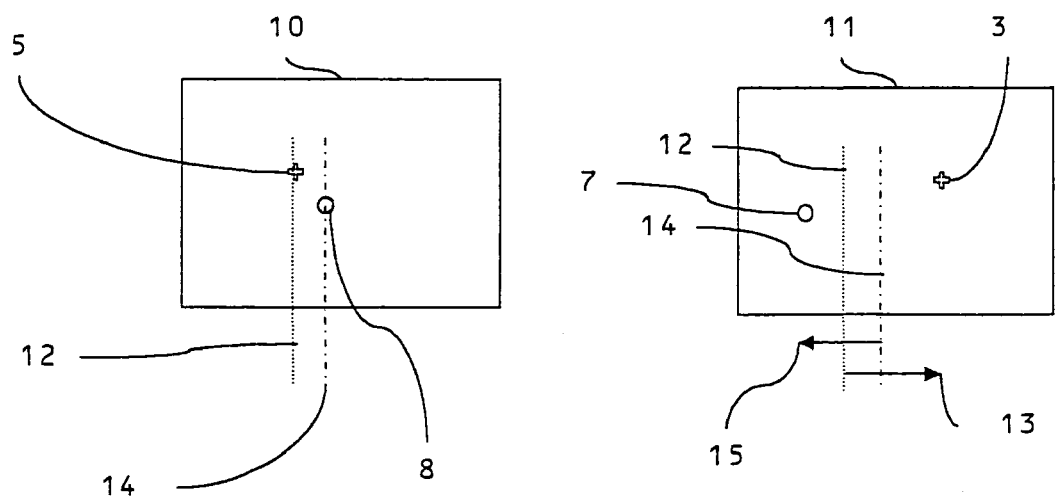
FIG. 1c shows the position of the corresponding homologous points on each image of a stereo pair of images.
Figure 2A:
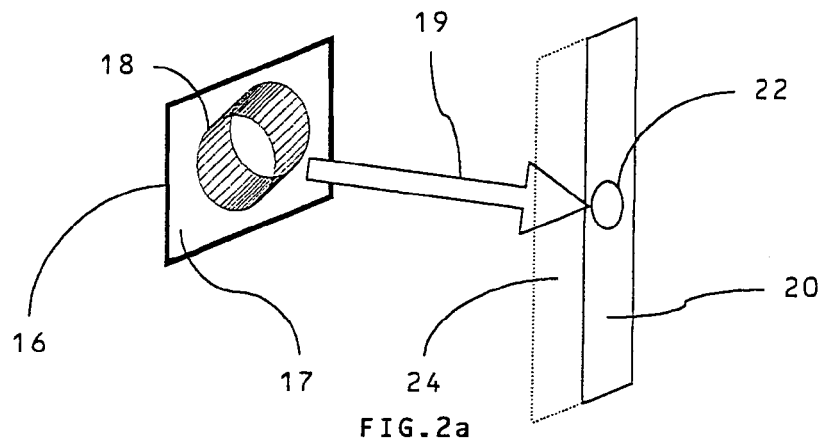
FIG. 2a shows schematically the formation of the right eye viewing window in front of an autostereoscopic 3D display.
Figure 2B:
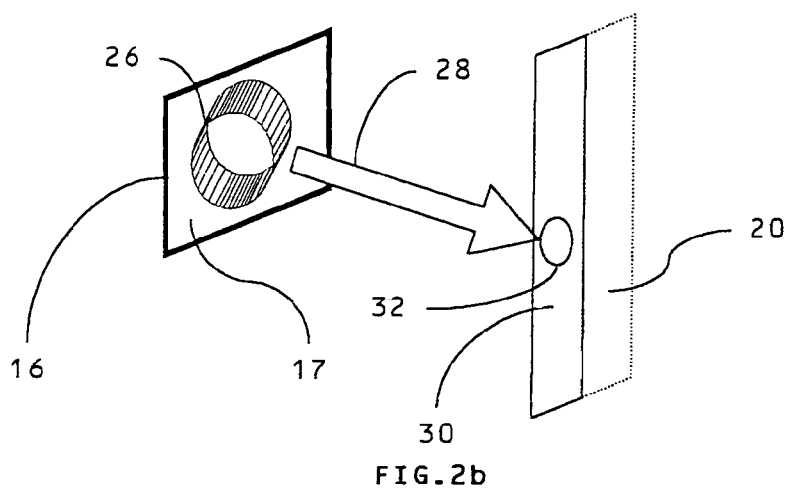
FIG. 2b shows schematically the formation of the left eye viewing window in front of an autostereoscopic 3D display.
Figure 3:
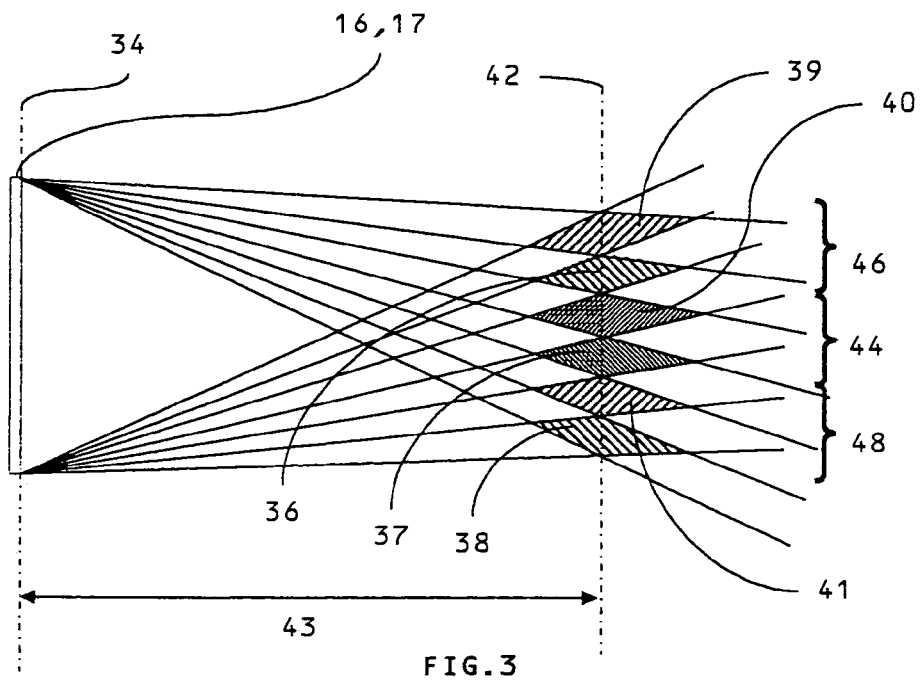
FIG. 3 shows in plan view the generation of viewing zones from the output cones of a 3D display.
Figure 4A:
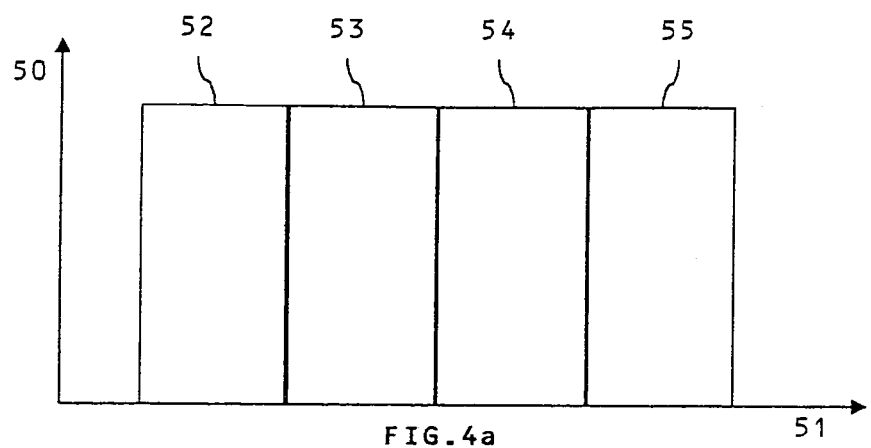
FIG. 4a shows the ideal window profile for an autostereoscopic display.
Figure 4B:
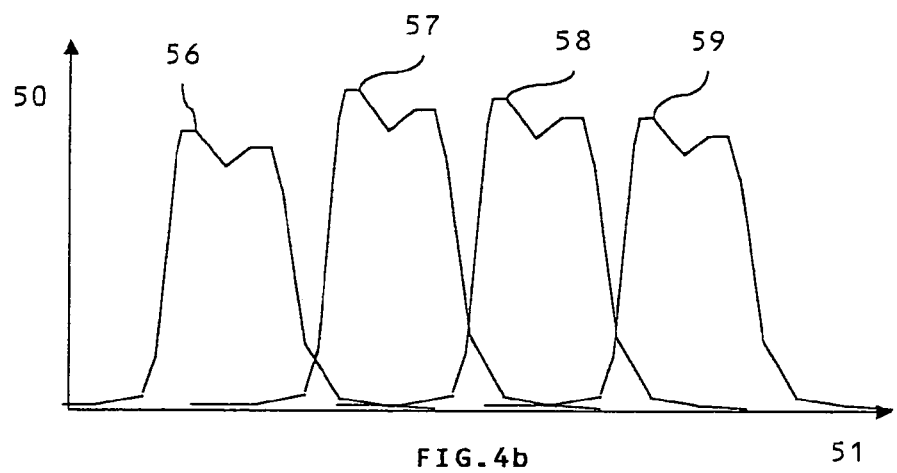
FIG. 4b shows a schematic of the output profile of viewing windows from an autostereoscopic 3D display.
Figure 5:
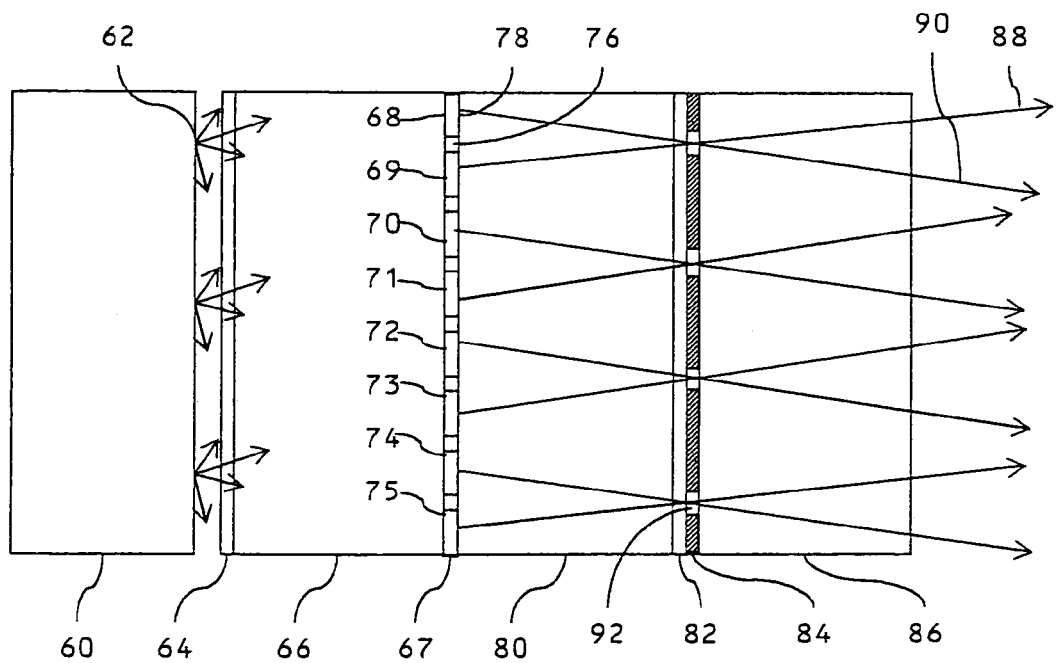
FIG. 5 shows the structure of a parallax barrier display.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

Figure 9A:
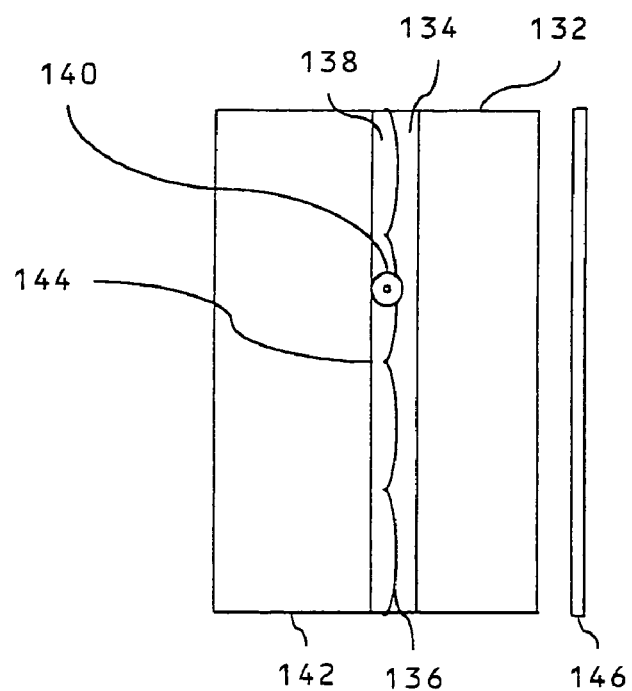
FIG. 9a shows a light direction switching apparatus.
Figure 7:
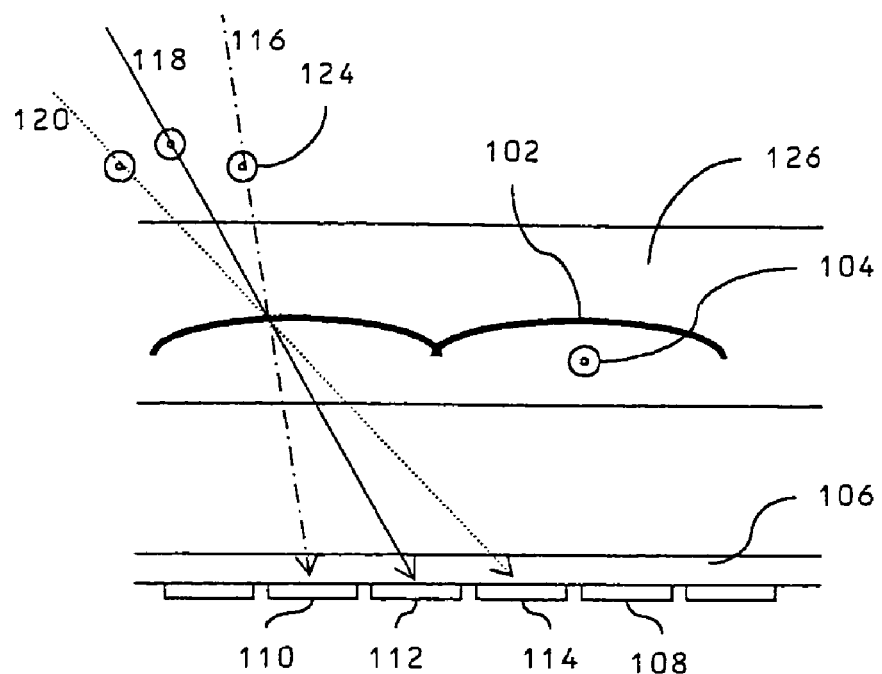
FIG. 7 shows the structure of a projection optical system using birefringent microlenses for the input illumination.
Figure 8:
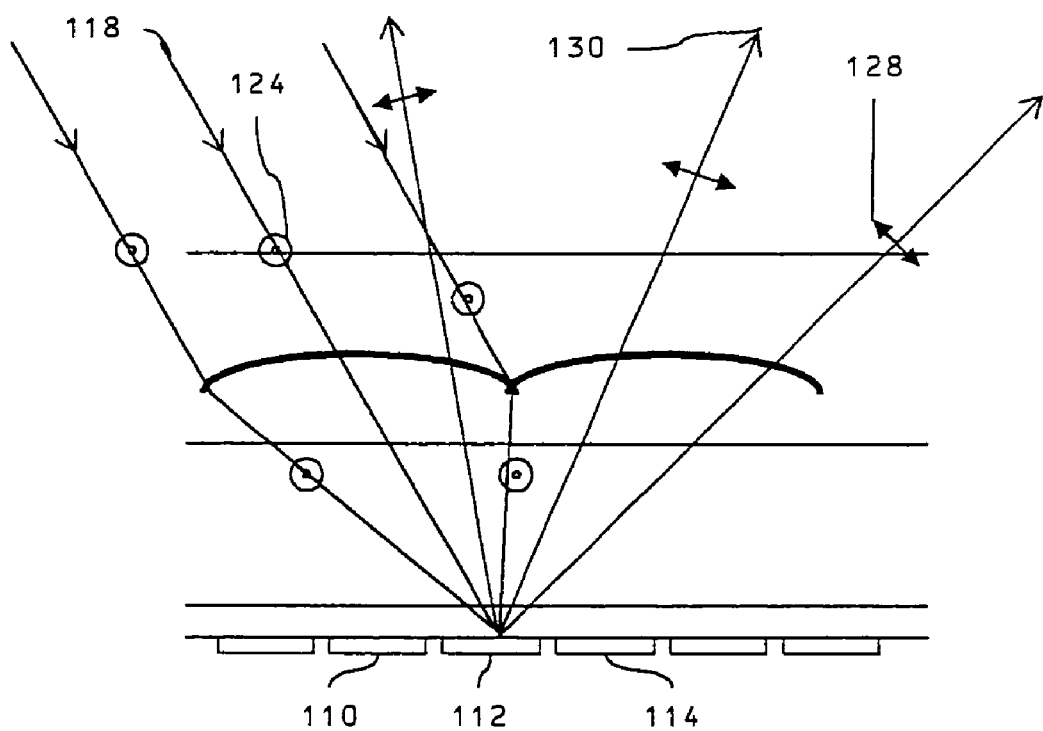
FIG. 8 shows the structure of a projection optical system using birefringent microlenses for the output illumination.

FIG. 9a shows a light direction switching apparatus (or light directional distribution switching apparatus) of a first exemplary embodiment of the invention. The light direction switching apparatus comprises a passive birefringent microlens and a switchable or variable polarisation modifying device 146 (which may also be termed a polariser) as shown in FIG. 9a. In this embodiment the birefringent microlens is provided by a lens substrate 132 having an isotropic material 134 deposited upon it on which is formed a microstructured surface 136. A birefringent material 138 with a defined birefringent optical axis direction 140 defining the direction of the extraordinary index, or director of the birefringent material is placed on the microstructured surface 136. A microlens counter substrate 142 with a plane surface 144 is positioned parallel to the lens substrate 132 to form a sandwich of the birefringent material 138. The switchable polarisation modifying device 146 is positioned to one side of the passive birefringent microlens device.

The embodiment of FIG. 9a represents a simple embodiment of the invention. The apparatus may be used in any application requiring switching of light between two directional distributions. One particularly desirable application is to use the apparatus in conjunction with or as part of a display device, such as a liquid crystal display device. For this reason, many of the embodiments described below are of light direction switching apparatus in conjunction with or forming part of such display devices. Nevertheless, it is to be appreciated that the many preferred features of the light direction switching apparatus described in the context of the display device embodiments below may also be applied, singly or in any combination, to light direction switching apparatus of the present invention, for example such as that shown in FIG. 9a, for use in display devices other than liquid crystal display devices, and indeed for use in or as used with devices and applications other than display devices or display applications. Moreover the preferred features may be implemented in such other devices or applications either directly, analogously or equivalently, in dependence upon the structures or modes of operation of those devices or applications.

Operation of the apparatus shown in FIG. 9a will be described below in relation to its use in a variety of displays, especially switchable 2D–3D displays, and other applications. In general, when implementing the apparatus of FIG. 9a in the majority of practical applications for it, including the display application embodiments below, it is appropriate to arrange the apparatus such that input light passes through the birefringent microlens before reaching the polarisation modifying device 146 (in which case the polarisation modifying device 146 acts as a polarisation analyser with respect to the light that has passed through the birefringent lens). Often a reason for this is so that the birefringent lens can be placed close to light modulating elements, e.g. pixels, of a display device. Nevertheless, it is to be appreciated that the apparatus shown in FIG. 9a may be arranged or used such that the light passes either way through it, i.e. so as to pass through the birefringent microlens before the polarisation modifying device, or so as to pass through the polarisation modifying device before the birefringent microlens, and that this is also the case for the other embodiments described below.

In operation the apparatus of FIG. 9a may be arranged so that when illuminated by light of one polarisation component, the lenses operate to form a real image of an object. The object may be for example a light source which may be placed close to the lenses. The light source may be for example pixels of a display device. A real image must lie on the opposite side of the lens to the object. The real image may be positioned at a window plane. The window plane may be substantially planar although as well known in the art will be distorted by aberrations due to the imaging properties of the lenses.

For light of a second polarisation component, the lenses may have a different optical function and so a real image is not formed at the window plane. For the light of the second polarisation component, the lenses can be configured to have substantially no optical power so that there is substantially no modification of the light rays from the light sources. In this case, the object and image will lie in substantially the same plane on the same side of the lenses. Thus the lenses do not operate to form a real image of the object in this polarisation mode.

Such a configuration will advantageously allow the switching of the optical property of the lenses to allow the formation of viewing windows in a first mode and no viewing windows in a second mode.

Such an apparatus can advantageously be used for example in switchable 2D to 3D displays using the binocular parallax effect in which a spatial light modulator comprising an array of pixels is placed at the object plane of the lenses. In the first (autostereoscopic 3D) polarisation mode the lenses form a real image of the display pixels substantially at the window plane which is on the opposite side of the lenses to the display pixels. Each eye of an observer positioned substantially at the window plane will see one of a stereo image pair comprising a planar image at the lens optical apertures. In the second (2D) polarisation mode, the lenses are arranged to have substantially no optical power and thus the image of the object is substantially at the plane of the object. Thus the image is not a real image as it is on the same side of the lens. The same planar image may be seen by both eyes of the observer at the plane of the display pixels at the object plane. In this polarisation mode, advantageously the observer sees the full pixel resolution of the spatial light modulator.

Such an apparatus can also be advantageously used for example in switchable high brightness reflective displays in which a spatial light modulator comprising an array of pixels is placed at the object plane of the lenses. In a first polarisation mode, the lenses image the object to a real window plane on the opposite side of the lenses. An observer positioned at the window plane may see an enhanced brightness image for an appropriately positioned external light source. In a second mode, the image is substantially on the same side of the lens as the object plane, and no brightness enhancement can be seen.

In operation, the apparatus may be adapted so that the switchable polariser may be arranged to switch a planar image such as for example in a 2D to 3D switching apparatus or a switchable reflective display brightness enhancement apparatus. The observer will see the planar image substantially at the plane of the aperture of the lenses of the display device in a first polarisation mode or at the plane of the pixels of the display device in a second polarisation mode. The image here does not refer to the real image of the pixels at the window plane in the first polarisation mode. The switchable polariser may be uniformly switched such that adjacent lenses are operating in the same polarisation mode. This allows regions of the displayed image to be seen in the same mode of operation. This advantageously reduces the complexity and cost of the switchable polariser. Additionally, there is no constraint on the separation of the lens array and switchable polariser. There is no parallax between the lens array and switchable polariser over the uniform area.

Figure 9B:
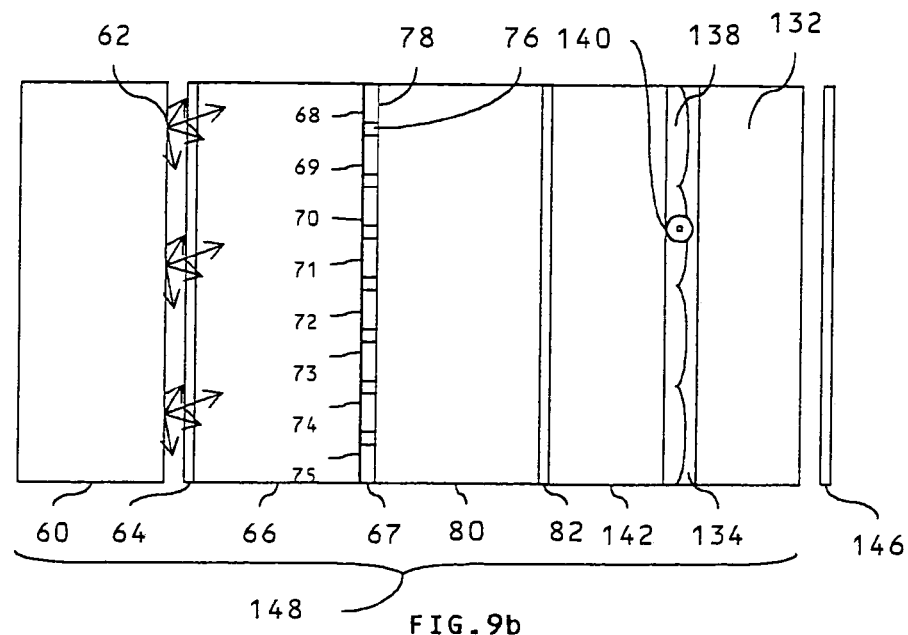
FIG. 9b shows the structure of a passive birefringent microlens display.

FIG. 9b shows an embodiment where a light direction switching apparatus is used in or incorporated with a switchable 2D–3D display device. A directional distribution switching device of the type shown in FIG. 9a is attached to the front surface of an LCD. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,74, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 67 and in colour by a colour filter positioned on an LCD colour filter substrate 80. The light then passes through an output polariser 82 and through the microlens counter (carrier) substrate 142, birefringent microlenses 138 with birefringent optical axis direction 140, isotropic microstructured material 134 and lens substrate 132. At the output of the device, a polarisation modifying device 146 is added. In the present embodiment, the birefringent microlens is configured as a cylindrical lens array. Each lens extends across the entire display in one direction and the lenses repeat across the display in the perpendicular direction. The combination of backlight 60, LCD 64,66,67,80,82 and birefringent microlens structure 142,138,134,132 is grouped together to form the display 148.

The direction of the director of the LC is shown in FIG. 9a and subsequent figures. This shows the direction of the extraordinary component of the birefringence of the birefringent material.

The birefringent microlens is sandwiched between the output polariser of the display and an analysing polariser.

The birefringent microlens of this embodiment comprises:
a substrate arranged such that its thermal expansion substantially matches the thermal expansion of the display substrate
a layer of non-birefringent material with refractive index substantially the same as the refractive index the ordinary index of the birefringent material
a microstructured surface formed on the non-birefringent material
a birefringent material with a uniform birefringent optical axis direction which is substantially aligned in the plane of the microstructured surface
the microstructure has the form of an array of elongate concave surfaces formed on the surface of an isotropic material.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A backlight illuminates the rear of the display. A polariser analyses the light from the backlight which is then incident on the pixels of the LCD. An LCD is a class of phase modulating spatial light modulator (SLM) and uses polarisers to convert the phase modulation to an intensity modulation which analyse the output polarisation of the pixels.

The phase of the incident light is modulated according to the voltage across the pixel, which for a thin film transistor twisted nematic (TFT-TN) type LCD of this particular embodiment is controlled using an array of matrix addressed transistors on the active substrate of the device. The output is then transmitted through an array of colour filters placed on the counter substrate of the LCD or directly on the active substrate. A black mask is used to shield the addressing electronics and to produce well defined pixel apertures. This light is then analysed by the LCD's output polariser. The output light is then incident on an array of birefringent microlenses and the following analysing polariser 146.

It will be apparent that in this embodiment each pixel of the display is seen by the observer to be substantially at the aperture of the lens array, in a two dimensional plane in space. This display uses the binocular parallax effect on a planar display device and advantageously allows the display of opaque images. This applies to all embodiments in which the lens has optical power to be described below.

Figure 10A:
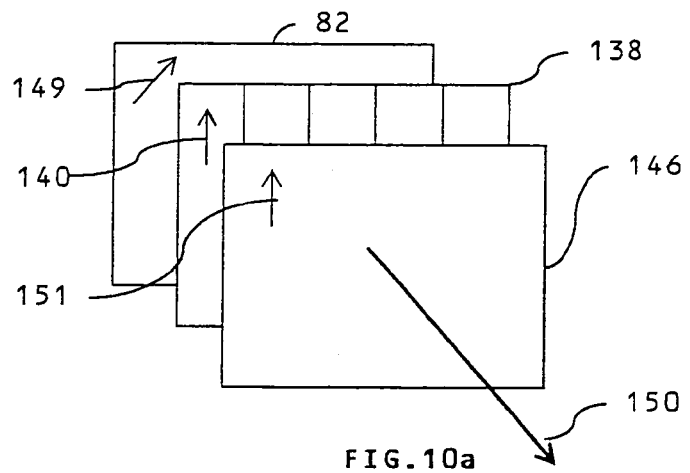
FIG. 10a shows the polariser configurations for the 3D mode of the display of FIG. 9b.

FIG. 10a shows in expanded form the propagation of light from the LCD output polariser to the observer in a 3D mode of operation. The LCD output polariser 82 has a direction 149 of maximum transmission at 45 degrees to the vertical; the birefringent microlenses 138 have a direction of the birefringent material optical axis 140 at 0 degrees; and here the polarising modifying device 146 comprises a linear polariser, acting as an analysing polariser, with a direction 151 of maximum transmission of 0 degrees. The light is directed to the observer along the direction 150.

Figure 10B:
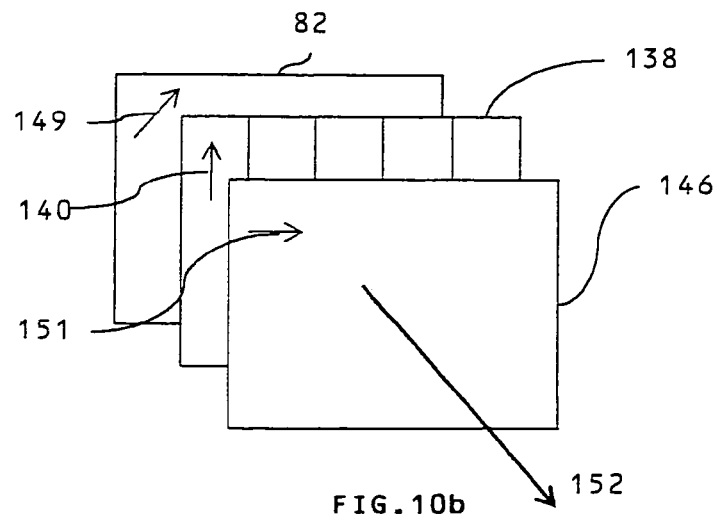
FIG. 10b shows the polariser configurations for the 2D mode of the display of FIG. 9b.

FIG. 10b shows in expanded form the propagation of light from the LCD output polariser to the observer in a 2D mode of operation. The LCD output polariser 82 has a direction 149 of maximum transmission at 45 degrees to the vertical; the birefringent microlenses 138 have a direction of the birefringent material optical axis 140 at 0 degrees; and the polarising modifying device 146 (i.e. linear polariser acting as an analysing polariser) is now switched by being positioned now with a direction 151 of maximum transmission of 90 degrees. The light is directed to the observer along the direction 152.

FIG. 10 shows the method of operation of the birefringent microlenses in the 3D and 2D modes. The microlenses formed from a combination of the microstructure and the birefringent material in this case are lenticules, that is they are cylindrical lenses with a vertical axis of symmetry. Such an arrangement can provide horizontal parallax only, which is sufficient for many autostereoscopic applications due to the generally horizontal separation of the viewer's eyes. This invention can also be applied to two dimensional arrays of lenses.

Figure 6:
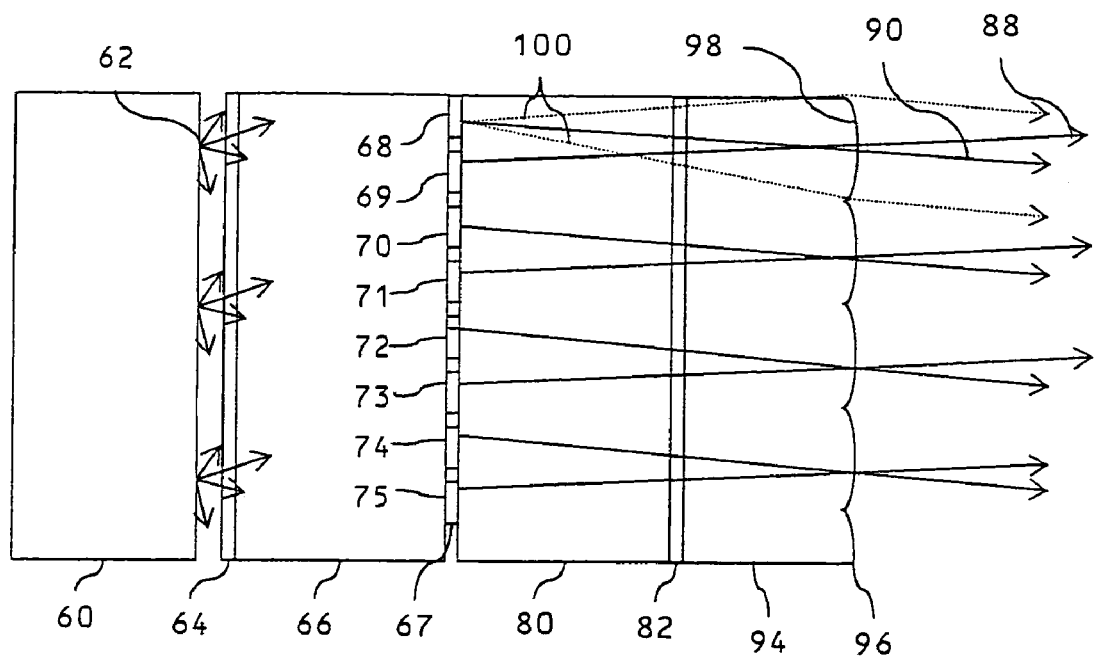
FIG. 6 shows the structure of a lenticular screen display.

The output polarisation direction for light from transmissive TFT TN-LCDs is generally set at or near to 45 degrees to the vertical. The light incident on the microlenses in FIG. 10a can be resolved in to vertical and horizontal linear polarisations. The vertical polarisation state sees the extraordinary axis of the birefringent material and the polymer index. As these indices are different, the curvature of the lens has an optical effect and the lens function is present. The lenticules then generate the windows in the viewing space, as described in FIG. 6. If a linear polariser whose transmission axis is placed vertically is positioned after the birefringent microlens array, then the light that is analysed in the viewing space is that which is directed to the viewing windows, and thus a 3D image is generated. In this mode, the directional distribution is the 3D directional distribution.

In the horizontal axis, the resolved output linear polarisation state from the LCD sees the ordinary index of the birefringent material. As this is index matched to the polymer material, then no index change is seen at the interface, and the lens has no function in this polarisation state. Thus, if an output polariser is positioned whose transmission axis is horizontal as shown in FIG. 10b, the output light which is provided is that component of the light that has not been substantially modified by the microlens array and thus no windows will be generated and the display will appear to be a full resolution 2D display with substantially no modification to the directional distribution of the base panel.

The invention is not limited to the transmissive mode of operation of the device. In general the display device may employ any type of spatial light modulator to modulate the light output by each pixel, including transmissive, emissive or reflective, or even a combination thereof. The display can be configured with a mirror as part of the backlight structure, so that light incident through the front of the display is reflected back through the display to the observer.

The invention is not limited to the TFT TN-LCD effect. Other effects including, but not limited to In-Plane-Switching (IPS), vertically aligned (VA), Advanced Super View (ASV), and emissive displays such as electroluminescent, organic electroluminescent, plasma, plasma addressed liquid crystal, vacuum fluorescent may be used.

Polarisation Modifying Device 146 (i.e. Switchable Polariser)

In the embodiments described above, the switchable polariser, i.e. the polarisation modifying device 146, simply comprises a linear polariser, which is switched by being mechanically repositioned or rotated between two positions by 90 degrees as described above. However, in many applications displays are rectangular, substantially rectangular, or some other shape with an aspect ratio other than 1:1. In such cases, the polariser cannot be made to match the display shape if it is to also be moveable between the two switchable positions described above. This problem is addressed by further embodiments described below which provide arrangements whereby the polarisation modifying device requires to be repositioned in a way that preserves the positioning of the area of the polarisation modifying device 146 with respect to the shape of the display. In yet further of the embodiments described below, the polarisation modifying device 146 is implemented in an electrically switchable form.

Figure 11A:
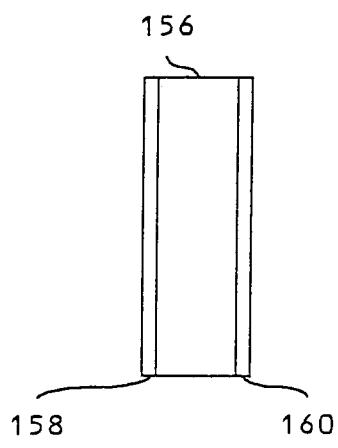
FIG. 11a shows in plan view one analysing polariser configuration.
Figure 11B:
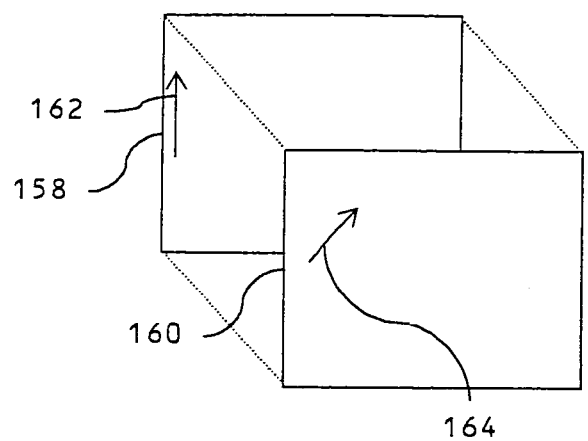

FIG. 11 shows one configuration of a polariser stack that could be used for the polarisation modifying device 146. FIG. 11a shows a plan view of the device. A substrate 156 has a polariser 158 attached on one side and a half waveplate 160 attached on the other. FIG. 11b shows schematically the orientation of the axes of the components in the device. The polariser 158 has an axis of maximum transmission 162 at 0 degrees to the vertical, while the half waveplate 160 has an effective birefringent optical axis direction 164 at 45 degrees to the vertical.

The polariser stack comprises a linear polariser whose transmission axis is positioned vertically, a mounting substrate, that could be a non-birefringent plastic for example and 90 degree polarisation rotating element which could be for example a broadband half waveplate whose birefringent optical axis is positioned at 45 degrees to the vertical. The waveplate serves to rotate a linear polarisation through twice the angle of the incident polarisation to the birefringent optical axis direction. The half waveplate thus has a 90 degree polarisation rotation function. The half waveplate can be replaced by another type of 90 degree polarisation rotating element such as a twisted nematic cell.

Figure 12A:
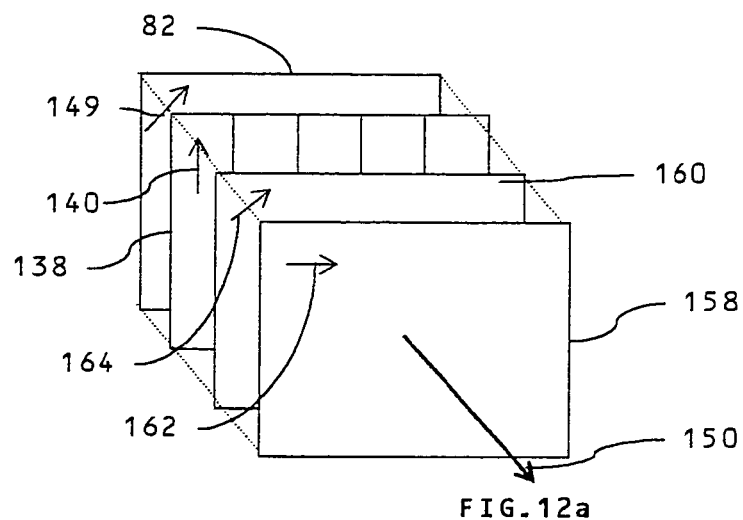
FIG. 12a shows the polariser configuration for the 3D mode using the polariser configuration of FIG. 11.

FIG. 12a shows the configuration of the display in the 3D mode. The LCD output polariser 82 has a transmission axis 149 of 45 degrees (to the vertical) and is followed by the birefringent microlenses 138 which have an optical axis direction 140 at 0 degrees to the vertical, which is followed by the half waveplate 160 with a birefringent optical axis direction 164 of 45 degrees and a polariser 158 with a maximum transmission axis direction 162 of 90 degrees to the vertical. The 3D output directional distribution 150 is towards the observer (not shown).

Figure 12B:
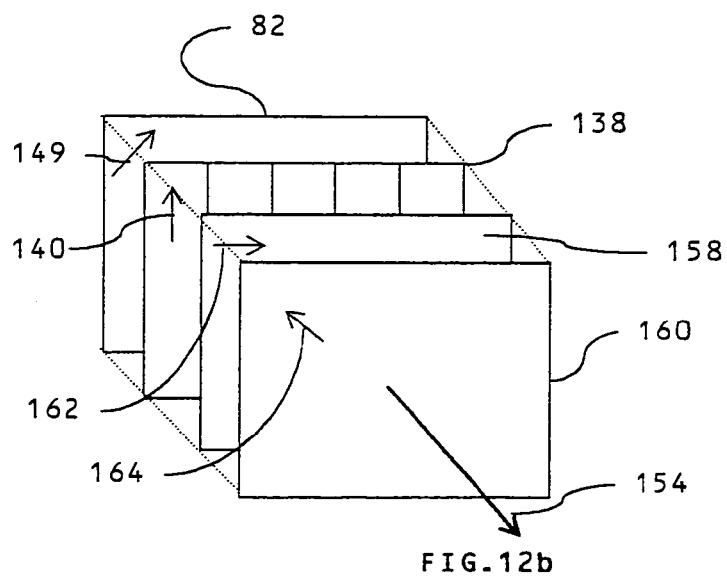
FIG. 12b shows the polariser configuration for the 2D mode using the polariser configuration of FIG. 11.

FIG. 12b shows the configuration of the display in the 2D mode. The LCD output polariser 82 has a transmission axis 148 of 45 degrees and is followed by the birefringent microlenses 138 which have an optical axis direction 140, which is followed by the polariser 158 with a maximum transmission axis direction 162 of 90 degrees to the vertical and subsequently by the half waveplate 160 with a birefringent optical axis direction 164 of −45 degrees. The 2D output directional distribution 154 is towards the observer (not shown).

FIG. 12a shows the use of the polariser stack in the configuration equivalent to FIG. 10a. The 3D output from the display is in the vertical polarisation, the half waveplate rotates this polarisation to the horizontal and the output polariser transmits this polarisation state. The 2D output which is horizontal from the LCD, is rotated to vertical by the half waveplate and is extinguished by the output analysing polariser.

FIG. 12b shows the polariser configuration for the 2D mode in which the analysing polariser stack is removed from the display, rotated about a horizontal or vertical axis and placed back on to the front of the display. The analysing polariser 162 then extinguishes the vertically polarised light from the birefringent microlens 138 which sees a lens function and transmits the horizontally polarised light which does not see a lens function. The output polarisation is then incident on the half waveplate, but as there is no subsequent polariser, this has no useful function on the display output. Thus, in this orientation, the display has a full resolution 2D image.

The orientation of the half waveplate and polariser in FIGS. 11 and 12 may be reversed so that the half waveplate is used in the 2D mode rather than the 3D mode and vice versa. The optimum choice is made by considering the spectral polarisation properties of the half waveplate. Multiple stack half waveplates may be used to improve performance in both orientations.

In the embodiments described, the output polarisation of the LCD is defined to be 45 degrees. The invention is not limited to this and the angle may be arbitrarily set in the optimum design of the unmodified display. The angles of the components in the remainder of the system are adjusted accordingly. Thus, the birefringent optical axis may no longer be aligned parallel to the elongate axis of the lenticules. The birefringent optical axis is set relative to the output polarisation of the LCD such that the input polarisation is analysed in to the two orthogonal components.

Figure 13:
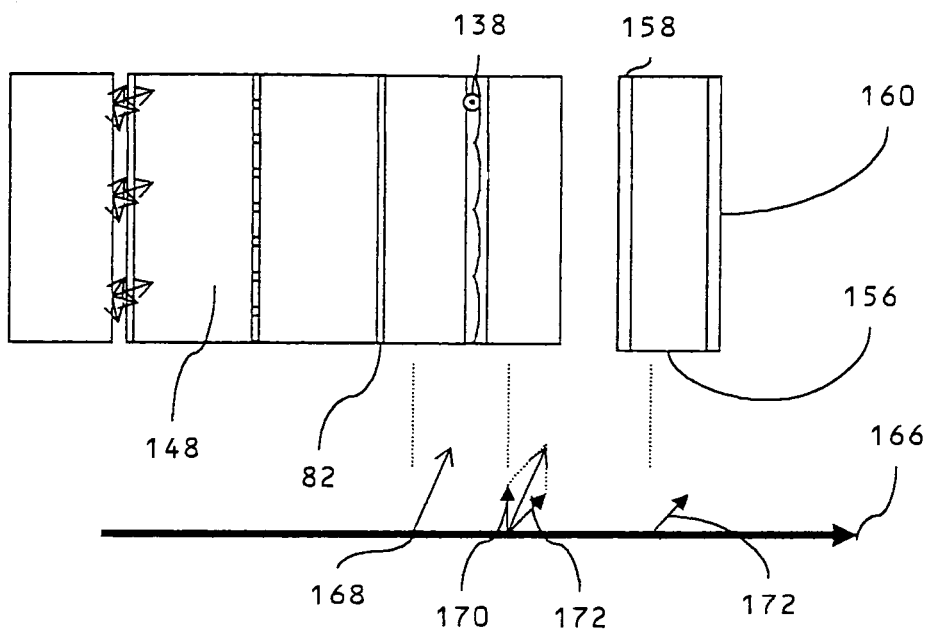
FIG. 13 shows the analysing polariser configuration in the 2D mode.
Figure 14:
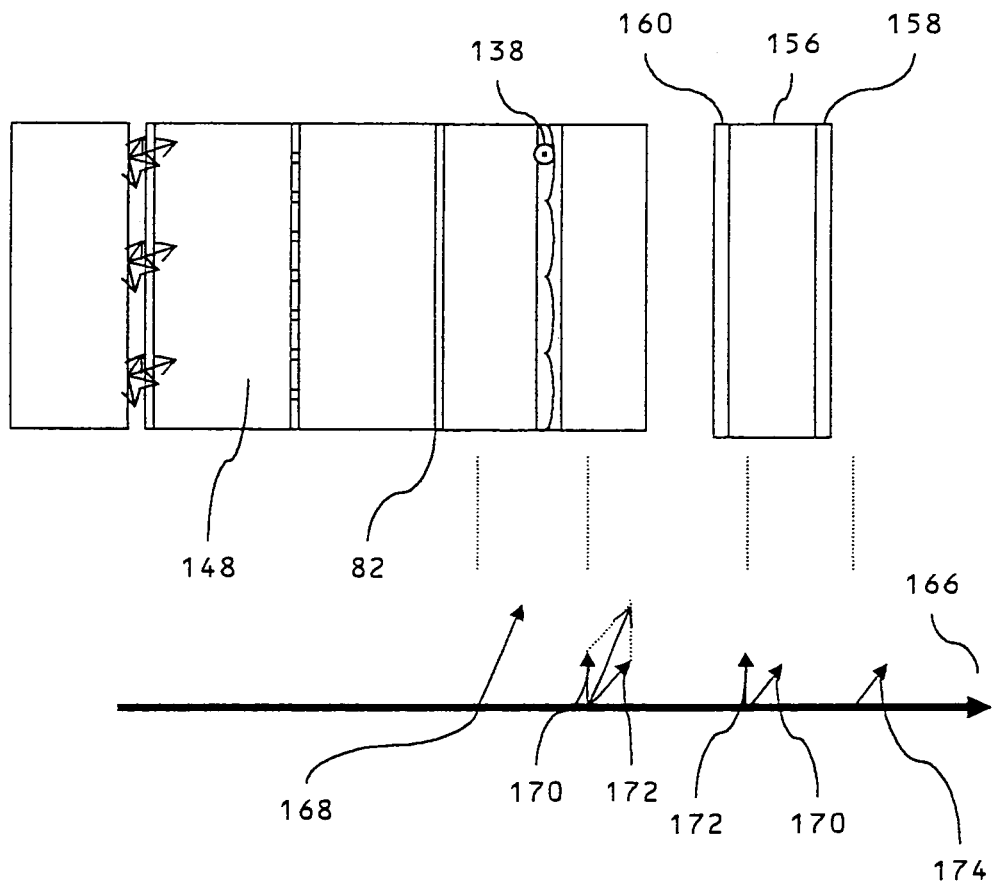
FIG. 14 shows the analysing polariser configuration in the 3D mode.

FIGS. 13 and 14 show alternative representation of the propagation of polarised light through the stacks for 2D and 3D modes respectively.

In FIG. 13, the directional display 148 is followed by the polarisation modifying device 146 which comprises a polariser 158, substrate 156 and half waveplate 160. The light is shown as propagating along the direction 166. After the output polariser 82, the light 168 is polarised at 45 degrees. After the birefringent lens 138, the light can be resolved in to two components. The vertical component 170 sees the lens function and therefore contains the directionality information for the 3D mode. The horizontal component 172 does not see the lens function and thus contains the directionality information for the 2D mode. The polariser 158 extinguishes the vertical polarisation state 170 and allows the horizontal polarisation state 172 to pass. The output waveplate 160 will modify the phase of the output polarisation state, but as human vision is not polarisation sensitive, no effect will be seen by the user of the waveplate 160, giving a 2D output with the corresponding 2D directional distribution.

In FIG. 14, the directional display 148 is followed by the polarisation modifying device 146 which comprises a polariser 158, substrate 156 and half waveplate 160. The light is shown as propagating along the direction 166. After the output polariser, the light 168 is polarised at 45 degrees. After the birefringent lens 138, the light can be resolved in to two components. The vertical component 170 sees the lens function and therefore contains the directionality information for the 3D mode. The horizontal component 172 does not see the lens function and thus contains the directionality information for the 2D mode. The waveplate 160 rotates the vertical polarisation 170 to horizontal and the horizontal polarisation 172 to vertical. The polariser 158 extinguishes the vertical polarisation state 172 and allows the horizontal polarisation state 170 to pass giving a 3D output.

Figure 15A:
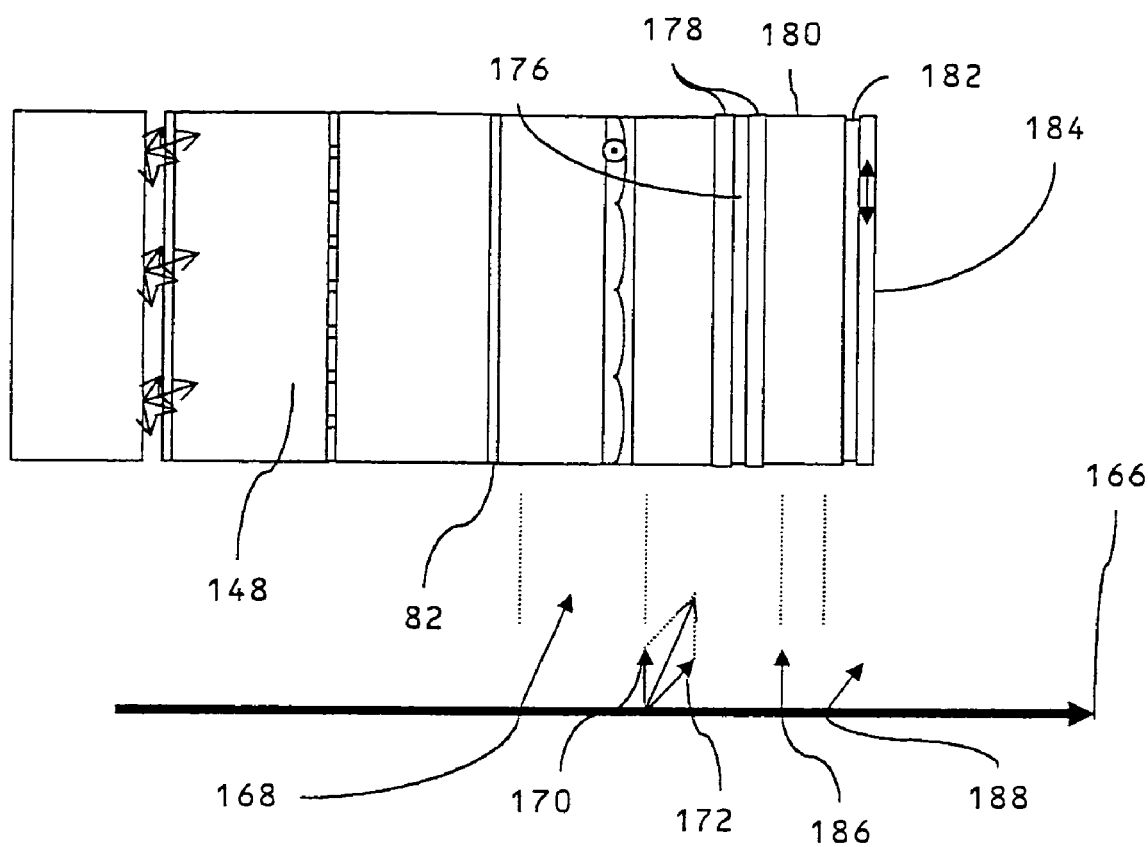
FIG. 15a shows the analysing polariser configuration for an electronically switchable waveplate.

Turning now to a further embodiment, FIG. 15a shows the directional display 148, followed by another form of implementation of the polarisation modifying device 146, comprising a switchable waveplate 176 and a linear polariser 184. These may be structurally mounted in any suitable manner, here they are structurally mounted as follows. The switchable waveplate 176 is sandwiched between a pair of transparent electrodes 178 which are attached to the display 148 and to an electrode substrate 180. An optional waveplate (or film) 182 to provide correction (which may be Pan-charatnam correction) of polarisation rotation is attached to the electrode substrate 180; and the linear polariser 184 is attached to the optional waveplate (or film) 182. This may advantageously increase the viewing angle of the display.

The propagation of light through the system for the 3D mode is also shown. The light is shown as propagating along the direction 166. After the output polariser 82, the light 168 is polarised at 45 degrees. After the birefringent lens 138, the light can be resolved in to two components. The vertical component 170 sees the lens function and therefore contains the directionality information (or directional distribution) for the 3D mode. The horizontal component 172 does not see the lens function and thus contains the directionality information (or directional distribution) for the 2D mode. In the 2D mode of operation, the optical axis of the switchable waveplate 176 is aligned parallel to the horizontal input polarisation, and therefore imparts no rotation on the polarisation states outputted from the birefringent microlenses. The optional waveplate 182 function serves to improve the chromatic and viewing angle performance of the waveplate, and its function is well known in the art so will not be described here. The horizontal polarisation state (carrying 2D directionality information) is then transmitted through the output polariser.

In the 3D mode of operation, the switchable waveplate 176 is electrically controlled such that its optical axis is at 45 degrees to the vertical. The switchable waveplate 160 rotates the vertical polarisation 170 to horizontal and the horizontal polarisation 172 to vertical. The polariser 184 extinguishes the vertical polarisation state 172 and allows the horizontal polarisation state 170 to pass giving a 3D output.

Figure 15B:
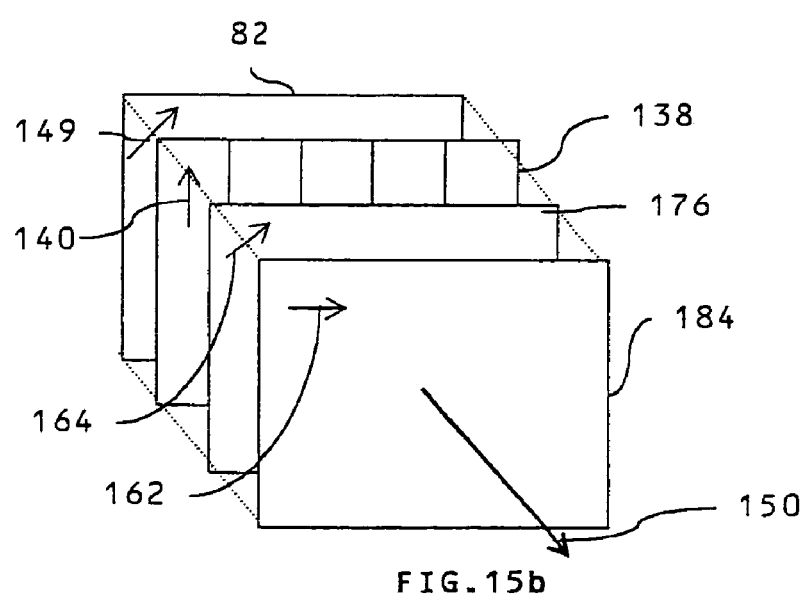
FIG. 15b shows the schematic front section of the configuration of FIG. 15a operating in the 3D mode.
Figure 15C:
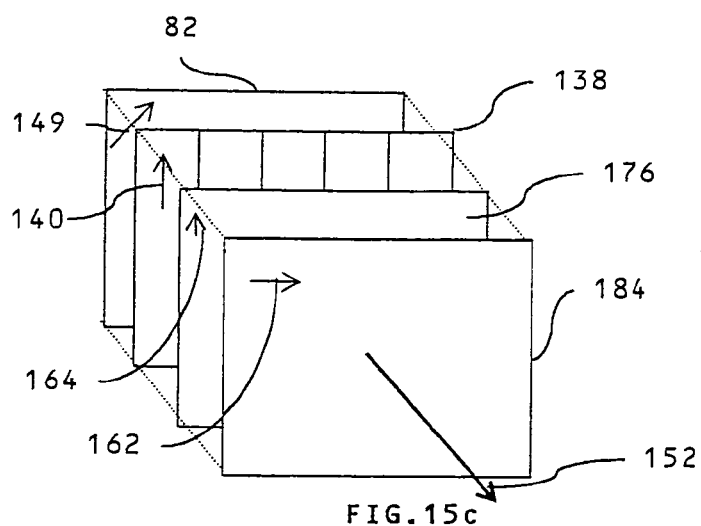
FIG. 15c shows the schematic front section of the configuration of FIG. 15a operating in the 2D mode.

FIG. 15b shows schematically the propagation of light from the LCD output polariser 82 through the birefringent lenses 138, switchable waveplate 176 and output analysing polariser 184. The electrodes and optional waveplate (for example for Pancharatnam correction) are removed for convenience of description. In the 3D mode of operation the half waveplate 176 has a 45-degree birefringent optical axis direction 164. In the 2D mode of operation as shown in FIG. 15c the half waveplate 180 has a 90-degree birefringent optical axis direction 164.

Thus here the mechanically switched element has been replaced by an electronically switched 90-degree rotation function such as a liquid crystal layer positioned between transparent electrodes (such as Indium Tin Oxide, ITO). In one mode of operation, an electric field is applied across the device such that it optical axis is in one direction. In a second mode of operation, the field is changed or removed and the optical axis of the device is changed to a different orientation.

The 90 degree rotation function may be a switchable half waveplate, for example a Ferro-Electric LC cell or nematic electrically controlled birefringence cell. Optionally, the device may be a guided mode device, such as a TN cell. Such devices are well known in the art.

In order to improve the spectral and/or viewing angle performance of this active device it may be combined with passive waveplate components such as appropriately oriented half waveplates as for a 'Pancharatnam' configuration. Combinations of waveplates for broadband performance are disclosed for example in Proc. Ind. Acad. Sci. vol41 No.4, section A, pp 130, S. Pancharatnam "Achromatic Combinations of Birefringent Plates", 1955.

In the following discussion, it is assumed that the 90 degree rotation device operates as a half waveplate. In a non-Pancharatnam configuration, the switchable waveplate extraordinary axis orientation is 0 or 45 degrees. In a Pancharatnam configuration, the switchable waveplate orientation may be for example +/−22.5 degrees and the passive waveplate may be for example 67.5 degrees.

In prior art systems, the birefringent lenses themselves comprise for example a liquid crystal material sandwiched between a microstructure and a plane substrate with electrodes placed on each surface. This produces switchable lenses in order to make an electronically switchable 2D/3D display. However, these lenses show poor optical quality in both modes (such as disclinations of the liquid crystal material), and require deposition of complex electrode structures on the microstructured surface. These lenses will also exhibit temperature dependent performance due to the variation of birefringence of the liquid crystal material indices with temperature. These lenses will also produce diffuse frontal scatter effects due to reflection of light from the curved lens surfaces which are coated in partially reflective electrode material such as ITO. The diffuse scatter will serve to degrade the contrast of the display when used in brightly lit environments.

However, in the above electrically switched embodiments of the present invention, the apparatus comprises a separate polarisation sensitive imaging element and an active polarisation switching element. An advantage of this is that a standard commercially proven thin-cell switching element can be used which has a low level of complexity and cost to manufacture which alleviates the problems associated with switching the lenses directly. Such a device can also operate over a wide temperature range and has reduced scatter due to reflections from the curved lens surface. It can also use standard cell spacing techniques. It does not need to take account of different electric field strength as a consequence of the physical relief of the microstructure.

The passive birefringent microlens is also simpler to manufacture and does not need to be compatible with electronic driving schemes using electrode layers. In particular, the refractive index properties of the birefringent material can be substantially set during curing if a cured LC material is used. This means that as the temperature of operation varies, the index of the substrate and LC material will be maintained substantially the same. In a device with nematic phase material (as typically required for the prior art approach of an electrically switched lens), a change in the refractive index of the material will occur with temperature. This will result in a variation of the property of the lens with temperature, which relies on index matching to achieve a 2D mode, and a defined focal length to achieve a 3D mode. Thus, the regime of operation of the lens in 2D and 3D modes may be limited compared to the present invention.

A further advantage of the separate switched 90 degree rotator element of this embodiment is that it can be conveniently manufactured using proven LC cell spacing techniques when compared to spacing the LC cell when one substrate is highly structured (e.g. a microlens). In addition the electrical contacts on the microstructure surface may make the cell more likely to make unwanted electrical contact across the cell. The attachment of the electrode layer may be less robust on the curved surface making it more prone to electrode flaking. The variation in electric field strength may need to be accounted for which may make the device thicker. Fabrication of segmented elements is more difficult on a microstructured surface. This makes the fabrication of segmented elements more feasible.

Figure 16:
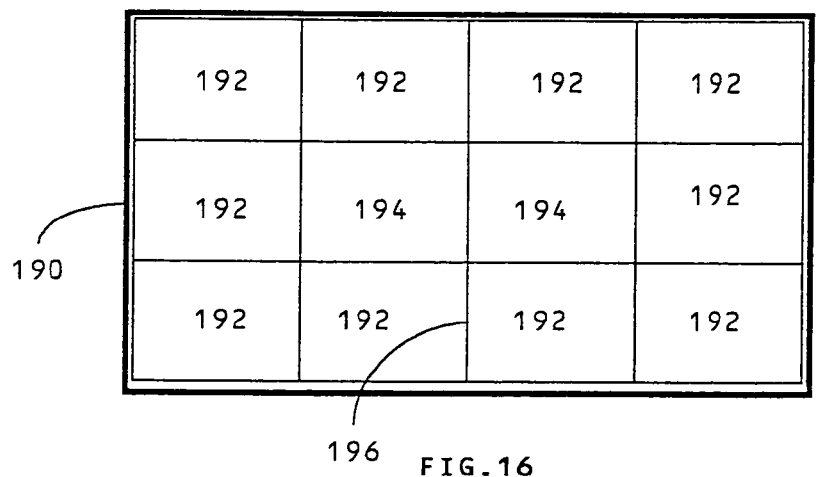
FIG. 16 shows the segmented switchable waveplate.

FIG. 16 shows a segmented active polarisation rotation switching element. The total display area 190 can be divided in to sections in which the polarisation rotation can be either 0 degrees or 90 degrees. In this way, the display can comprise regions 192 of full resolution 2D images and regions 194 of directional 3D images. This may be useful for adding 2D text around a 3D image for example. In the display of the present invention, these regions will have substantially equal brightness which is a particular advantage of this invention. The sections are provided by segmented electrodes, with gaps therebetween. This segmented approach may be applied to other electrically switched forms of the polarisation modifying device 146.

Figure 17:
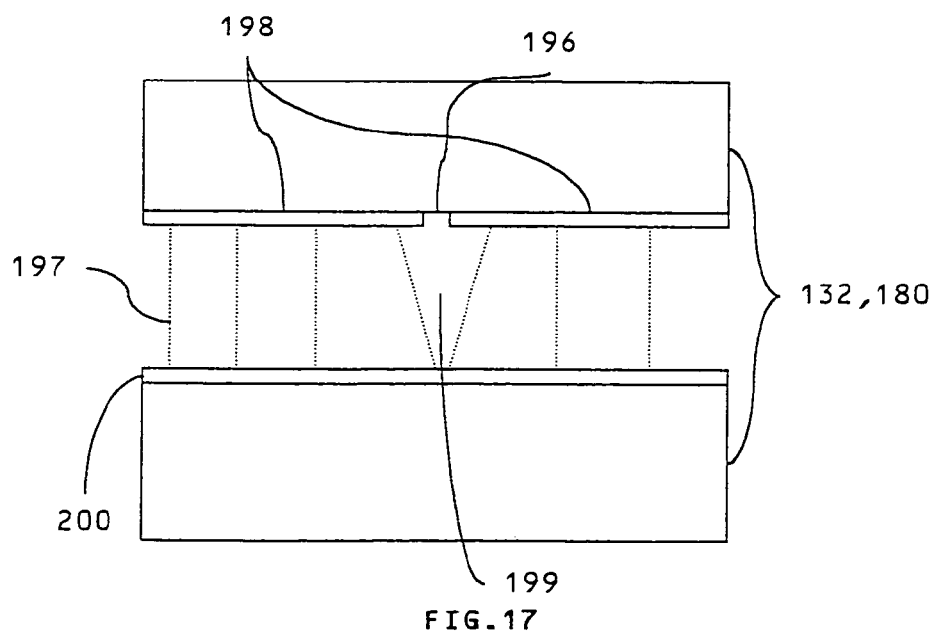
FIG. 17 shows the effect of gaps between the electrodes in the switchable waveplate.

FIG. 17 shows a detail in cross section of the display of FIG. 16 in the region of a gap 196 between two segmented 198 electrodes on one substrate. A uniform transparent electrode 200 is provided on the opposite substrate. A gap 196 is formed between the two segmented electrodes 198 to prevent conduction between the two segmented portions. Electric field lines 197 are marked. A distorted field region of liquid crystal switching material is formed in the region 199 of the gap between the segmented electrodes.

FIG. 17 further shows the effect of the gap 196 on the device performance (i.e. it forms a distorted field region 199). The output of the display is desirably uniform, particularly in the 3D mode. If the gaps between the segmented electrodes are visible, they will appear as a grid of lines in the plane of the display surface and will result in a visually disturbing artefact in the final image. This is because the gaps would appear to be as a 2D plane artefact interrupting the 3D depth planes and result in visual strain. In a further embodiment this effect is alleviated by orienting the alignment layers and switching of the device such that in the 3D mode, the gaps have the same alignment of the switching material as the electrodes. Alternatively, the gaps may be made to be sufficiently small that the fringing field of the electrodes means that the material is switched across the gap. Such performance can be improved by using a material with a sharp threshold between switched states, such as binary switch state materials (such as ferroelectric liquid crystals). The number of segments can be increased, to increase the flexibility of the positioning of the 3D window in a 2D background.

Birefringent Microlens Array Structure

Figure 18A:
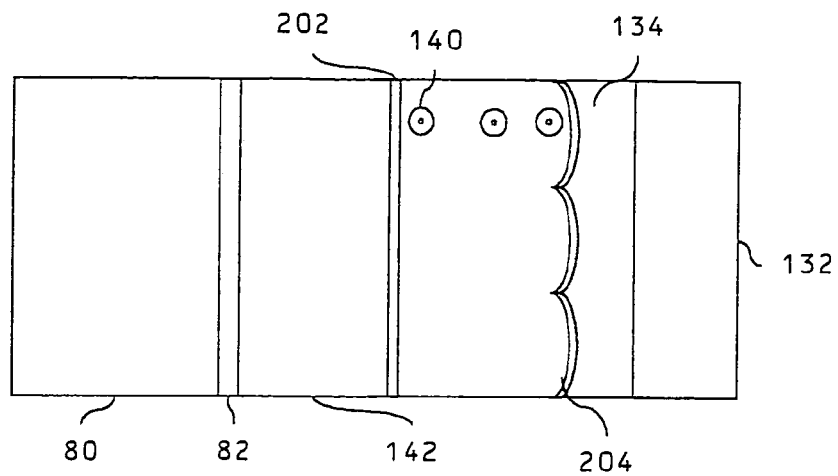
FIG. 18a shows the plan view of the birefringent microlens configuration structure for substantially parallel alignment of the birefringent material at both substrates.

FIG. 18a shows a detail of the construction of one birefringent microlens structure. The LCD counter substrate 80 is followed by the output polariser 82 and the microlens counter substrate 142. An alignment layer 202 is formed on the microlens counter substrate 142 and a second alignment layer 204 on a isotropic lens microstructure 134 which is in turn attached to a lens substrate 132. A birefringent material with a director alignment direction 140 is sandwiched between the alignment layers 202,204 and takes on the alignment of the alignment layers.

Thus, the LCD counter substrate has a polariser (and possibly view-angle correction films well known in the art) attached to its outer surface. The birefringent microlens stack is attached to this surface. The stack comprises a microlens counter substrate with a liquid crystal alignment layer attached to one side.

The birefringent microlenses comprise an array of lenses in which at least one of the lens forming materials is birefringent with a birefringent optical axis direction that is fixed for all the lenses. For example, the lens may be a convex birefringent lens formed by filling the gap between a plane substrate and a concave moulded polymer substrate. The birefringent material can be for example a liquid crystal material which fills the gap and is aligned by means of alignment layers attached to, or on each of the substrates.

The microstructured surface may be embodied for example as structures including individually or in combination cylindrical microlenses, circular microlenses, off-axis lenses, prisms or diffractive structures.

In one embodiment, the refractive index and dispersion of the polymer is set to be substantially the same as at least one refractive indicia (e.g. the ordinary component of refractive index) and/or dispersion for the birefringent material. The polymer and substrate material are substantially non-birefringent. (Thus, in the switched clear state, there is only low visibility of the lens structure).

The birefringent lenses can be formed by: Attach (or form) an alignment layer to (or on) the plane substrate and replicated microstructure surface Filling the gap between the microstructured surface and a plane substrate at elevated temperature with a liquid crystal material. The material will take on the alignment of the alignment layers and the lens will be formed accordingly.

The fill may take place at an elevated temperature. For non-cured type liquid crystal materials the cell may need to be sealed using conventional techniques, for example thermo-setting sealant. Optionally the birefringent material may be cured in a polymer network. The curing may be by known means for example UV light. The birefringent material may be a cured liquid crystal polymer material such as are commercially available, for example RM257 from Merck Ltd.

With a fixed polymer network, the alignment condition need only be correct at the time of manufacture. Also, fixed polymer network material has less variation of refractive indices, with temperature than an uncured liquid crystal material.

The processes for mastering the replicated polymer microstructure (for example by laser scanning of photoresist, diamond ruling, photoresist patterning and reflow) and replicating-optical microstructures (for example by means of hot embossing, injection moulding or UV embossing) are well known in the art. The residual birefringence of this material should be minimised to avoid polarisation cross talk in the output of the microlens stack. Polarisation cross talk would result in mixing of 3D and 2D modes when an output analysing polariser is applied.

The alignment layer may be attached to or formed on the plane and replicated microstructured surface by means of for example spin coating, roll coating, spray coating or evaporated coatings. Each of the alignment layers can be rubbed using standard rubbing techniques well known in the art to produce homogeneous (planar) alignment in which the liquid crystal molecules align substantially parallel to the surface, with a small pretilt to remove degeneracy.

Figure 19A:
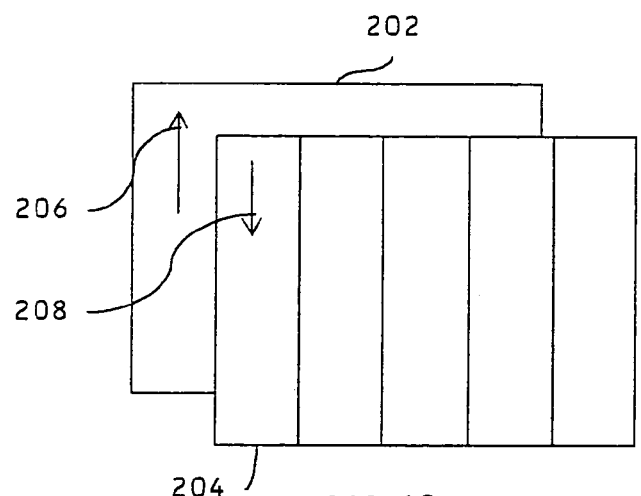

For example as shown in FIG. 19*a* the alignment layers can be homogeneous rubbed alignment layers such as spun polyimide, rubbed anti-parallel to the long axis of the microlenses.

An alignment layer direction and pretilt properties may also be produced using photo-alignment layers with suitable exposure to polarised and unpolarised light as well known in the art. The microlens counter substrate alignment layer 202 has an alignment direction 206 and the microlens substrate alignment layer 204 has an alignment direction 208 which is anti-parallel to 206. The anti-parallel alignment gives a substantially uniform pretilt through the thickness of the cell structure.

The orientation of the rub direction will depend on the output polarisation of the LCD, whereas the orientation of the geometric microlens axis is set to be vertical.

A cylindrical lens describes a lens in which an edge (which has a radius of curvature) is swept in a first linear direction The geometric microlens axis is defined as the line along the centre of the lens in the first linear direction, ie parallel to the direction of sweep of the edge. In a 2D–3D type display, the geometric microlens axis is vertical, so that it is parallel to the columns of pixels of the display. In a brightness enhanced display as described herein, the geometric microlens axis is horizontal so that it is parallel to the rows of the pixels of the display.

Figure 19B:
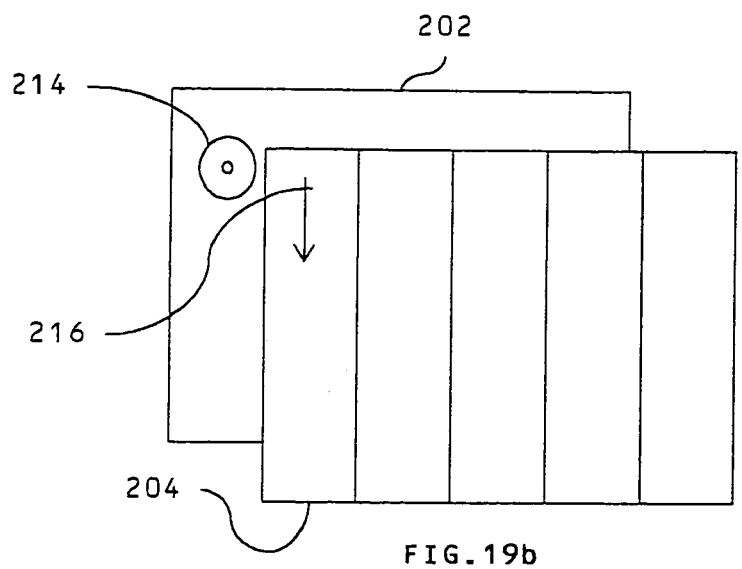
FIG. 19b shows the alignment directions for the configuration of FIG. 18b.
Figure 19C:
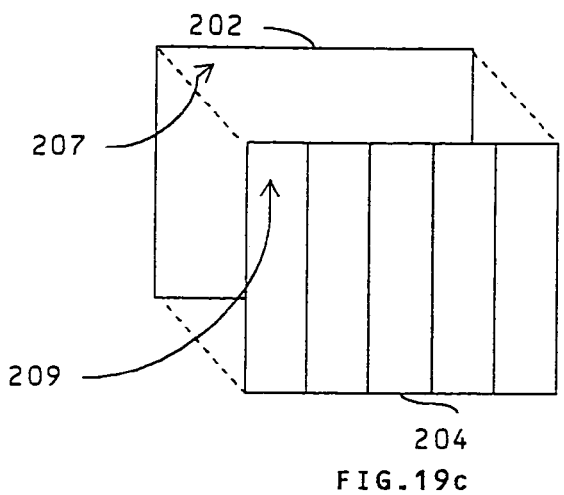
FIG. 19c shows the alignment directions for a birefringent microlens configuration structure for a twisted birefringent material.

In a further embodiment, FIG. 19*c* shows an arrangement for construction of the birefringent lens array. An alignment layer 202 on the microlens counter substrate 142 is arranged so that the orientation 207 of the birefringent optical axis of the liquid crystal material is at 45 degrees to the vertical. At the microstructured lens surface alignment layer 204, the alignment orientation 209 is set to be parallel to the lenses. The output polariser orientation is then at 0 degrees to the vertical for the 3D mode and 90 degrees for the 2D mode. Such a configuration can be applied to the other embodiments described herein.

The embodiment of FIG. 19*c* is particularly advantageous for construction of the lens cell. The commonly used output polarisation direction of well known TFT-LCD devices is set at 45 degrees to the vertical in operation, this polarisation state should be incident on the ordinary or extraordinary optical axis of the birefringent microlens array. One configuration would be to attach or form an alignment layer to or on the microstructured surface which is parallel or anti-parallel to the direction of the output polarisation of the display i.e. at 45 degrees to the vertical. This will be in a different direction to the geometric microlens axis direction.

The alignment of the liquid crystal material at the microstructured surface may be influenced by both the alignment layer formed on it and the microstructured surface itself. In particular the microstructure itself may impart some preferred alignment properties to the liquid crystal material in the birefringent microlenses. This may cause undesirable artefacts in the birefringent microlens structure such as birefringent material disclinations. Such artefacts may degrade the optical performance of the lens, for example through increased levels of scatter, increased image cross talk and reduced image contrast.

It may be advantageous to arrange the alignment layer orientation direction to be substantially parallel to the direction of the geometric microlens axis for cylindrical lenses or substantially parallel to the long axis of other types of asymmetric microstructures. The long axis may for example be defined by the direction of grooves in the microstructure. For alignment layers produced by a rubbing process, good alignment-quality may additionally be easier to achieve by rubbing along the direction of the geometric microlens axis for cylindrical lenses or substantially parallel to the long axis of other types of asymmetric microstructures.

In one embodiment, a waveplate can be used to rotate the output polarisation from the display prior to the birefringent lens such that the polarisation direction of the light falling on to the microlens counter substrate is vertical, and the alignment direction at both substrates of the birefringent microlens is vertical. Thus the disclinations will not occur and the display performance may be improved. However, incorporation of such an element will increase device cost and complexity of manufacture. Additional components between the lens and pixel planes will also increase the viewing distance of the display which is undesirable.

In the embodiment of the invention described in FIG. 19*c*, the alignment direction 207 at the microlens counter substrate alignment layer 202 is set parallel or perpendicular to the output polarisation direction from the LCD, while the alignment direction 209 at the microstructured surface alignment layer 204 is set parallel to the geometric microlens axis direction. The birefringent material thus undergoes a twist of substantially 45 degrees through the thickness of the lens cell. Alternatively for example twist angles of substantially 135 degrees could be used. Such a twist may guide the polarisation direction of the light through the cell, such that the input polarisation to the cell may be at 45 degrees and the output polarisation direction at the microstructured surface at 0 degrees to the vertical. It may additionally be desirable to increase the thickness of the cell such that the optical guiding property in the lens cell takes place over the entire lens surface.

Therefore at the microstructured surface, disclinations as described above are avoided as the microstructured surface alignment is parallel to the direction 209 of the alignment layer 204.

Such an element advantageously reduces the cost and complexity of fabrication of a lens cell for use with conventional TFT-TN LCDs while optimising image quality.

Figure 19D:
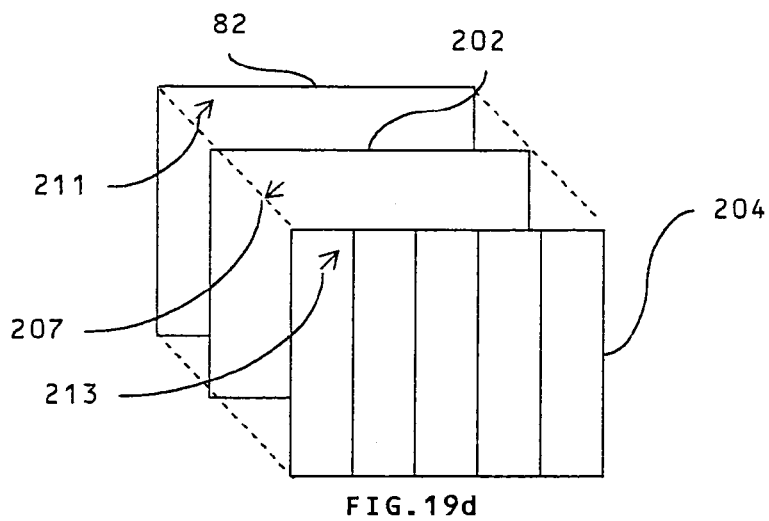
FIG. 19d shows the alignment directions for a birefringent microlens configuration structure for an alignment direction at the microstructured surface not parallel with the geometric microlens axis.

As illustrated in FIG. 19d, this invention is not limited to configurations in which the alignment direction 209 at the microstructured surface is set parallel to the axis of the lens array. The linear output polarisation state direction 211 from the output polariser 82 of a TFT-LCD is aligned parallel to the alignment direction 207 of the microlens counter substrate alignment layer 202. The microstructured surface alignment layer 204 has an alignment direction 213 which is anti-parallel to the direction 207, and is thus inclined at an angle to the geometric niclolens axis of the lenses.

In an alternative embodiment, the microlenses may be tilted at an angle slightly different from vertical in order to increase the effective viewing angle of the display by creating multiple overlapping windows at the viewing plane. In this case, the optical axis of the birefringent material at the microstructure surface may be made parallel to the grooves of the lenses, such that there is a twist in the lens cell. The output polariser modifying element is then oriented parallel or orthogonal to the birefringent optical axis of the material at the surface of the microstructure. Alternatively, the alignment of material in the lenses may be made independent of the axis of the microlenses.

Alternatively, the alignment mechanism may be incorporated as a grooved microstructure such as a diffractive relief structure superimposed on the lens shaped microstructure of the microlenses such that it can be formed during manufacture of the replicated microstructure. This has the particular advantage that it will reduce the cost and complexity of fabrication of the cells. The alignment of liquid crystal using grooved microstructures is well known in the art.

The addition of diffractive structures to microlens arrays is also known in the art, for example S. Traut, H. P. Herzig "Holographically recorded gratings on microlenses for a miniaturized spectrometer array", Opt.Eng. vol39 (1) 290–298 (January 2000). Such structures may be used for the alignment of the birefringent materials on the surface of the microlenses.

A technique of this kind in which a photoresist is coated on to the surface of the microlenses, a diffractive structure is recorded and then a Nickel shim is grown to produce a master for replication can be used to form the microstructured alignment layer on the lens surface. This has the particular advantage that it removes the need for a separate alignment layer. The diffractive structure will ideally have a pitch of the wavelength of visible light or less to avoid diffractive artefacts in the final image.

An alignment layer direction and pretilt properties may also be produced using photo-alignment layers with suitable exposure to polarised and unpolarised light as well known in the art.

FIG. 18a shows the use of two homogenous alignment layers (for example formed by rubbing). During manufacture it may be desirable to fit the optical element following completion of the fabrication of the panel, or following fabrication of the colour filters on the opposite side of the LCD counter substrate. The alignment layers may be parallel or anti-parallel in order to optimise the viewing angle performance of the element.

Figure 18B:
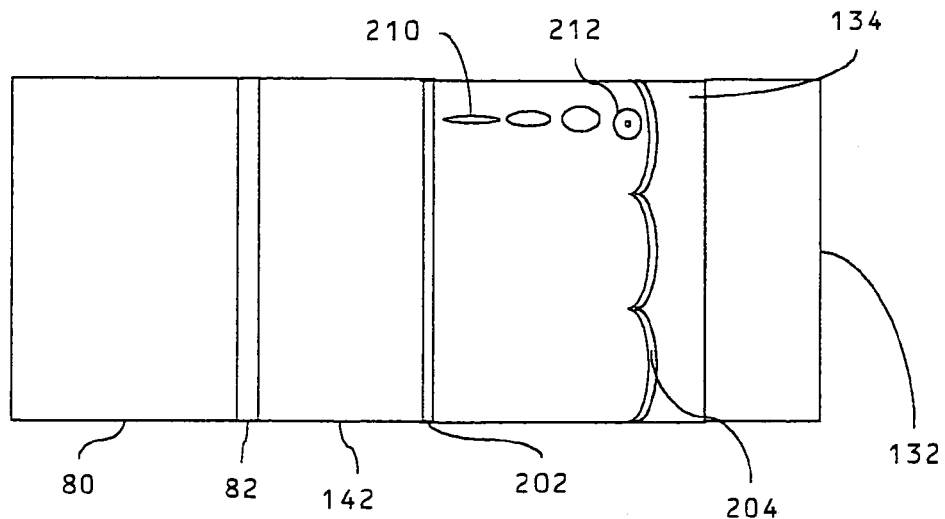
FIG. 18b shows the plan view of the birefringent microlens configuration structure for substantially parallel alignment of the birefringent material at the microstructure substrate and substantially perpendicular alignment at the plane substrate.

FIG. 18b shows the same structure as FIG. 18a, but this time with a homeotropic alignment layer 202 and a homogeneous alignment layer 204. The birefringent molecules 210 at the alignment layer 202 are aligned substantially perpendicular to the surface, while the birefringent molecules 212 at the alignment layer 204 are aligned substantially parallel to the surface.

FIG. 19b shows a schematic view of the alignment layer directions equivalent to FIG. 18b. The microlens counter substrate alignment layer 202 has a homeotropic alignment direction 214 while the microlens substrate alignment layer 204 has a homogeneous alignment direction 216.

As can be seen from FIGS. 18b and 19b, the alignment layer on the counter substrate could be replaced by a non-rubbed alignment layer such as a homeotropic alignment layer. In this case, the alignment of the liquid crystal is substantially vertical at the counter substrate. The replicated microstructure has a homogeneous alignment layer with a pretilt so that the liquid crystal molecules are aligned substantially parallel to the replicated surface. As most of the power of the lens is in the curved surface, such an alignment technique may provide a similar optical performance to the device of FIG. 18a, with some variation of index profile across the lens surface expected. Care should be taken to ensure that the optical axis remains substantially parallel to the desired output polarisation to avoid unwanted phase birefringence effects from the lenses causing disruption to the liquid crystal mode properties.

Figure 18C:
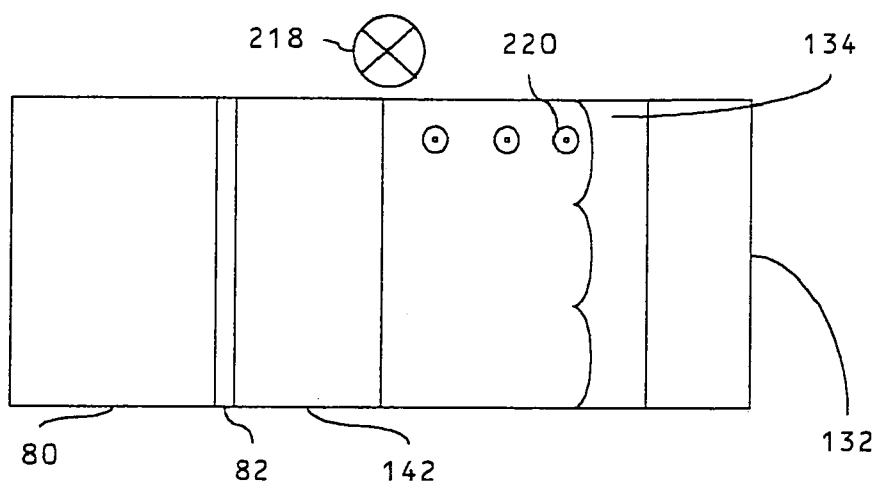
FIG. 18c shows the plan view of the birefringent microlens configuration structure where alignment is produced by an external electric field during manufacture.

FIG. 18c shows the use of an electric field 218 to align the birefringent molecule birefringent optical axis direction 220. Alignment layers described in previous embodiments are omitted.

Figure 18D:
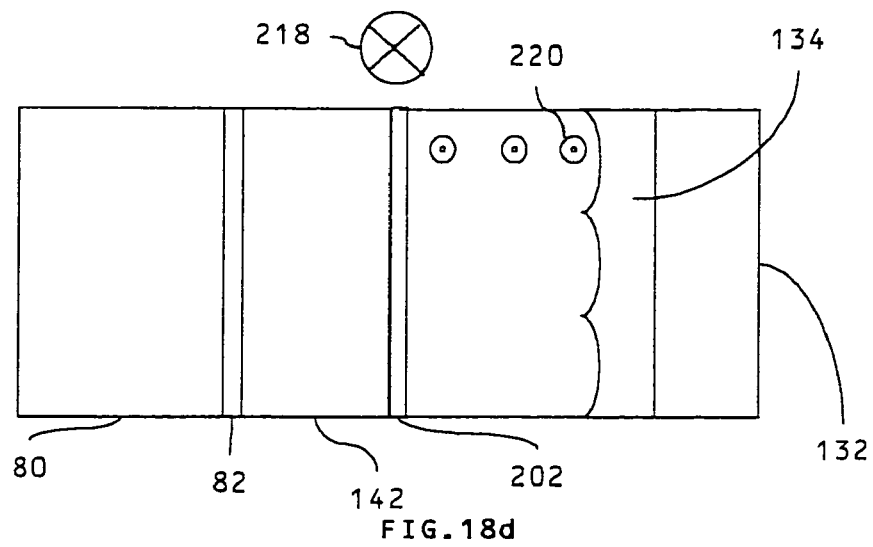
FIG. 18d shows the plan view of the birefringent microlens configuration structure where alignment is produced by a combination of an alignment layer on one surface and an external electric field during manufacture.

FIG. 18d shows the use of a combination of a homogeneous alignment layer 202 on the microlens counter substrate 142 and an electric field 218 to align the birefringent molecules.

Optionally the alignment mechanism may be by means of an electric or magnetic field applied across the device prior and during at least part of the curing of the polymer network. In this case, one or both of the alignment layers may be optionally omitted as shown in FIG. 18c for no additional alignment layers and FIG. 18d for a single additional homogenous alignment layer positioned on the plane substrate as shown, or on the replicated microstructure. The electric and/or magnetic field may be applied by external electrodes to the structure which are not part of the final device. Note that the direction of the electric field is along rather than across the cell for a positive dielectric anisotropy material. For a negative dielectric anisotropy material, the field may be applied across the cell.

Figure 20A:
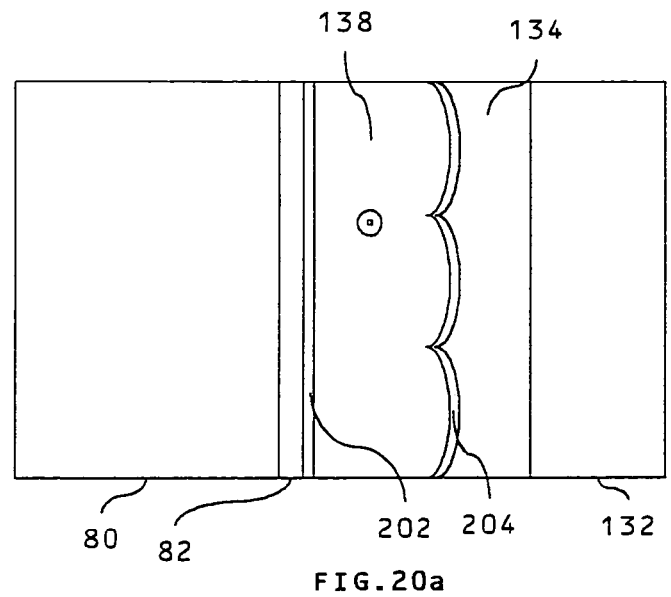
FIG. 20a shows a configuration in which the alignment layer is placed on the output polariser of the display.

FIG. 20a shows the configuration for which the alignment layer 202 is placed directly on the output polariser 82 of the display. The microlens counter substrate 142 has effectively been removed. The alignment layers 202 and 204 may be formed or omitted as described previously. Such a configuration may advantageously reduce the viewing distance of the display.

Figure 20B:
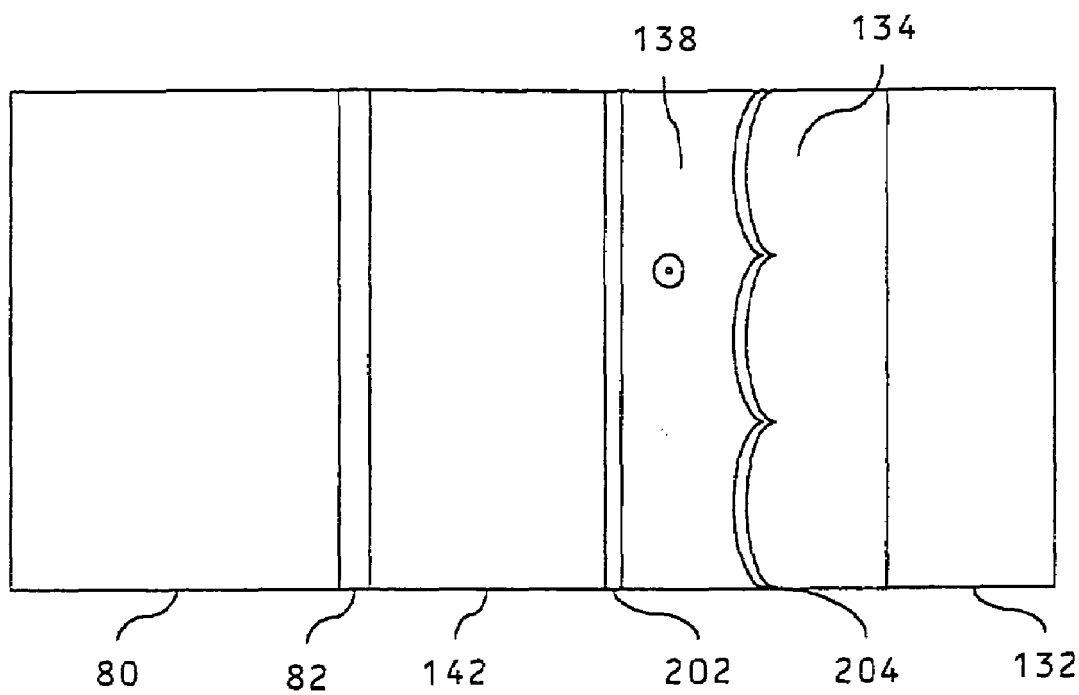
FIG. 20b shows a configuration similar to FIG. 20a in which the orientation of the isotropic lens microstructure has been reversed.

FIG. 20b shows a configuration in which the orientation of the optical surface of the lens microstructure 134 is reversed. In this case, the isotropic polymer material 134 will have a refractive index matched to the higher of the ordinary and extraordinary indices of the liquid crystal material, generally the extraordinary index.

Figure 21:
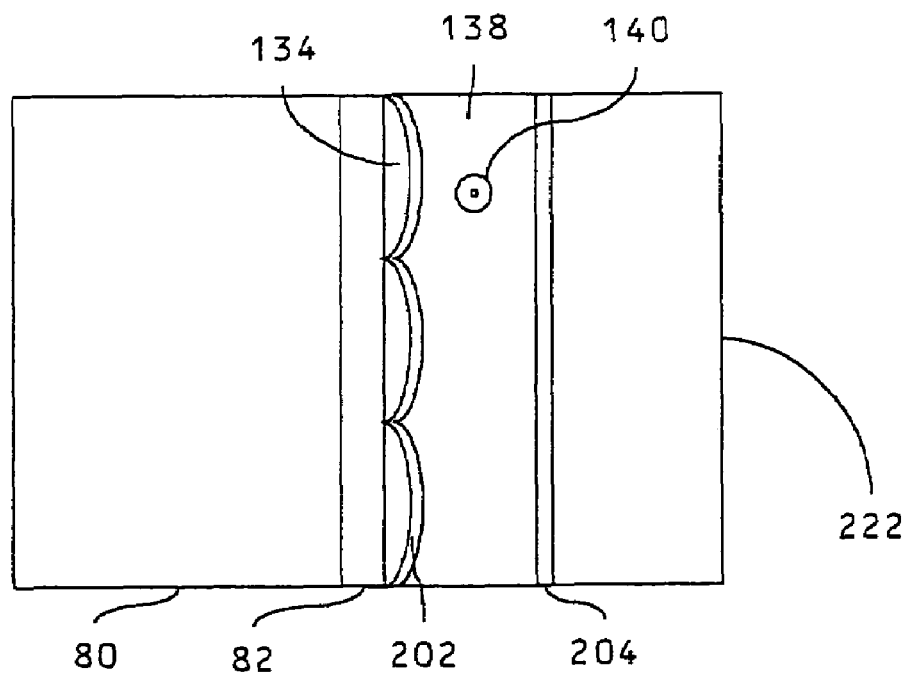
FIG. 21 shows a configuration in which the replicated microstructure is placed on the display and a plane substrate attached.

FIG. 21 shows another configuration in which positive lenses formed in the isotropic microstructure 134 (whose index matches the extraordinary index of the birefringent material 138) are placed on the polariser 82.

Figure 22:
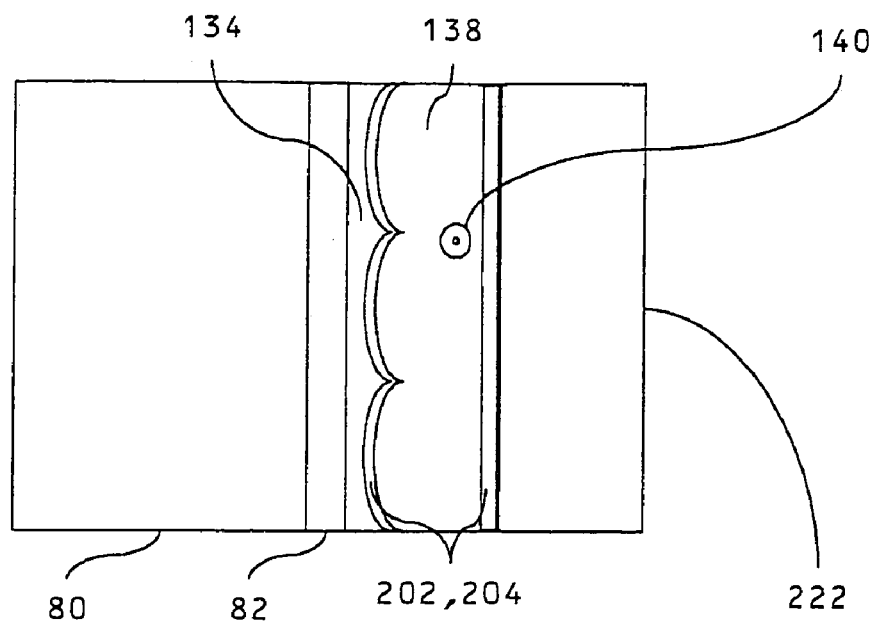
FIG. 22 shows a configuration similar to FIG. 21 in which the orientation of the isotropic lens microstructure has been reversed.

FIG. 22 shows the equivalent situation for negative polymer lenses formed in the isotropic microstructure 134 on the polariser surface 82 in which the index of the isotropic material is matched to the ordinary index of the birefringent material 138.

Electric and magnetic fields to align the birefringent material, in combination with additional alignment layers where necessary can be used in all of the structures described.

In any of the above embodiments, the alignment layers may be photo-alignment layers or obliquely evaporated Silicon Oxide or other well known alignment layers In general, the spacing between the lenses and the planar substrate can be used to set the separation of the two layers and subsequently filled with liquid crystal material. This removes the requirement to use an additional spacer material as required in many conventional LC cells. Specifically, the lenses may be allowed to touch the planar substrate 222 or polariser 82.

The embodiments described above which do not use standard high temperature polyimide as an alignment layer on a substrate, e.g. those shown in FIGS. 18b, 18c, and 18d have an advantage of being able to be processed at low temperatures which increases the range of lens materials which may be used. A further advantage of the non-rubbed alignment layers is that of avoiding rubbing variations that might readily occur since the microlens surface is non-planar.

Alternatively low temperature alignment layer materials may be used, for example from Nissan Chemical Industries, Ltd.

Imaging Properties of the Lenses

The optical design of the lenticular birefringent lens may be implemented according to conventional design approaches and requirements for lenticular screens for 3D displays, which requirements are well known in the art.

Spatial Light Modulator

The embodiments described previously can be implemented on a range of emissive displays in addition to LCDs, for example an electroluminescent display or a plasma display. In most cases, the output of the display requires a polariser to be fitted, followed by the birefringent microlens and the analysing polariser of the light direction switching apparatus.

If the emissive technology is intrinsically polarised, it may be possible to omit the polariser or use a high transmission efficiency clean-up polariser.

The invention can also be applied to reflective and transflective displays such as liquid crystal displays.

Limitations of Two Polariser Birefringent Microlens Display

The previously described embodiments, whilst advantageously (in comparison to prior art devices) avoiding the need to switch the birefringent lens, nevertheless have certain characteristics which may be disadvantageous in some circumstances, as follows.

The embodiments of the invention described above provide switchable lenticular displays in which each of the 2D and 3D modes will only have a brightness which be nominally 50%, typically 40–45% of the brightness of the unmodified display.

Additionally, the nominal viewing distance of such a display is determined by the separation of the liquid crystal display layer and the parallax optical element.

To take an illustrative example, in small handheld displays, viewing distances of order 400 mm are often desirable. A 4.7" VGA stripe pixel configuration display (640×3 horizontal×480 vertical colour pixels) for example has a colour sub-pixel pitch in the lateral direction of 50 microns and height 150 microns. A typical 3D display is required with windows of size 65 mm (equivalent to the nominal human interocular separation). In this case, the spacing between the pixel plane and the aperture of the parallax optic (with refractive index equal to 1.5) will give a viewing distance of 430 mm if a 0.5 mm thick counter substrate is used.

In such arrangements, the spacing between the pixel plane and the optical aperture of the birefringent microlenses must include the polariser thickness and the LCD counter substrate thickness. Thus, for a polariser of thickness 0.2 mm, the LCD counter substrate will be required to be of thickness 0.3 mm. Standard counter substrate thicknesses are 1.1 mm and, 0.7 mm with consideration of 0.5 mm likely. Thus, for small displays, it is likely that the counter substrate glass would be too thin to use currently available mass production materials. However, thinner glass or suitable plastic substrates may become more economically available in the future. Furthermore, other substrates allowing very thin separations that could be used are as developed in the field of LCD projectors which incorporate microlenses allowing separations between the pixel plane and microlens optical apertures of the order 50 microns. The counter substrates are fabricated in glass and replicated photopolymers prior to processing of alignment layers and fitting to the LCD, and thus must be capable of withstanding the processing temperatures. However, even this technique may not always be applicable to the previous embodiments of the invention with thin counter substrates, as known polarisers used in volume manufacturing are not sufficiently stable. This problem with this last aspect is obviated by the following embodiments.

"One Output Polariser" Embodiments

Further embodiments will now be described in which the above described limitations are alleviated. These further embodiments allow the brightness of the display to be nominally 100% of the base panel brightness for both 2D and 3D modes. In addition, the devices of these embodiments are capable of providing short viewing distances using known manufacturing processes. In essence, the birefringent microlens array is positioned within or as an addition to the counter substrate of the LCD, i.e. between the phase modulating layer (i.e. the liquid crystal layer) and a single analysing polariser. Thus, in effect, the roles of the output (analysing) polariser of the basic display and the output (analysing) polariser of the light direction switching apparatus are shared.

Figure 23:
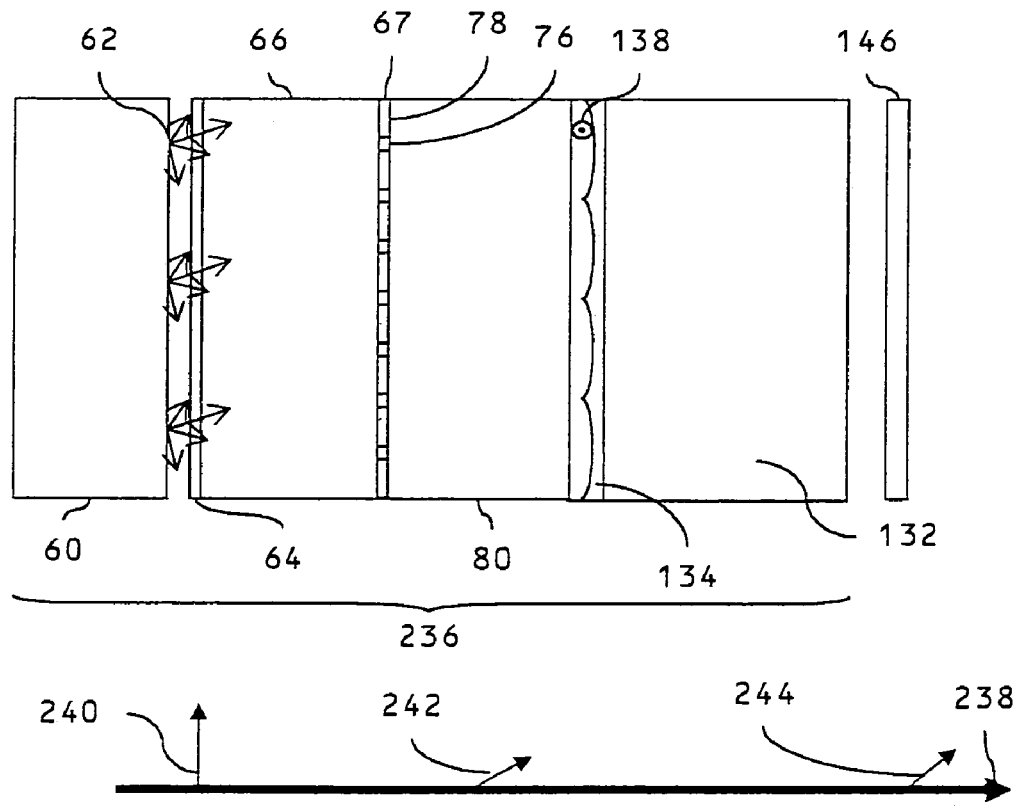
FIG. 23 shows the configuration of an internal microlens system for the 2D mode.

FIG. 23 shows one such further embodiment of a display comprising a backlight 60, producing light output 62 which is incident on an LCD input polariser 64, an LCD TFT substrate 66, an LCD pixel plane 67 comprising an array of pixels arranged in columns and rows followed by an LCD counter substrate 80, an array of birefringent lenses 138, followed by an isotropic lens microstructure 134 followed by a lens substrate 132. The previous items can be grouped as a directional display device 236. Following the directional display device 236, a polarisation modifying device 146 is positioned. Compared to the previously described 'two output polariser' embodiments, the LCD output polariser 82 is omitted.

One illustrative configuration of the operation of the display in the 2D mode is also shown along the propagation direction 238. The polarisation modifying device 146 transmits horizontal linearly polarised light and extinguishes vertically polarised light. The LCD input polarisation 240 is at 90-degrees and is rotated by the ON state of the liquid crystal material in the pixel apertures 78 to a horizontal polarisation (0-degrees angle) 242 by the twisted nematic layer, thereby providing a normally white (NW) mode. In the NW mode ON state, no voltage is applied to the liquid crystal layer. Voltage is applied to switch the output to an OFF state, or intermediate levels. The birefringent microlenses 138 are index matched in this polarisation and so do not impart any directionality to the illumination. The output of the polarisation modifying device 146 is horizontal linear polarisation 244.

Figure 24:
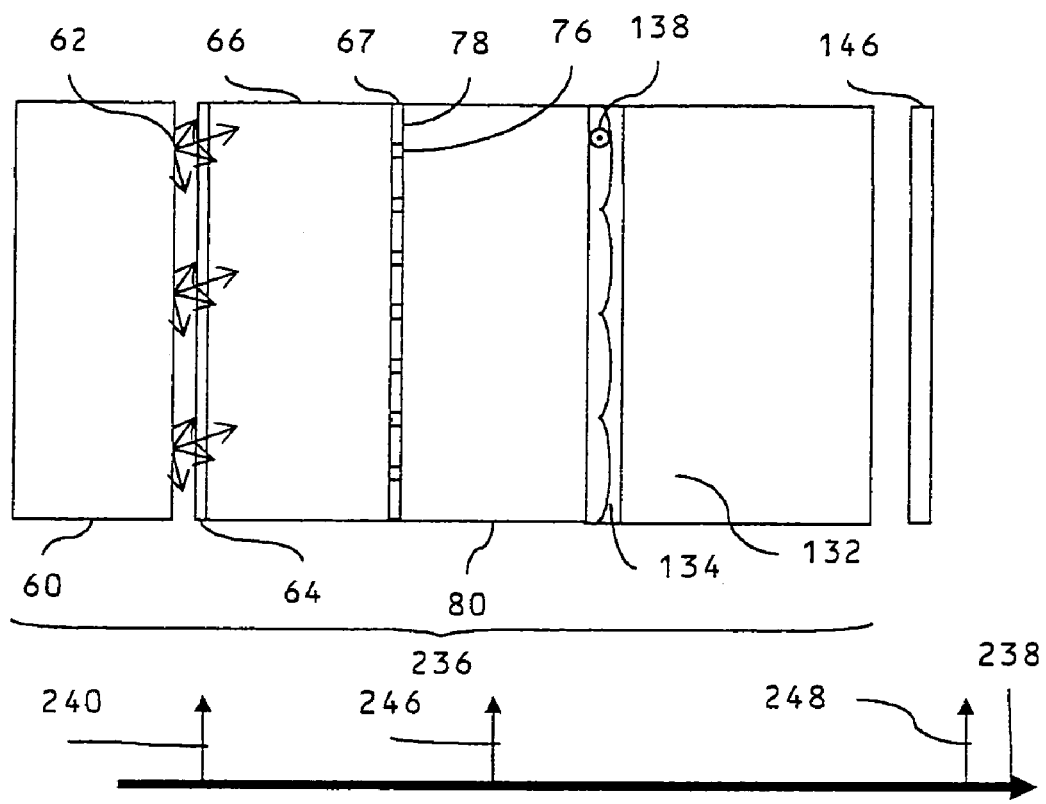
FIG. 24 shows the configuration of an internal microlens system for the 3D mode.

FIG. 24 shows the configuration for the 3D operation of the display along the propagation direction 238. In this case, the polarisation modifying device 146 is arranged to transmit vertically linearly polarised light and extinguish horizontally polarised light. The LCD input polarisation 240 is at 90-degrees and is not rotated by the ON state of the liquid crystal material to a horizontal polarisation (0-degrees angle) 242 by the twisted nematic layer, thereby providing a normally black (NB) mode. In the NB mode ON state, voltage is applied to the liquid crystal layer. Reducing voltage is applied to switch the output to an OFF state, or intermediate levels. The polarisation state 246 incident on the birefringent microlenses 138 is given directionality by the birefringent lens 138. In this case, the polarisation modifying device 146 is configured to transmit vertical linear polarisation state 248, such that the 3D mode illumination structure is transmitted.

Figure 25:
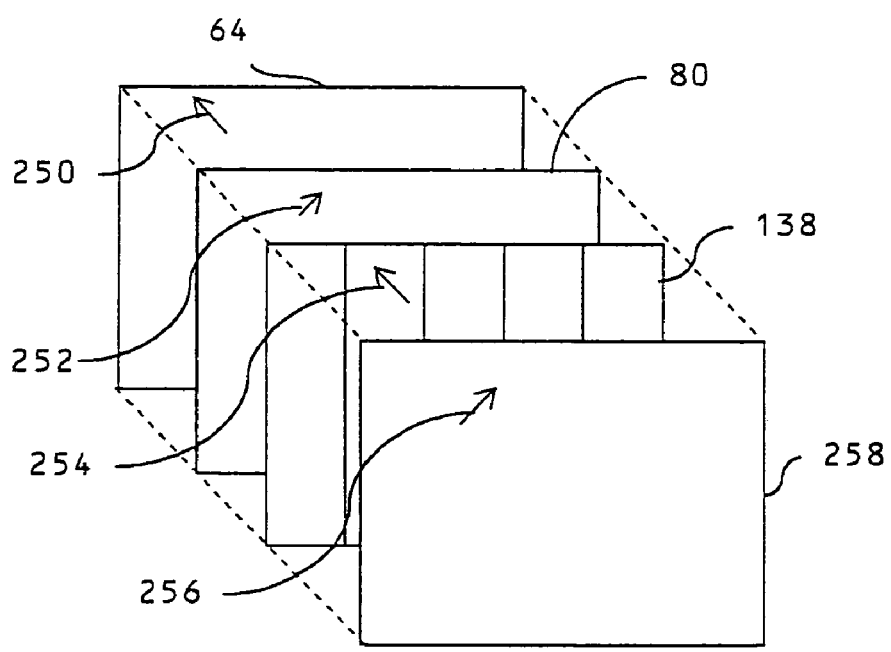
FIG. 25 shows the schematic front section of the internal microlens configuration of FIG. 23.

FIG. 25 shows schematically the operation of this embodiment in the 2D mode. In most standard TFT TN-LCDs, the input polariser 64 is configured with a direction 250 of maximum transmission of −45 degrees so that the phase modulating layer is illuminated with a linear polarisation state at −45 degrees. The output polarisation 252 in the counter substrate 80 following the LC layer is rotated through 90 degrees to +45 degrees for the NW mode ON state (zero volts operation). This polarisation state is incident on the birefringent microlens array 138 whose optical axis 254 is at −45 degrees. The output linear polariser 258 is oriented with a direction 256 of transmission of polarised light at +45 degrees such that the 2D mode illumination structure is transmitted.

The operation of this apparatus is illustrated, in FIG. 25, for illustrative purposes with a TFT TN-LCD, although other phase modulating LC effects may be used. In this case, the operation of the display can be best understood by starting with the display input polariser, which illuminates the phase modulating layer with a linear polarisation state at −45 degrees. For a standard normally white TFT-TN LCD, the zero volts operation of the display gives a nominal 90 degree rotation of this polarisation state (although there is generally some ellipticity in the polarisation state) which is then incident on an output polariser oriented at +45 degrees and is thus transmitted. When a voltage of increasing magnitude is applied to the pixels of the LCD, the phase of the phase modulating layer is adjusted so that the incident polarisation is progressively less rotated until at a sufficient voltage the polarisation of the light is substantially unrotated and is thus extinguished at the output polariser (which is orthogonal to the input polariser).

In the display of this embodiment, the birefringent microlenses are oriented so that their birefringent optical axis direction is aligned parallel to the polarisation axis of the display, in this case at −45 degrees.

For the ON state the polarisation state of the light incident on the birefringent microlenses is such that the lenses have no optical function. This is because the ordinary axis of the birefringent material is index matched to the polymer material. The polarisation state is then transmitted through the output polariser oriented at +45 degrees, as for the standard LCD.

The polarisation state component which is resolved to form the OFF intensity level is unrotated by the phase modulating layer. The emerging polarisation will thus see the lens function. However, the output polariser is oriented to extinguish this light so that the lens function will not be visible in the final display output. Thus, the brightness and the switching properties of the display is not substantially changed by the addition of the birefringent element and polarisation modifying device from the standard display configuration in this mode.

Figure 26:
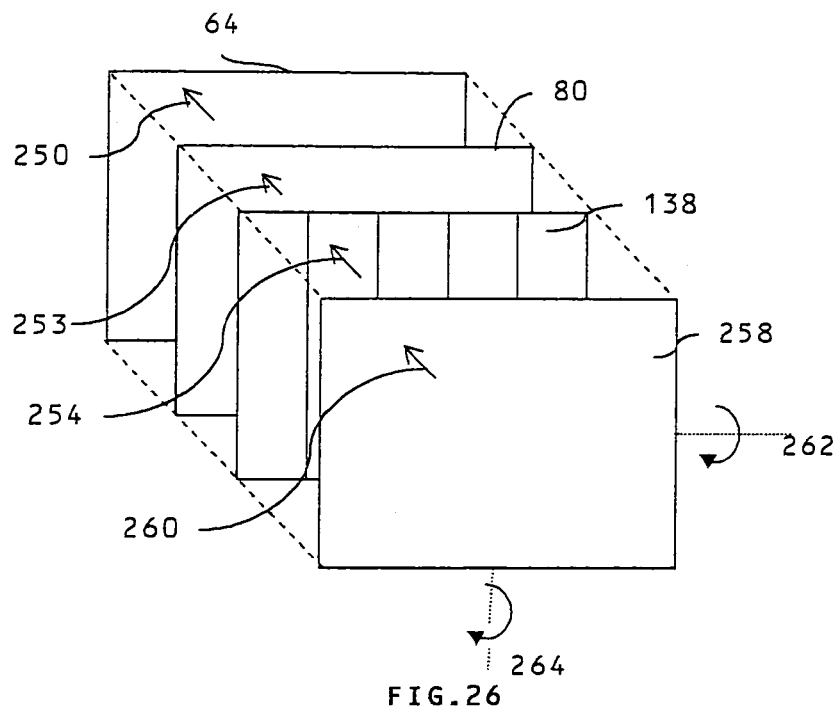
FIG. 26 shows the schematic front section of the internal microlens configuration of FIG. 24.

FIG. 26 shows schematically the operation of the apparatus of this embodiment in the 3D mode. The input polariser 64 is configured with a direction 250 of maximum transmission of −45 degrees. The output polarisation direction 253 in the counter substrate 80 following the LC layer is unrotated for the NB mode ON state. This polarisation state is incident on the birefringent microlens array 138 whose optical axis 254 is at −45 degrees. The output linear polariser 258 is oriented with a direction 260 of transmission of polarised light at −45 degrees such that the 3D mode illumination structure (directional distribution) is transmitted. The polariser 258 may be rotated about a horizontal axis 262 or a vertical axis 264.

Thus, summarising the previous paragraph, the output polariser is adjusted to be at −45 degrees, parallel to the input polariser and the birefringent optical axis of the birefringent microlens array. This allows the polariser to be reconfigured, for example by removing it, rotating about a horizontal or vertical axis and replacing it. As its polarisation is at 45 degrees, no additional rotation function device (such as a waveplate) is required in order to achieve the correct polarisation state.

As described elsewhere, the orientation of the optical axis of the lenses may alternatively be configured such that the alignment direction at the microlens counter substrate is at −45 degrees while the alignment direction at the microstructured surface is at 0 degrees, ie parallel to the geometric microlens axis. In this embodiment, the output polariser 258 has a direction of maximum transmission 260 aligned parallel or orthogonal to the birefringent optical axis of the lenses 138.

When no field is applied to the pixels, the polarisation is nominally rotated to +45 degrees and thus sees the birefringent lenses index matched to the polymer material. The output polariser extinguishes this polarisation state. Therefore, the display becomes a normally black (NB) display in the 3D mode. The on state of the device is achieved by the addition of a voltage to the pixels. This causes a phase modulation of the input polarisation and generates a polarisation component at −45 degrees. This then sees the birefringent microlens function and windows are generated. This polarisation state is then transmitted by the output polariser.

Thus, this configuration enables a full brightness image for both 2D and 3D modes. The use of a passive birefringent microlens means that there are no disclinations in the lenses due to switching artefacts and the devices are cheaper and less complex to manufacture than switching birefringent microlenses. Additionally, the lenses are more stable to variations in the operating temperature of the device, compared to liquid crystal material in an (uncured) nematic phase.

The passive birefringent lenses are may also be more mechanically stable than switching birefringent microlenses, for example by use of an optional curable liquid crystal material. This means that this embodiment does not suffer from stress induced liquid crystal flow or birefringence variations if pressure is applied to the display, for example if constituting and being used as a touch screen display device.

The lenses advantageously do not have partially reflective conductive coatings deposited on the curved surface, and therefore show reduced diffuse scatter due to reflections at the lens surface.

Additionally, there is no polariser between the microlenses and the pixel plane of the display. Therefore, the microlenses may be positioned within the counter substrate of the display, thus shortening the separation of the lenses and the pixel plane. This enables a short viewing distance to be achieved. This embodiment is therefore particularly useful for small displays, such as handheld displays, in which a short viewing distance is preferable. For example, a 4.7" VGA stripe panel has 50 microns pixel spacing and would give a 430 mm viewing distance for a 0.5 mm thick counter substrate.

The LCD counter substrate may be manufactured prior to assembly of the LCD, comprising the birefringent microlens array. Such a process is known for the assembly of non-birefringent microlens arrays for the different application of LCD projection systems. The birefringent material may be added prior to assembly of the LCD if materials are used capable of withstanding the temperature and chemical compatibility requirements of LCD assembly, or alternatively filled following assembly. Generally manufacture is simplified since no polariser is required in the counter substrate during assembly of the component.

Figure 27A:
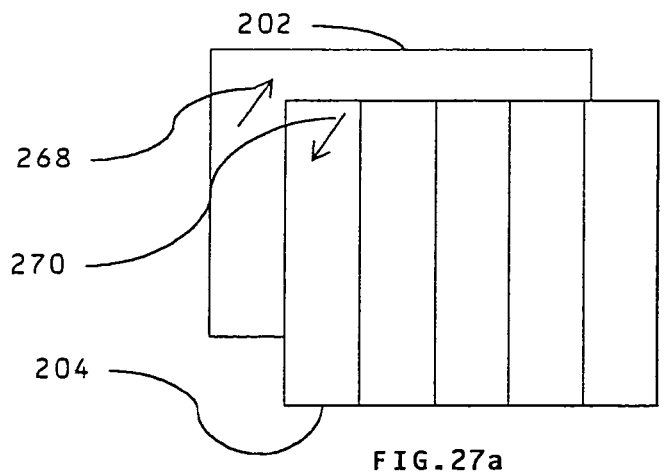
FIG. 27a shows the alignment directions in the display of FIGS. 25 and 26.

FIG. 27a shows an example of the rub (or orientation) directions of the alignment layers used on either side of the birefringent layer in this embodiment. The microlens counter substrate alignment layer 202 has a homogeneous alignment direction 268 and the microstructured surface 204 has an anti-parallel homogeneous alignment 270.

Figure 27B:
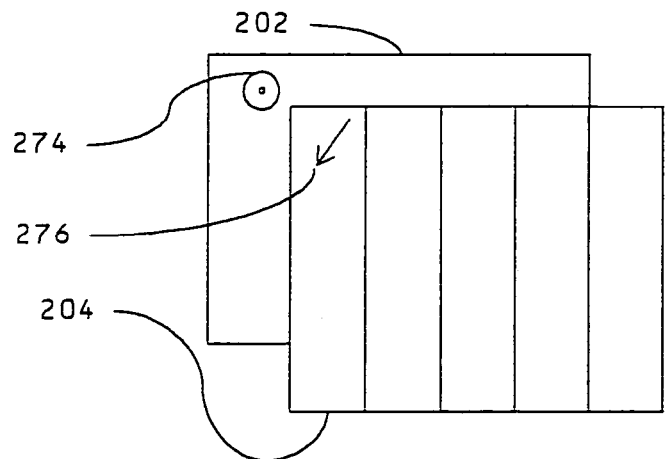
FIG. 27b shows alternative alignment directions in the display of FIGS. 25 and 26.

FIG. 27b shows alternative alignment layers that may be used in this embodiment. A homeotropic alignment layer 276 is used on the microlens counter substrate 202 in order to avoid a rubbing step on the microlens counter substrate of the device, which may be the LCD counter substrate 80. A homogeneous alignment 276 is used on the microstructured surface alignment layer 204.

Figure 28A:
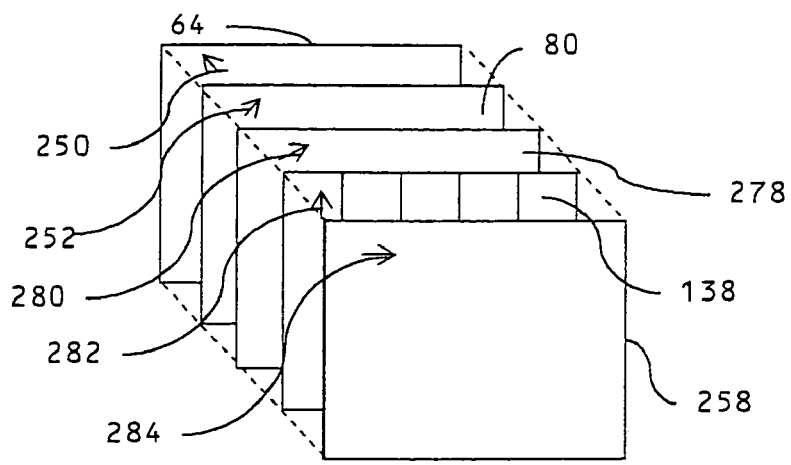
FIG. 28a shows the schematic front section of an internal microlens configuration corrected for a display with 45 degrees output polarisation.

FIG. 28a shows a further "one output polariser" embodiment in which the output polarisation for the ON state is adjusted so that the birefringent optical axis of the birefringent microlens array is parallel to the geometric microlens axis of the cylindrical lenses of the lens array. It may be convenient to generate an alignment layer that is parallel to the geometric microlens axis of the cylindrical microlenses of the display. This is achieved by using an appropriate polarisation rotation function between the pixel plane and the lens array. The rotation function may be produced for example from a half waveplate or TN guiding element. In more detail, FIG. 28a shows a schematic of the function of the elements in a display of the invention in which a half waveplate 278 is inserted between the LCD pixel plane 67 and the birefringent microlens array 138. An LCD input polariser 64 whose transmission axis 250 is set at −45 degrees to the vertical, is followed by an LC layer which in the NW ON state illuminates the LCD counter substrate 80 with a 45 degree polarisation state direction 252. A halfwaveplate 278 is arranged with birefringent optical axis direction 280 at 67.5 degrees. This is followed by a birefringent microlens array 138 with a birefringent optical axis direction 282 at 0 degrees to the vertical and a linear output polariser 258 with a transmission axis direction 284 of 90 degrees to the vertical.

Figure 28B:
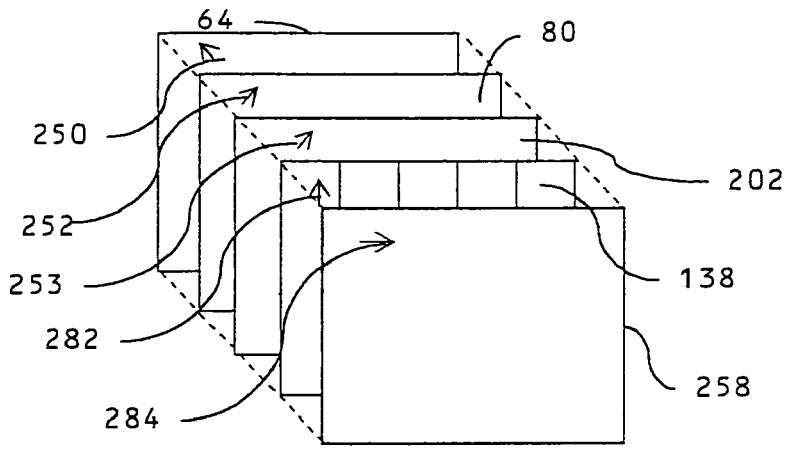
FIG. 28b shows the schematic front section of an internal microlens configuration using a twisted birefringence microlens.

Alternatively for example as illustrated in FIG. 28b for the 2D mode of operation, there may be a twist of the birefringent material in the birefringent lens 138. An LCD input polariser 64 whose transmission axis 250 is set at −45 degrees to the vertical, is followed by an LC layer which in the NW ON state illuminates the LCD counter substrate 80 with a +45 degree polarisation state direction 252. The microlens counter substrate alignment layer 202 has an alignment direction 253 at 45 degrees. This is followed by a microstructured surface alignment layer 204 with a birefringent optical axis direction 282 at 0 degrees to the vertical and a linear output polariser 258 with a transmission axis direction 284 of 90 degrees to the vertical for the 2D mode. In the 3D mode, the polariser is rotated through 90 degrees, and the TFT-TN display configured in NB mode.

Figure 29:
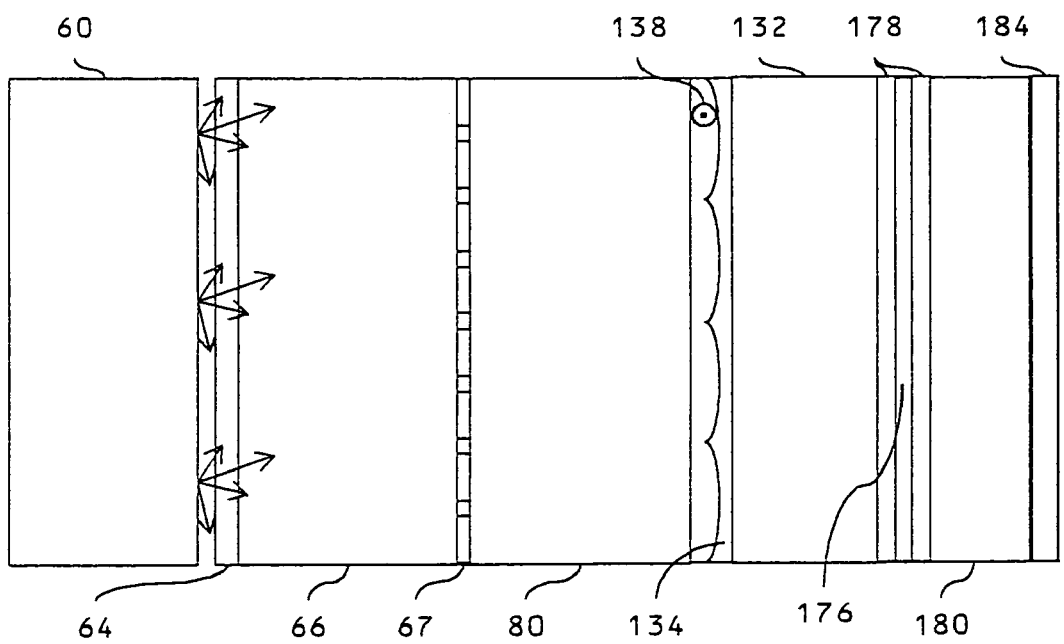
FIG. 29 shows the internal microlens configuration using a switchable waveplate to allow electronic switching between 2D and 3D modes.

FIG. 29 shows a further "one output polariser" embodiment which is the same as the embodiment shown in FIG. 24 except that the polarisation modifying device 146 is here formed from a switchable 90 degree polarisation rotator 176 e.g. a half waveplate, and a (linear) polariser 184. These may be physically mounted in any suitable manner, here they are formed on either side of an electrode substrate 180, as shown in FIG. 29. The electrode substrate 180 carries on one surface one transparent electrode 178 of the switchable rotator 176. A second transparent electrode 178 of the switchable rotator 176 is carried on the outer surface of the lens substrate 132. The polariser 184 is positioned on the other surface of the electrode substrate 180. Suitable alignment layers (not shown) may be positioned on the surface of the electrodes 178 in order to align the liquid crystal material of the switchable waveplate 176.

Thus, in this embodiment, as shown in FIG. 29, a 90 degree polarisation rotator such as a switchable waveplate is used to enable electrical switching between 2D and 3D modes of operation. In the 2D mode of operation, the switchable waveplate has a birefringent optical axis aligned parallel to the output polariser transmission axis, so that the output polarisation is not affected. In the 3D mode, the waveplate is oriented at 45 degrees to the output polariser so that the polarisation state which sees the microlens function is rotated through 90 degrees and transmitted by the output polariser. As before, the display will operate in the normally white mode in the 2D mode and normally black in the 3D mode. The switchable waveplate can also be combined with an additional passive waveplate to provide a Pancharatnam type broadband configuration.

Alternatively, the switchable waveplate can be replaced by a guided mode polarisation rotator, as well known in the art.

Despite the earlier described advantages of the above "one output polariser" embodiments, they all share one feature, namely that in the 2D mode they operate in the normally white mode whereas in the 3D mode they operate in the normally black mode. Alternatively, the 3D mode can be configured to be NW and the 2D mode to be NB.

Generally, most TFT-TN displays operate in a normally white mode. This has advantages for viewing angle and brightness uniformity in display construction and operation. For this LC effect, normally black modes generally have smaller viewing angle characteristics and poorer uniformity than normally white modes.

Further embodiments (hereinafter referred to as "dual normally white" embodiments) will now be described which allow both the 2D and 3D modes to be implemented as normally white modes.

Figure 30A:
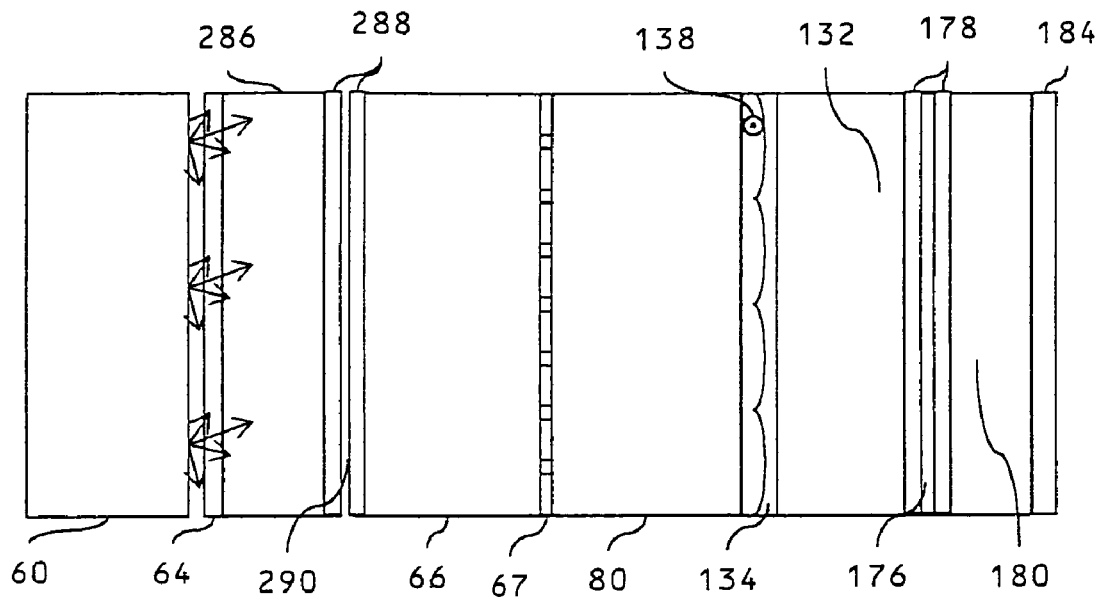
FIG. 30a shows normally white (NW) operation for 2D and 3D modes using a pair of switchable waveplates.

A first "dual normally white" embodiment is as shown in FIG. 30a, and is the same as the embodiment shown in FIG. 29 except that a further switchable 90 degree polarisation rotator 290 is provided between the LCD input polariser 64 and the LCD TFT substrate 66. This may be physically mounted in any suitable manner, here this is implemented by a first transparent electrode 288 of the switchable rotator 290 being provided on the outer surface of the LCD TFT substrate 66, and an additional electrode substrate 286 being provided between the LCD input polariser 64 and the LCD TFT substrate 66, the additional electrode substrate 286 carrying a second rotator transparent electrode 288 on one surface and the LCD input polariser 64 on the other surface.

Figure 30B:
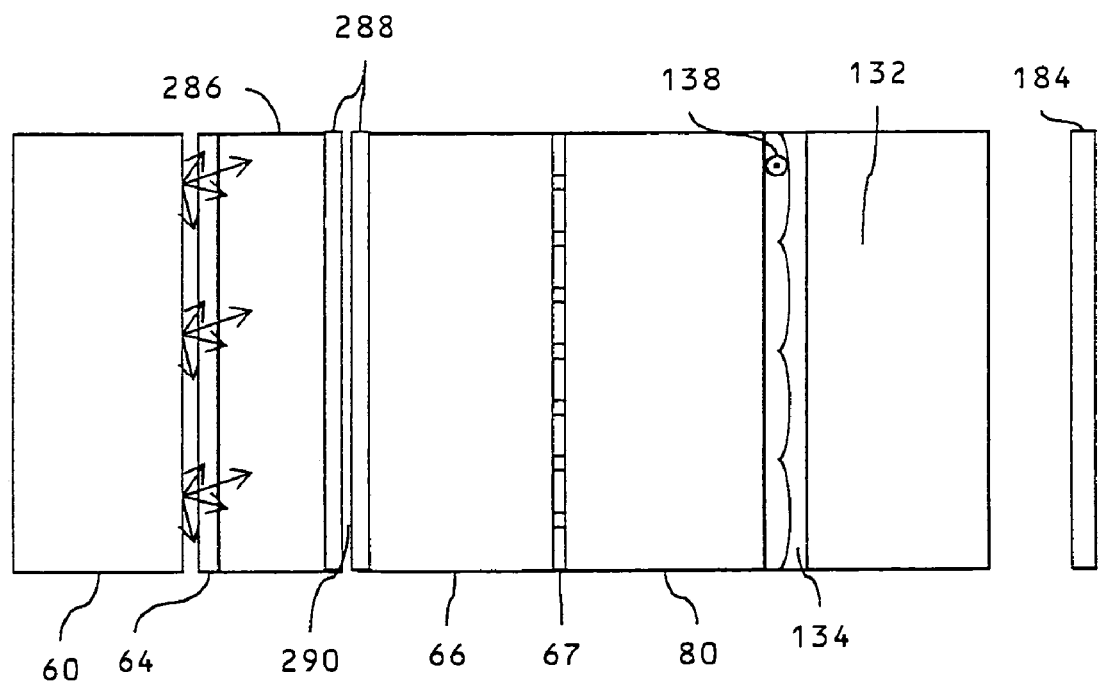
FIG. 30b shows NW operation for 2D and 3D modes using a switchable waveplate and a mechanically re-configurable waveplate.

A second "dual normally white" embodiment is shown in FIG. 30b, and is the same as the first "dual normally white" embodiment shown in FIG. 30a except that the polarising arrangement comprising the switchable 90 degree polarisation rotator 176, the transparent electrode 178, the electrode substrate 180 and the polariser 184 is replaced by the polariser 184 alone. Thus overall this second "dual normally white" embodiment of FIG. 30b comprises a single polariser directional display device 236 in which an electrode substrate 286 and a pair of transparent electrodes 288, having a second switchable 90 degree polarisation rotation layer 290 sandwiched between the electrode layers, are attached between the LCD input polariser 64 and the LCD TFT substrate 66. Following the birefringent microlenses 138, a lens substrate is followed by a polarisation modifying device 146 which in this embodiment is a polariser 186.

Thus, FIGS. 30a and 30b each show displays in which the mode of operation will be normally white for both 2D and 3D modes. For this LC effect, normally white operation will allow higher contrast and superior viewing angle performance than normally black mode operation. In this case, the input polarisation is rotated by an input switchable waveplate for the 3D mode and the output polarisation is aligned accordingly for normally white operation.

The output polariser can be an active device as shown in FIG. 30a or a passive device as shown in FIG. 30b in which the active polarisation rotator device is removed and replaced with a polariser 292 which is mechanically reconfigured to convert between the modes in synchronisation with the input switchable waveplate.

Figure 31A:
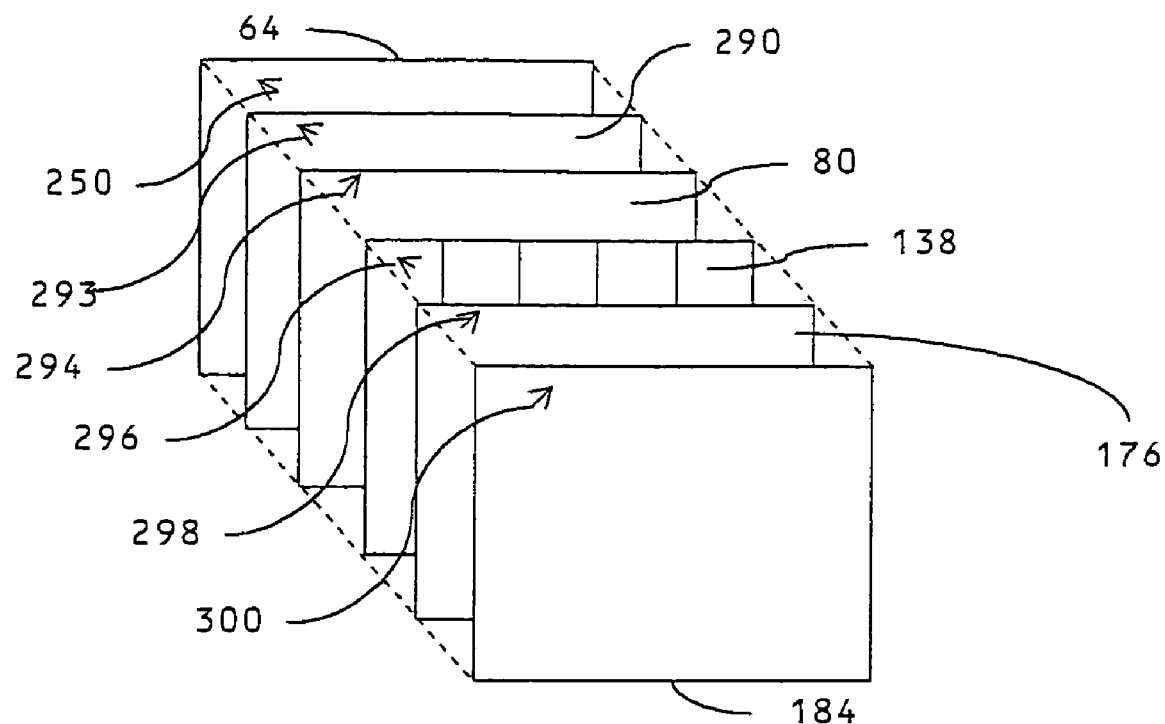

FIG. 31a shows the operation of the display of FIG. 30a for its 2D mode. The transmission axis direction 250 of an LCD input polariser is set as −45 degrees. The switchable half waveplate 290 optical axis direction 293 is aligned with the input polarisation direction 250 and so has no effect on it. In the NW mode ON state, the LC layer at the pixel plane 67 rotates the polarisation through 90-degrees to give a polarisation direction 294 in the LCD counter substrate 80 of 45 degrees. The birefringent microlens 138 birefringent optical axis direction 296 is set at −45 degrees, so the incident polarisation state is index matched to the isotropic material and no lens effect occurs. The switchable waveplate 176 has a birefringent optical axis direction 298 aligned at 45-degrees, so again there is no effect on the polarisation. The output polariser 184 has a transmission axis direction 300 arranged at 45 degrees to transmit the 2D polarised light.

Figure 31B:
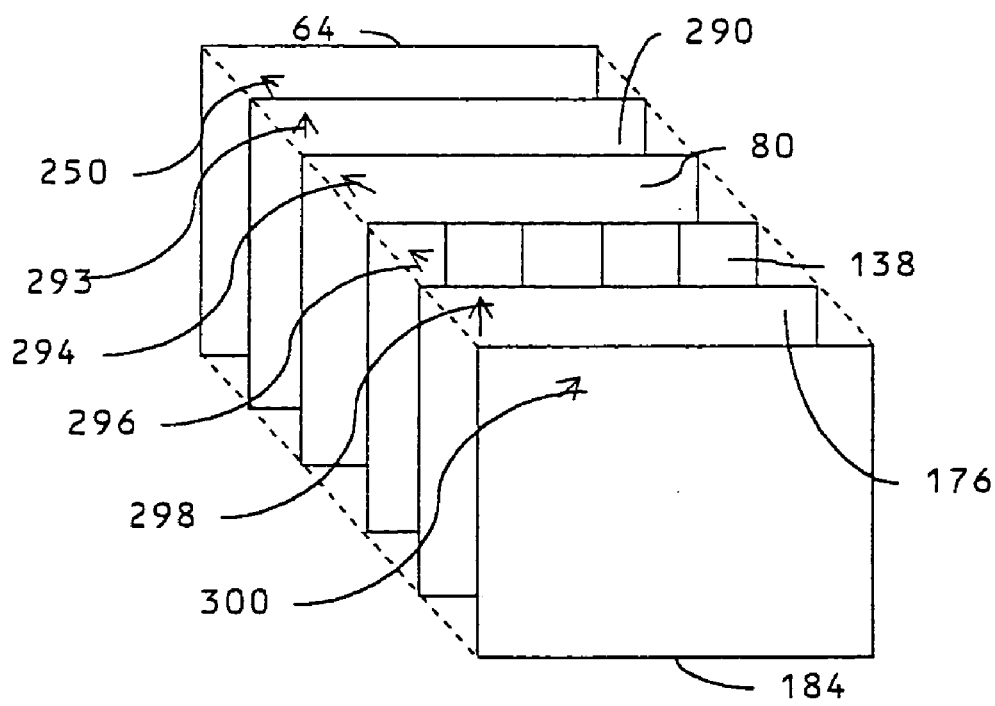

FIG. 31b shows the operation of the display of FIG. 30a for its 3D mode. The first switchable waveplate optical axis direction 293 is at 45 degrees to the input polarisation direction 250, so that the polarisation state is rotated through 90 degrees to +45 degrees. The twisted nematic cell in the NW mode ON state rotates the input polarisation through 90 degrees to give a polarisation state at −45 degrees, which is incident on the birefringent microlens 138 with an optical axis direction 296 of −45 degrees. A lens function is thus produced. The light is rotated by a second waveplate 176 with a birefringent optical axis direction 298 at 0-degrees, so that the light is transmitted through a final output polariser 184 with a polarisation direction 300 at 45-degrees.

Operation of the display of FIG. 30b is equivalent.

Figure 32A:
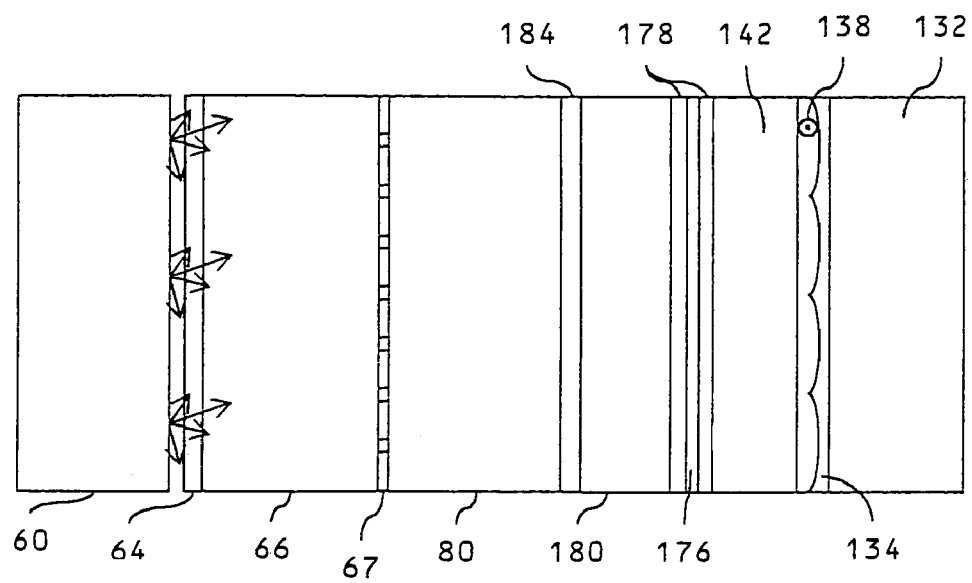
FIG. 32a shows the schematic front section of the polarisation configuration for the normally white 3D mode.

FIG. 32a shows a further embodiment in which both 2D and 3D modes of operation are in the NW mode. A backlight 60 illuminates an LCD input polariser 64 which produces substantially linearly polarised light in the LCD TFT substrate 66. The polarisation of the light is modulated by each pixel at the LCD pixel plane 67, and the light is transmitted through the LCD counter substrate 80 to an output polariser 184. An electrode substrate 180 is attached. Transparent electrodes 178 sandwich a switchable 90 degree polarisation rotator 176. A birefringent lens 138 is formed on the output of the polarisation rotator 176, comprising a birefringent material with one of the indices of refraction substantially matched to the refractive index of an isotropic lens microstructure 134. The isotropic lens microstructure is mounted on a lens substrate 132.

In operation, the liquid crystal display device 60,64,66, 67,80,184 operates in the conventional normally white mode of operation. The polarisers 64, 184 may additionally incorporate wide angle viewing films as well known in the art.

Figure 32B:
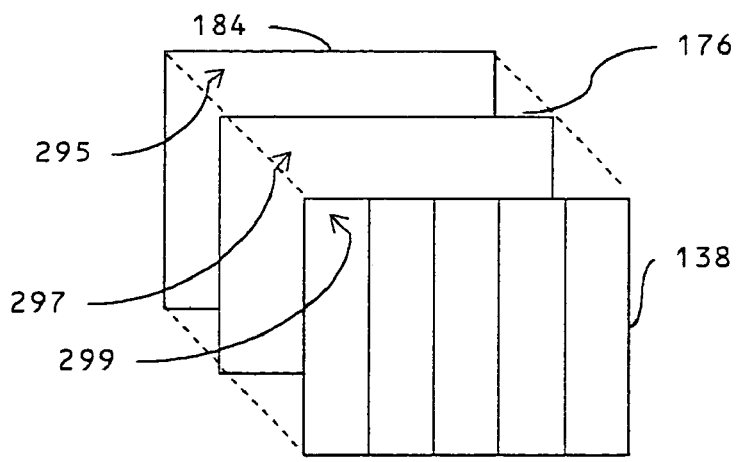

The method of operation of the device in the 2D mode is illustrated in FIG. 32b. The LCD output polariser 184 produces a linear polarisation state 295 inclined at +45 degrees to the vertical. This is incident on a switchable waveplate 176 with an optical axis direction 297 inclined at 45 degrees to the vertical. The waveplate 176 thus has no effect on the polarisation state, which is incident on the birefringent lens 138 with a birefringent optical axis direction 299 of −45 degrees. The polarisation state sees the ordinary index of the lens which is matched to the isotropic material of the lens substrate, and thus no lens function is seen.

Figure 32C:
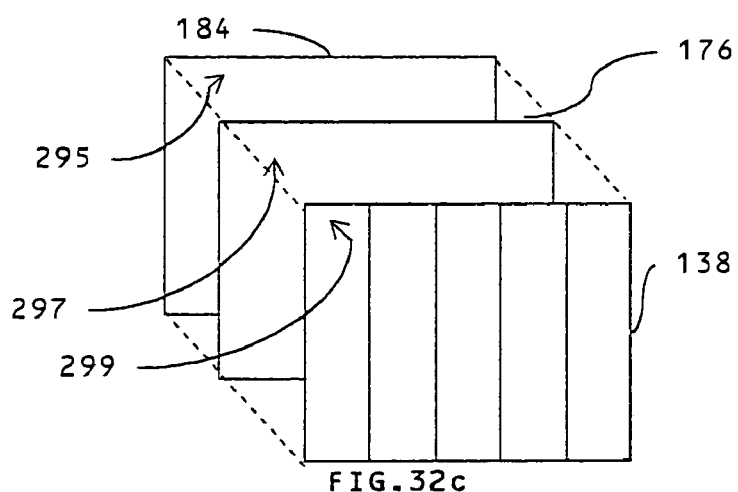

As shown in FIG. 32c, in the 3D mode of operation, the waveplate 176 has an optical axis direction 297 parallel to the vertical, and thus causes a rotation of the input polarisation through 90 degrees. The polarisation incident on the birefringent lens array 138 is thus parallel to the extraordinary axis of the birefringent material, and the lens effect is produced. Thus, the viewing windows are generated in this mode of operation.

As described elsewhere, the switchable waveplate 176 may be replaced by other known types of polarisation rotation elements. Additionally, the birefringent lenses 138 may incorporate a twist so that the alignment of the birefringent material at the microstructured surface is parallel to the lens axis.

This configuration has the advantage that it can produce a full brightness 2D–3D switchable display, in which both modes of operation are normally white. However, the large number of components between the pixel layer and the lens apertures means that the viewing distance of the display is likely to be relatively large which may be undesirable in a number of applications. Alternatively, thin layers of material may be used in its construction. For example microsheet glass, or polymer film. Additionally, polariser elements capable of withstanding the processing temperatures of the LC counter substrate may be required.

Reflective "One Polariser" Birefringent Microlens Display

Figure 33A:
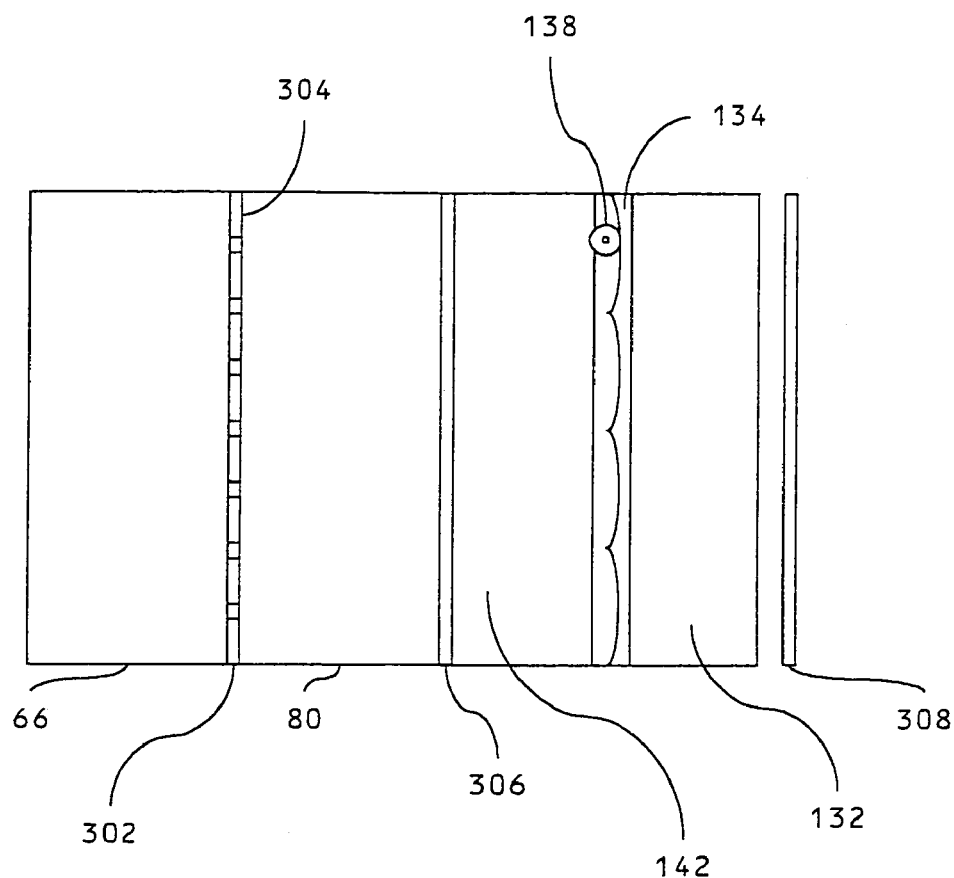
FIG. 33a shows a reflective display configuration.

The embodiments described above all comprise transmissive or emissive type displays. Further embodiments (hereinafter referred to as "reflective embodiments") will now be described in which reflective type displays are implemented. FIG. 33a shows a first reflective embodiment. This will also operate for a transflective type display in which there are transmissive and reflective portions of the display.

As shown in FIG. 33a, this first reflective embodiment comprises an LCD TFT substrate 66 followed by an LCD reflective pixel plane 302 comprising an array of mirrors with a switchable LC layer each of which forms a reflective pixel aperture 304. An LCD counter substrate 80 is placed over the pixel plane, and a following waveplate stack 306 is commonly used in this type of reflective display to tune the polarisation characteristics of the display. A microlens counter substrate 142 is placed over the waveplate stack with an array of birefringent microlenses 138 positioned on its outer surface, associated with an isotropic lens microstructure 134. A lens substrate is used to support the layer 134. A polarisation modifying device 146, which in this embodiment comprises a linear polariser 308, is positioned at the output of the display system.

Figure 33B:
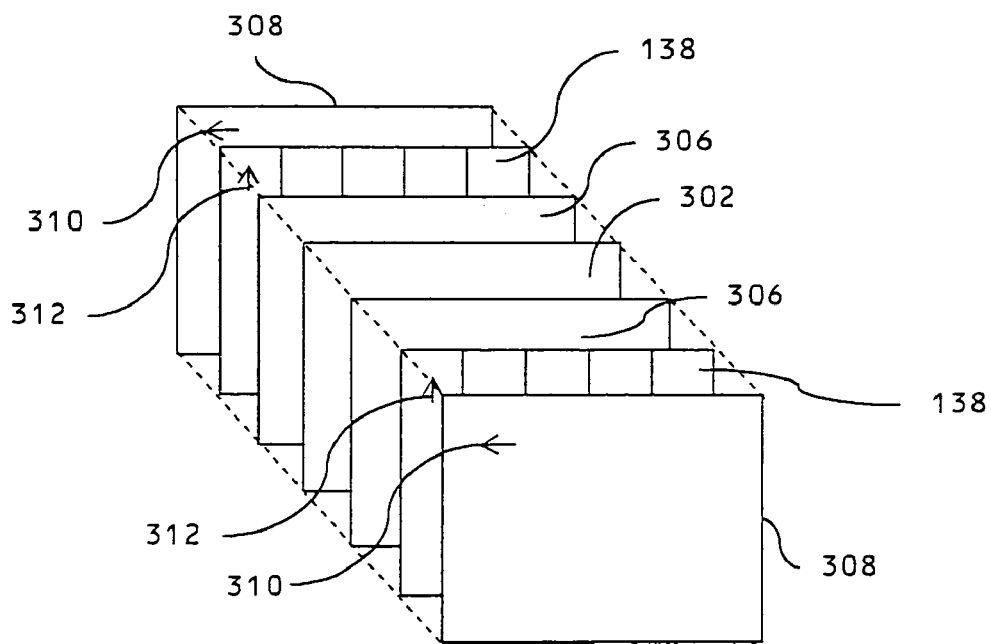
FIG. 33b shows the schematic front section of the polarisation configuration for a reflective display in the 2D mode.

FIG. 33b shows the operation of this embodiment in a 2D mode of operation. The linear polariser 308 has a transmission axis direction 310 of 90 degrees. This light is incident on the ordinary index of the birefringent microlenses 138 which have a birefringent optical axis direction 312 at 0 degrees. The light passes through the waveplate stack 306 and falls on to the reflective pixel layer 302. The light is reflected, but is shown as transmitted through the layer 302 for clarity of explanation (i.e. is shown "unfolded", i.e. showing the input and output paths sequentially, as is usual in this art). The light passes back through the waveplate stack 306, the birefringent microlens 138 and the polariser 308. As the light was incident on the index matched lens 138, no directionality was imparted, and the display is a 2D display, i.e. the output illumination sees the ordinary axis of the birefringent material and thus does not see the lenses, and then is transmitted by the polariser. Thus a full brightness and full resolution image is seen.

Figure 33C:
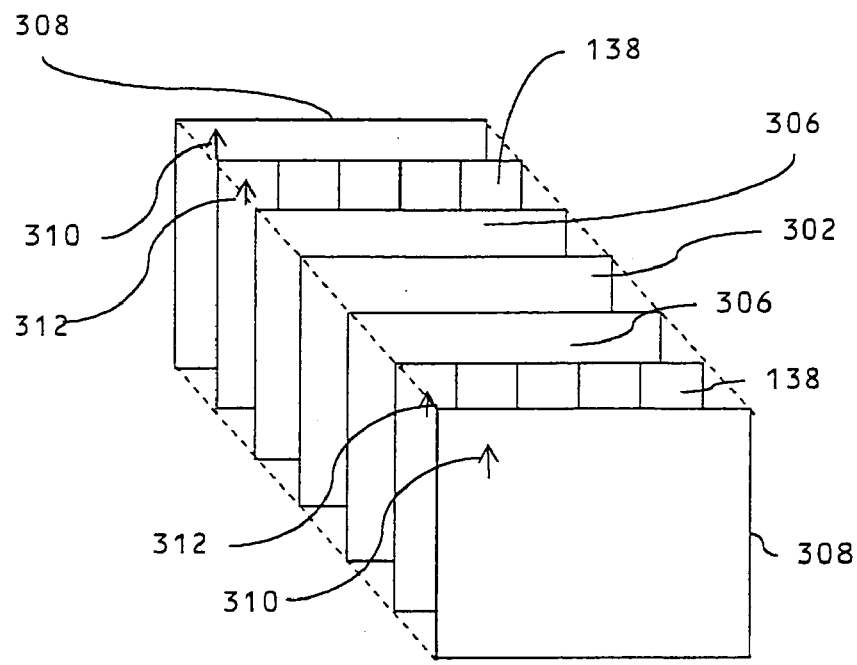
FIG. 33c shows the schematic front section of the polarisation configuration for a reflective display in the 3D mode.

FIG. 33c shows the operation of this embodiment in a 3D mode of operation. The linear polariser 308 is rotated through 90 degrees compared to its rotational alignment in the 2D mode such that it now has a transmission axis direction 310 of 0 degrees. This light is incident on the extraordinary index of the birefringent microlenses 138 which have a birefringent optical axis direction 312 at 0 degrees. The light passes through the waveplate stack 306 and falls on to the reflective pixel layer 302. The light is reflected, but is shown as transmitted through the layer 302 for clarity of explanation (i.e. shown unfolded). The light passes back through the waveplate stack 306, the birefringent microlens 138 and the polariser 308. As the light was incident on the non-index matched lens 138, 3D directionality is imparted, and the display is a 3D display.

This also means that the incident light will be imaged by the microlens array function on to the pixel plane as the incident polarisation is parallel to the extraordinary index which is not index matched to the polymer microstructure. Thus light sources in the outside world will be imaged on to the pixels of the display.

Figure 33D:
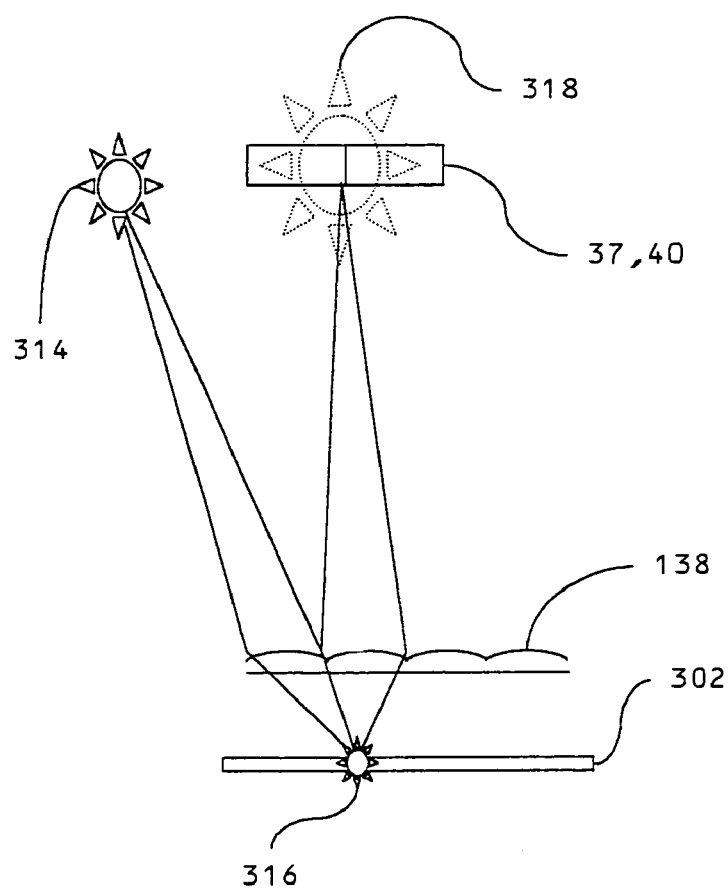
FIG. 33d shows the effect of ambient illumination on the brightness of the image in the 3D mode of the reflective display.

This can serve to increase the brightness of the display if it is oriented against the light source correctly as shown in FIG. 33d. FIG. 33d shows that in the 3D mode of operation, an external light source 314 will be focussed by the birefringent lens array 138 to form an image 316 at the pixel plane reflector 302. The light will then be reflected back to form an image 318 of the source in the region of the viewing windows 37, 40.

An ambient light source will be imaged on to the pixel plane and diffused towards the observer window plane. If the display is correctly positioned, this can be used to increase the brightness of the display for a defined source.

Overall a display according to this embodiment is capable of showing full brightness in 2D and 3D modes of operation which is particularly advantageous for low power consumption display systems and for displays operating in ambient lighting.

This embodiment may be adapted to different base LCD polarisation configurations by altering the birefringent optical axis and polarisation modifying device axes accordingly.

Figure 33E:
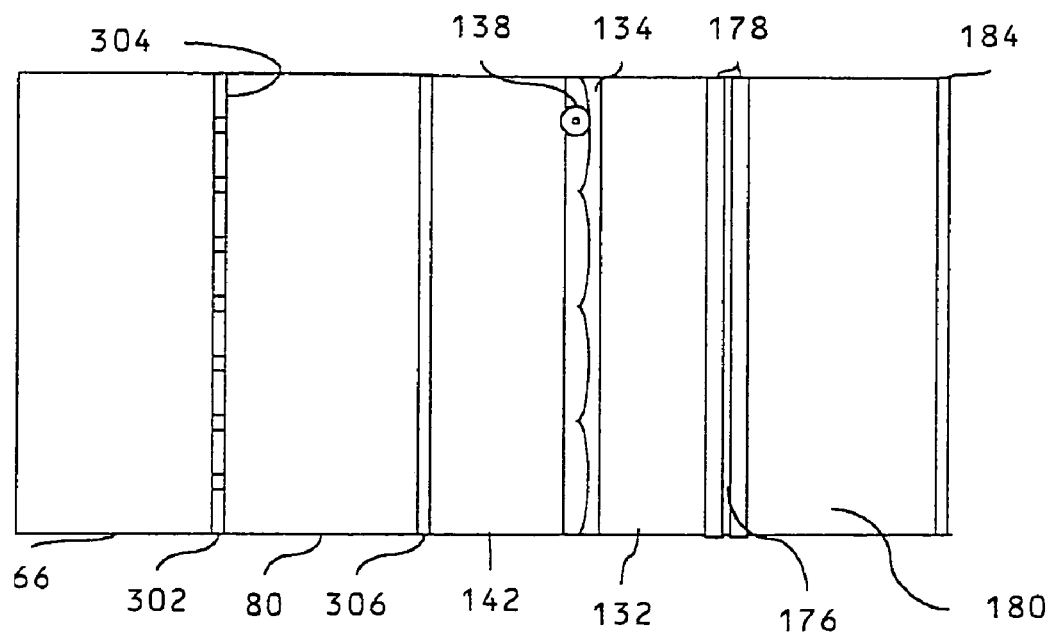
FIG. 33e shows an electrically switchable reflective display configuration.

FIG. 33e shows a second reflective embodiment, in which the switchable polariser is electrically switchable. This embodiment is the same as the embodiment shown in FIG. 33a, except that the polarisation modifying device 146 is here formed from a switchable 90 degree polarisation rotator 176 e.g. a half waveplate, and a (linear) polariser 184. These may be physically mounted in any suitable manner, here they are formed on either side of an electrode substrate 180, as shown in FIG. 33e. The electrode substrate 180 carries on one surface one transparent electrode 178 of the switchable rotator 176. A second transparent electrode 178 of the switchable rotator 176 is carried on the outer surface of the lens substrate 132. The polariser 184 is positioned on the other surface of the electrode substrate 180.

Figure 33F:
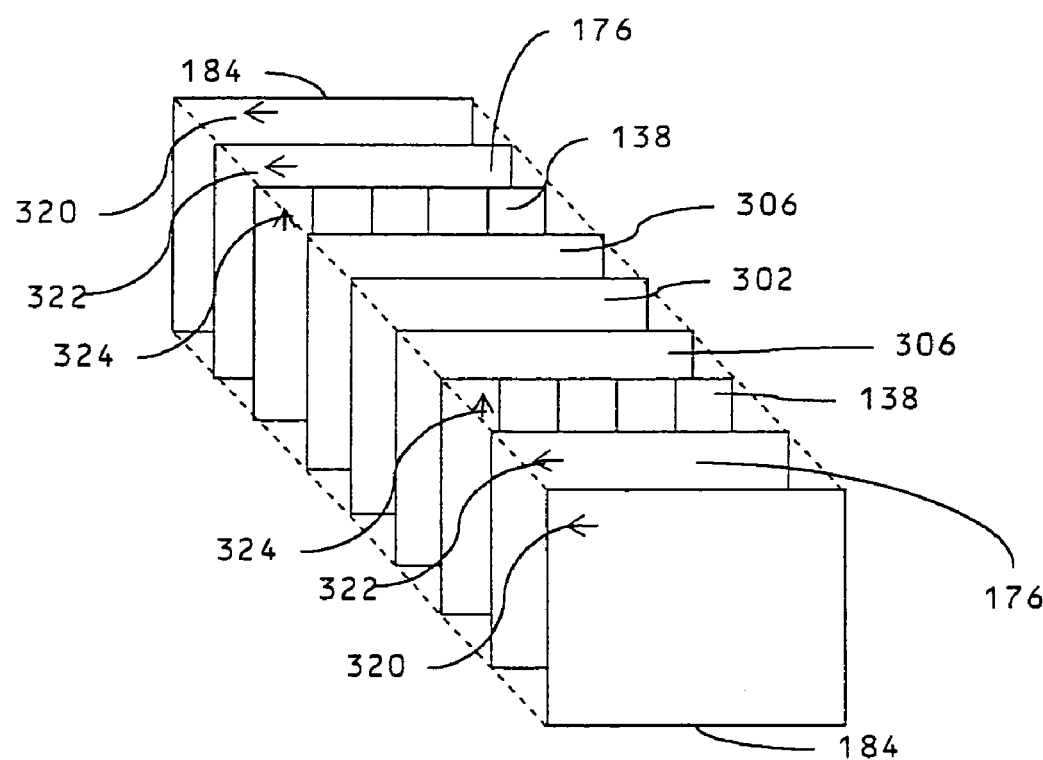
FIG. 33f shows the schematic front section of the polarisation configuration for the display of FIG. 33e in the 2D mode.

FIG. 33f shows the operation of the device of FIG. 33e in the 2D mode. The polariser 184 has a linear polarisation transmission direction 320 of 90 degrees to the vertical which is incident on the switchable polarisation rotator 176 with a birefringent optical axis direction 322 of 90 degrees, so no polarisation rotation takes place. The light is incident on the birefringent microlens 138 with a birefringent optical axis direction 324 of 0 degrees so that the incident polarisation is index matched and no lens function is seen. The light passes through the waveplate stack 306 and is reflected at the pixel plane 302 back through the waveplate stack 306 (shown in unfolded representation in FIG. 33f). The polarisation that will be outputted through the final polariser 184 sees the ordinary axis direction of the birefringent microlens and is parallel to the optical axis direction 322 of the switchable polarisation rotator 176, finally transmitted through the polariser 184. Thus, to summarise, in the 2D mode of operation, the 90 degree polarisation input is unrotated by the switchable waveplate and the lenses are index matched so that no directional output is produced.

Figure 33G:
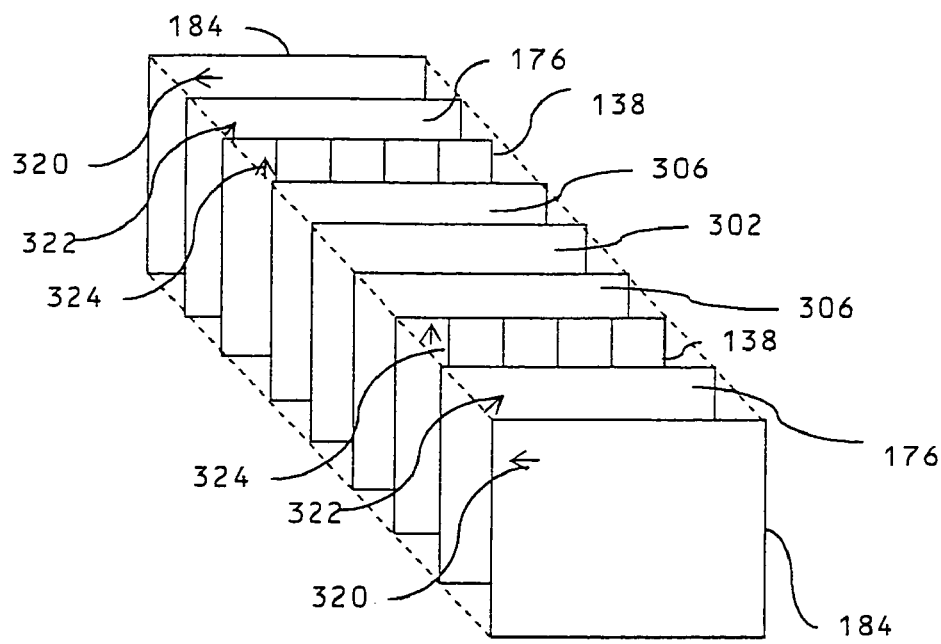
FIG. 33g shows the schematic front section of the polarisation configuration for the display of FIG. 33e in the 3D mode.

FIG. 33g shows the operation of the device of FIG. 33e in the 3D mode. The polariser 184 has a linear polarisation transmission direction 320 of 90 degrees which is incident on the switchable polarisation rotator 176 with a birefringent optical axis direction 322 of 45 degrees, so a 90-degree polarisation rotation takes place and the output polarisation from the rotator is at 0-degrees to the vertical. The light is incident on the birefringent microlens 138 with a birefringent optical axis direction 324 of 0 degrees so that the incident polarisation is not index matched and a lens function is produced. The light passes through the waveplate stack 306 and is reflected at the pixel plane 302 back through the waveplate stack 306. The polarisation that will be outputted through the final polariser 184 sees the extraordinary axis direction of the birefringent microlens 138. This polarisation state is at 45-degrees to the optical axis direction 322 of the switchable polarisation rotator 176 so is rotated by 90-degrees to parallel to the transmission axis direction 320 of the polariser 184 so it is transmitted. Thus, to summarise, in the 3D mode of operation, the input polarisation state is rotated through 90 degrees and the output polarisation is incident on the microlenses at 0 degrees causing the lens function to be operational.

Figure 45:
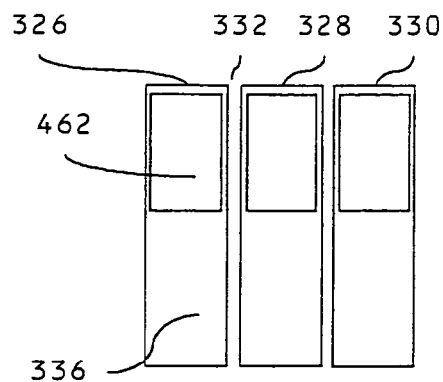
FIG. 45 shows an alternative pixel structure of a switchable high brightness transflective type display.

The above embodiments may alternatively be implemented in a transflective display. FIG. 45 shows details of example pixels of a transflective display. A red pixel 326, blue pixel 328 and green pixel 330 are shown separated by a small gap 332. Each pixel comprises a reflective region 336 arranged to reflect light from the front of the display and an aperture region 462 (i.e. clear pixel aperture) arranged to transmit light from a backlight.

In the transflective display, the display operates in both reflection and transmission modes. The pixels are generally reflective, and have at least one hole, or are partially transmitting, to allow the light from a backlight to reach the user. Thus the display is capable of operating in a wide range of lighting conditions. This is particularly useful in applications such as automotive applications and cameras in which the lighting may vary from bright sunlit illumination to dark indoors and night-time scenes. An autostereoscopic display may be required to operate in similar conditions.

In a 3D or multi-user modes of operation it is required that the viewing windows should be similar in both transmission and reflection modes. Thus the transmission aperture can be made to have substantially the same width as the reflective pixel, for example as shown in FIG. 45. The output of the windows will then substantially be the same profile in both reflective and transmissive modes of operation.

In a transflective display, the planes of the reflective and transmissive may be slightly different due to constructional requirements of the display. However, the difference in separation will generally be a sufficiently small proportion of the depth of focus of the microlenses.

Correction of Greyscale Response in Normally Black Mode

In some of the above described embodiments, a normally black mode is used for the 3D mode of operation. This can involve a lack of uniformity in greyscale between different colours, which may be alleviated as follows.

Figure 34A:
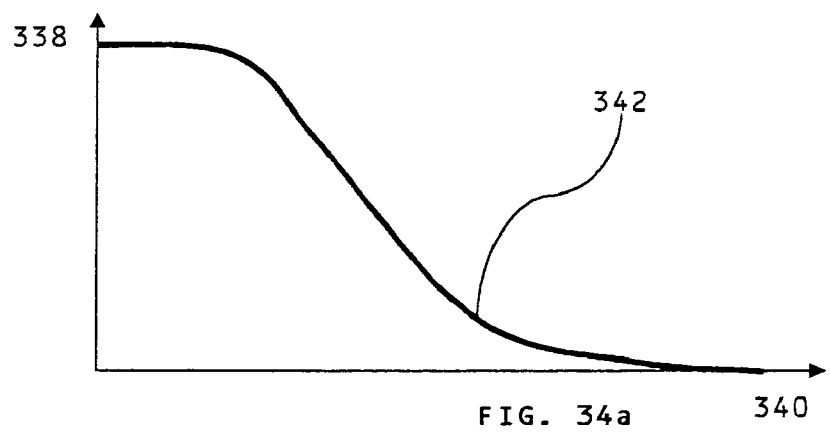
FIG. 34a shows a schematic of the greyscale response of the normally white mode.

FIG. 34a shows a graph of the normalised transmittance for each colour 338 against input voltage 340 for a schematic pixel response 342 of a normally white display TFT TN-LCD. At low voltage, the device has a maximum transmission, thus the device is normally white (NW).

Figure 34B:
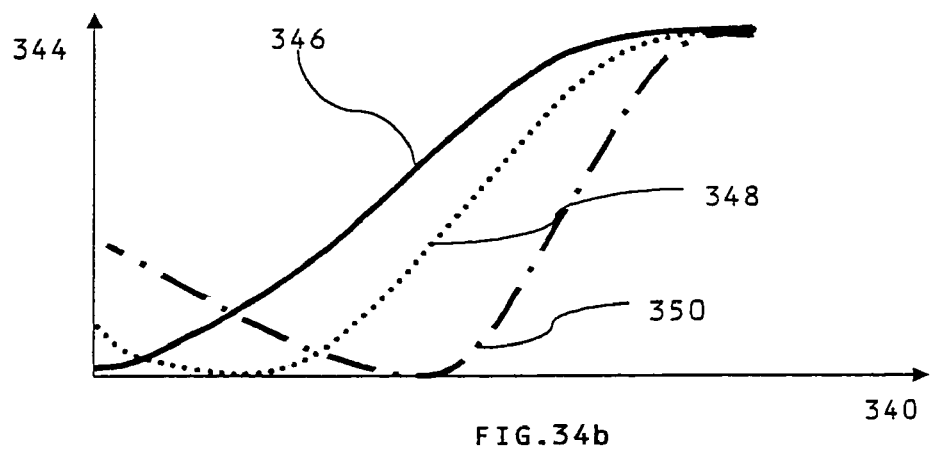
FIG. 34b shows a schematic of the greyscale response of the normally black mode.

This can be compared to the schematic greyscale response for the normally black mode, as shown in FIG. 34b. FIG. 34b shows a graph of the output grey level 344 against input voltage 340 for a normally black (NB) TN-LCD pixel at a red wavelength 346, a green wavelength 348 and a blue wavelength 350.

In this case, the three colours have a different response, particularly at low greyscales.

The following description assumes a TN cell is designed to have an optical thickness equivalent to a tuning wavelength (for example the wavelength at which the product of the birefringence and physical thickness is half the wavelength) between the red and green channels. For the red channel, the cell design may mean that in the undriven state there is too little retardance to give a fully rotated output and thus the contrast of the red will be limited. For the undriven state of the green channel the retardance of the cell is too great so that increasing the voltage reduces the retardance of the cell and thus the green passes through a retardance minimum, and similarly for the blue channel. When the cell is driven to the on state, the transmittance in the three channels is nominally the same. For normally black operation, the output contrast of the red channel can be optimised by adjusting the orientation of the output polariser for the off state and inverting the data signals through a greyscale correction scheme. The output of the green and blue channels can be adjusted by inverting and offsetting the signals through a greyscale correction scheme.

Figure 35:
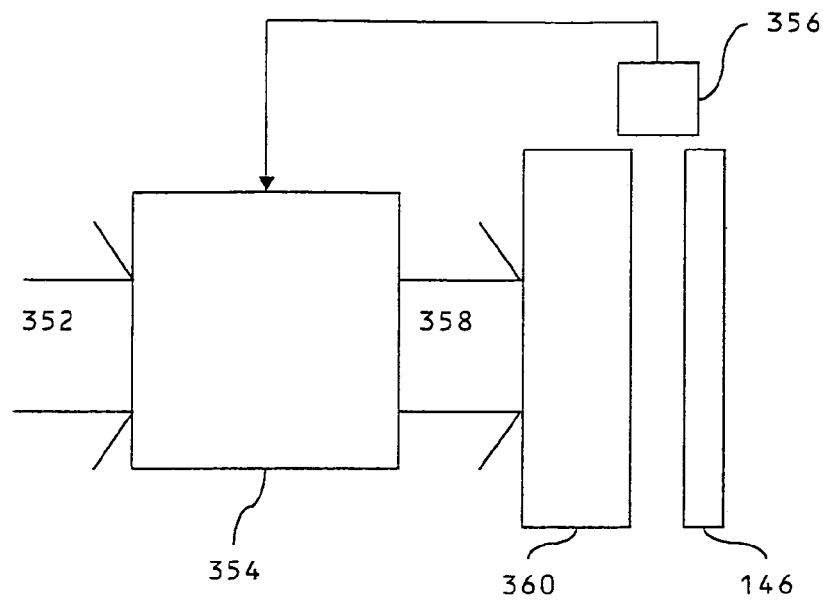
FIG. 35 shows an apparatus to adjust the image data based on the configuration of the polarisation switching mechanism.

Colour correction algorithms can be used to optimise the colour performance of the display in this mode. This is illustrated in FIG. 35. The image data input 352 is processed by grey scale correction unit 354 to give the appropriate final grey scale response based on the mode of operation of the device as defined by the setting of the polarisation modifying device 146. The appropriately corrected data signal 358 is sent to the display 360. The implementation of the grey scale correction unit 356 can be performed either in hardware or software, or be partitioned between the two.

Care has to be taken to optimise the display for the required variations of contrast with off axis viewing angle. The birefringent optical axis direction of the lenses should be closely matched to the output analyser to minimise the effect of the variable thickness waveplate of the birefringent microlenses.

It is further noted that although, in the some of the earlier described embodiments, the 2D mode operates in the normally white mode and the 3D mode operates in the normally black mode, this may be reversed (i.e. so that the 2D mode operates in the normally black mode and the 3D mode operates in the normally white mode) by varying the relative orientation of the output polariser and the microlens array.

The invention may use base panels that employ effects other than the TN effect, in which case the alignment configurations may be adjusted to optimise performance depending on the output polarisation and viewing characteristics of the effect.

Observer Tracking and Observer Location

In all of the above embodiments, observer tracking may be implemented by arranging that the microlens array moves in synchronisation with a signal from a detector used to measure the observer's position. In this way the observer continues to see a 3D image from a wide range of viewing positions. For a display with horizontal parallax, the movement may be in a single, horizontal axis only.

In systems which do not have an observer tracking sensor, an indicator which tells the user whether they are in the best viewing position, or 'sweet-spot' may be implemented. When the observer is in the correct (orthoscopic) sweet-spot position, they see a left image in the left eye and a right image in the right eye. When they move to the incorrect (pseudoscopic) position, the images are swapped and the user will generally experience visual strain.

In a further embodiment of the present invention, a sweet-spot indicator 366 may be configured to be a separate device from the display (i.e. it does not use any of the SLM pixels).

The sweet spot indicator may be compatible with the optical output of the switchable 2D–3D display.

Figure 36:
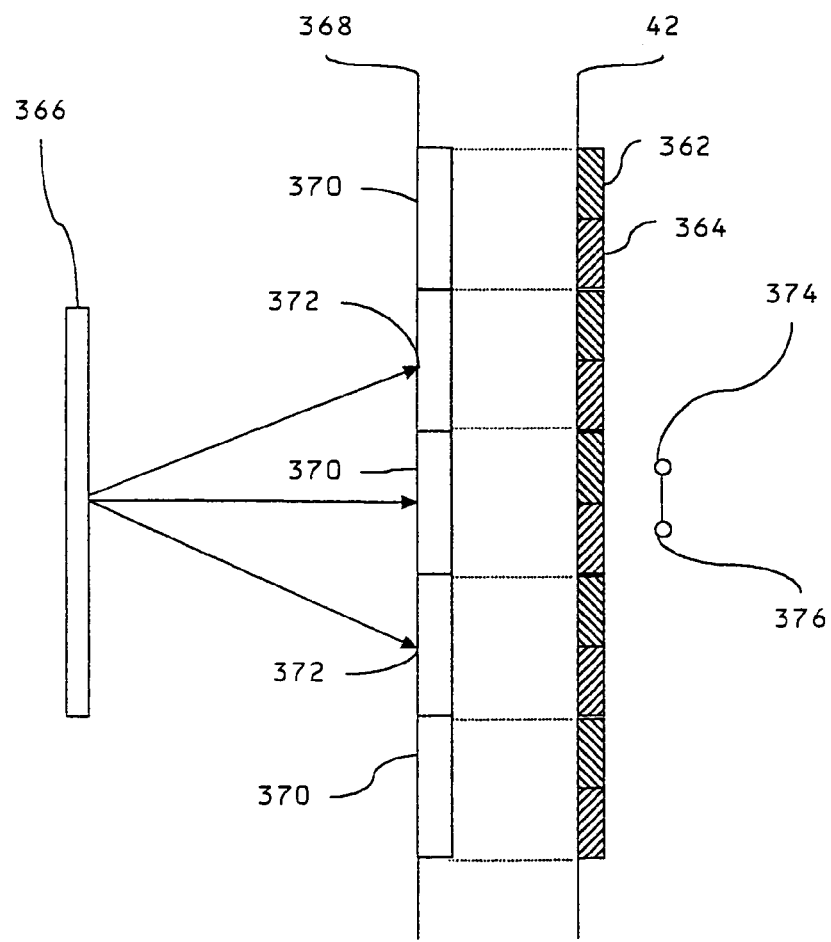
FIG. 36 shows the generation of windows in a sweet spot indicator.

FIG. 36 shows the general operation of the sweet-spot indicator. A 3D display is arranged to produce right eye windows 362 and left eye windows 364 in a window plane 42 of the display. An observer with his right eye 374 placed in a right eye window 362 and left eye 376 placed in a left eye window 364 will see a 3D image across the whole of the display. The indicator 366 is arranged to produce a repeating series of windows in a sweet-spot window plane 368 which is coincident with the display window plane 42 (but is shown separated in FIG. 36 for explanation purposes). The sweet spot window plane 368 comprises a repeating array of black windows 370 and coloured windows 372. Each window 370,372 is substantially twice the width of the display window 362, 364.

Both the indicator and display image may be housed in the same display case. The indicator may be positioned above or below the display when oriented for 3D viewing.

Figure 37:
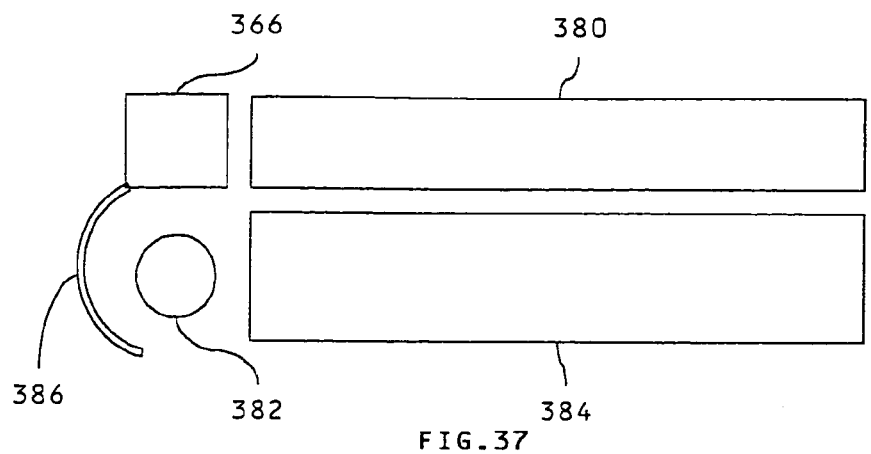
FIG. 37 shows the use of light from the LCD backlight to illuminate a sweet spot indicator optical device.

FIG. 37 shows the use of light from the backlight of the LCD to illuminate the rear of the indicator portion. In more detail, FIG. 37b shows this illumination method for a sweet spot indicator 366 in which light from a cold cathode fluorescent tube 382 is collected by a reflector 386 and light guide 384 for illumination of the display 380, and the backlight system is also used to illuminate the sweet spot indicator 366. Alternatively, the backlight light guide 384 can be extended to the area underneath the sweet spot indicator 366.

Further embodiments incorporating sweet-spot indicators are as follows.

A parallax optic is arranged to image a light source and a mask array to the plane co-located with the plane of the windows of the 3D display. When a viewer is positioned at an orthoscopic position of the display, the indicator appears black and in a pseudoscopic position of the display, the indicator appears to be a colour, for example red. The parallax optic for sweet-spot indication is separated from the parallax optic used for the image display so as to advantageously allow the use of the whole image area of the display for 3D viewing. The parallax optic for sweet-spot indication may be for example a lenticular screen, a hologram or a parallax barrier.

Figure 38:
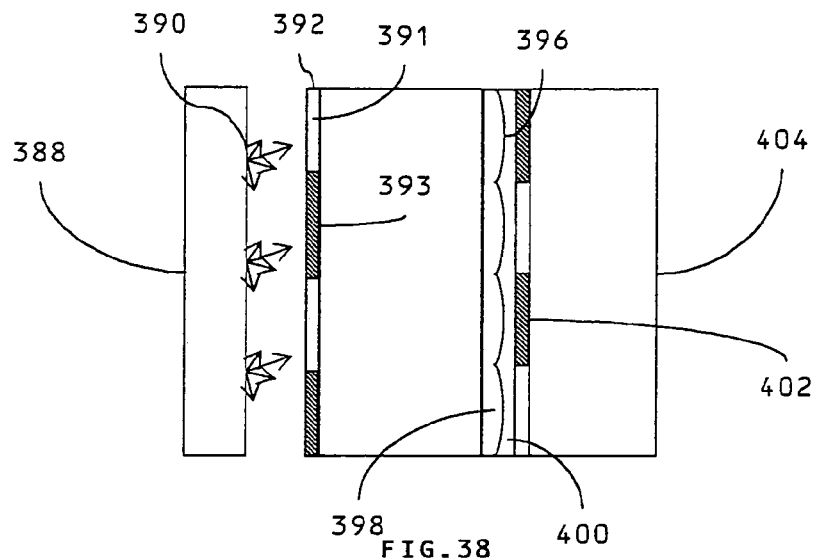
FIG. 38 shows a sweet spot indicator using an internal non-birefringent microlens.

FIG. 38 shows one embodiment of the invention in which the parallax optic used for the indicator comprises a lenticular screen and a mask aligned so as to obscure the light from alternate lenses. More particularly, a backlight 388 is arranged to produce a substantially diffuse illumination 390 which illuminates a window generating mask 392. A spacer material 394 separates the window generating mask 392 from an lens array 396, comprising high index material 398 and low index material 400 microstructured materials. A lens blocking mask 402 attached to a substrate 404 is arranged to block the light from alternate lenses of the lens array 396. The lens is filled with a non-birefringent polymer material with substantially the same refractive index and dispersion properties as that of the extraordinary index of the birefringent material used in the birefringent microlens array of the image portion of the display. The lenses will thus have substantially the same optical performance as those used for the display, but will not require any polarisers. The lens blocking mask is positioned substantially at the plane of the optical aperture of the lens, and may be between the pixel plane and the lens, or between the lens and the observer (as shown).

Figure 39:
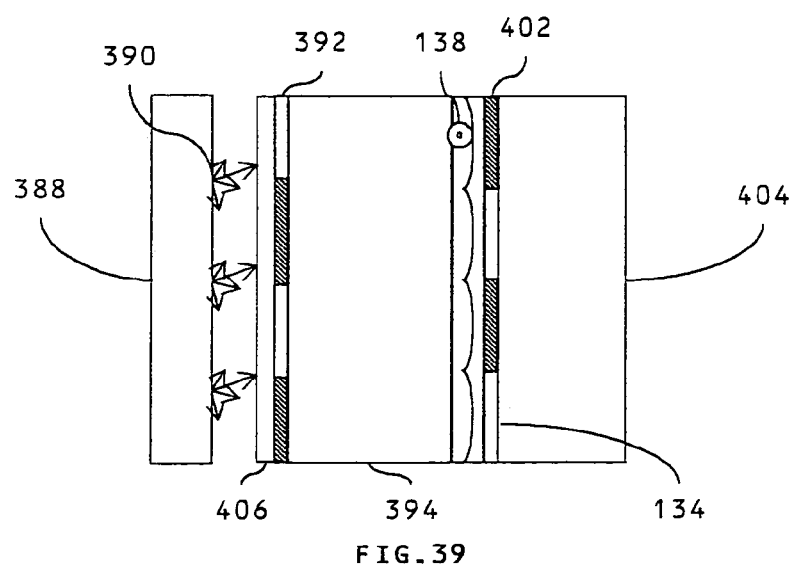
FIG. 39 shows a sweet spot indicator using an internal birefringent microlens.

In a further embodiment, shown in FIG. 39, the same birefringent parallax optic is used for the sweet-spot indicator as is used in the image portion of the display, with an additional mask 402 to shield intermediate lenses and appropriate polariser 406 in order to generate the parallax optic function. In more detail, a backlight 388 is arranged to produce a substantially diffuse illumination 390 which illuminates a polariser 406 and a window generating mask 392. A spacer material 394 separates the window generating mask 392 from a birefringent lens array 138, and an isotropic lens microstructure. A lens blocking mask 402 attached to a substrate 404 is arranged to block the light from alternate lenses of the lens array 138. Alternatively, an indicator could comprise the mask shielding alternative microlenses of the image display microlens array, with the pixels containing display data in order to generate the appropriate window structure.

Advantageously, the backlight can be a narrow band light source such as an LED or electroluminescent display so that the visibility of the indicator is maximised and there is efficient usage of light in the system. Optionally, light from the existing backlight can be used in which case polarisers, pixel apertures and transparent electrode material (e.g. ITO) can be omitted. The indicator illumination can be switched off during the 2D operation of the display.

The embodiments described above have referred to autostereoscopic 3D displays in which viewing windows of order the size of the average interocular separation are produced. The display generates a stereo pair, and a correctly positioned observer will see an image with depth. However, it will be appreciated that the present invention is not limited to switching between 2D and 3D images, rather the present invention may be embodied in any application where a light output is to be switched from one position or directional distribution to another.

One example of such an application is in a so-called multi-user display, where equivalent to the 3D mode described above, different images are required to be displayed to different viewers (making use of the different positions of each viewer relative to the display). Further, display of the same image to all the viewers is equivalent to the 2D mode described above.

Figure 40:
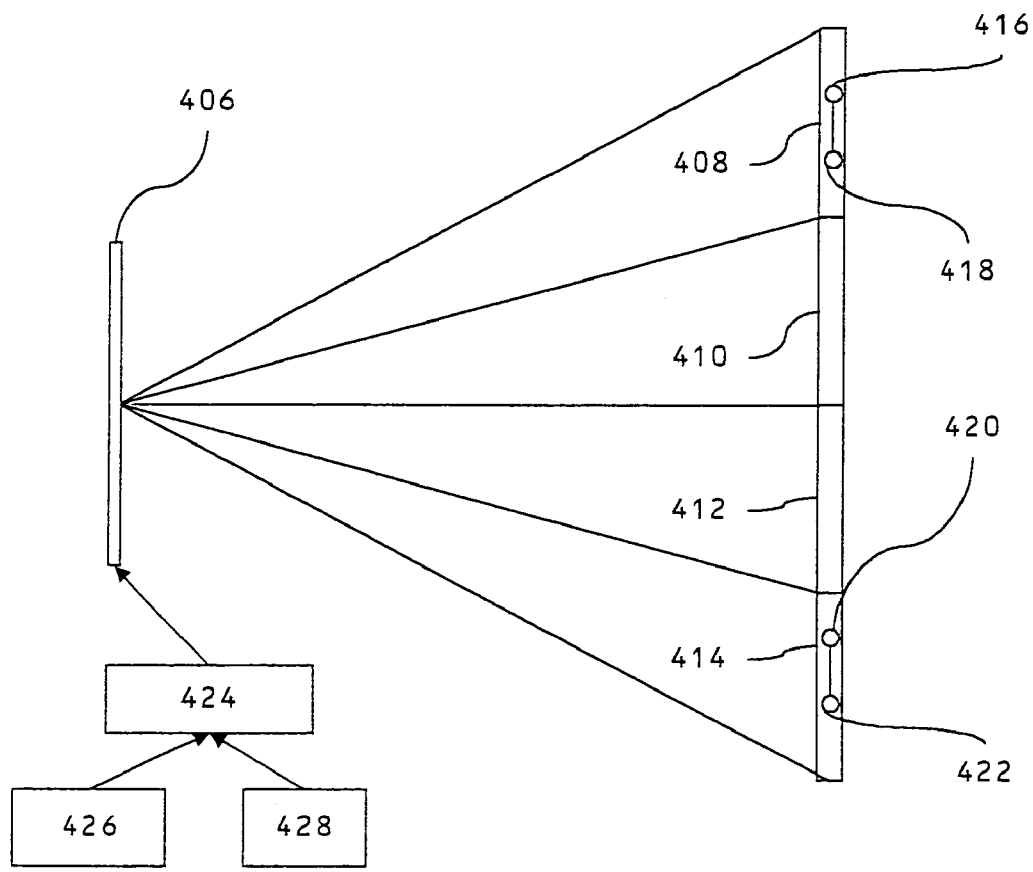
FIG. 40 shows a multi-viewer display apparatus comprising a display of the birefringent microlens type.

A first multi-user embodiment is shown in FIG. 40. FIG. 40 shows in plan view a birefringent microlens display 406 for use for example on the dashboard of an automobile, producing viewing windows 408,410,412,414. The window size is arranged to be greater than the interocular separation of the viewers. The driver places his right eye 416 in window 408, and also his left eye 418 in the same window 408. Similarly the passenger places his left eye 422 and right eye 420 in a single window 414. For a two view display, windows 408 and 412 contain the same information and windows 410 and 414 contain the same information. For aberrational design purposes, it may be convenient to have the windows 410 and 412 between the passenger and driver of the display. If a first image 426 and a second image 428 are input, then an image signal interlacer 424 will put image 426 on the even columns of the display for example, and image 428 on the odd columns of the display for example. The optical elements of the display will direct image 426 to the driver in window 408 and image 428 to the passenger in window 414. The display operates in the same manner as the previously described 2D–3D displays, but the viewing windows are substantially larger such that different viewers may be positioned in different windows. Such a display may be suitable for automotive applications such as in-car or in-flight entertainment, navigation and information systems.

This display can show two simultaneous image channels, for example TV and navigation. The windows are arranged so that from the driver's position, he may only see the navigation channel: The passenger or passengers may see the TV channel. The same display may be electrically configured for right hand drive or left hand drive configurations. The entertainment channel could be electrically switched on for all viewers when the vehicle is stationary.

The display comprises the passive microlens configurations as described in any of the embodiments above, and in a first mode operates equivalently to the standard 2D display i.e. the same image is presented in all viewing windows, i.e. all passengers can see the same image on the display surface.

In a second mode of operation, the display is configured with an array of output windows, containing at least two groups of different images.

Figure 41:
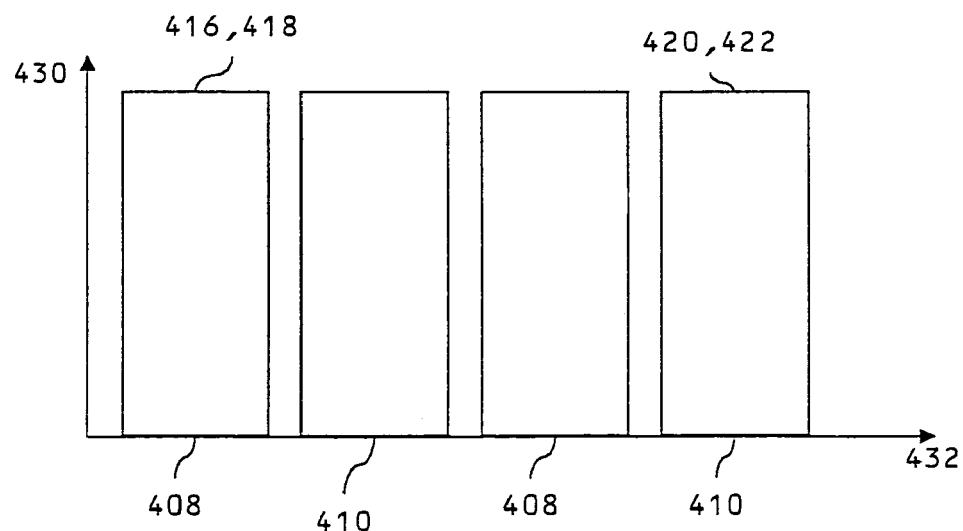

FIG. 41 shows schematically the configuration of windows for the display of FIG. 40. The intensity 430 is plotted against the position 432 for idealised windows. The driver's eyes 416,418 are positioned in window 408 where they can see image 426. The passenger's eyes 420,422 are positioned in another window where it can see image 428. The observers need not necessarily be in adjacent windows of the display.

For example, to take the case of a 4.7" VGA display with 50 microns pixel pitch required to have viewing windows 250 mm wide at a distance of 1000 mm from the display, the counter substrate separation of the microlenses and pixel plane will be of order 0.3 mm. This is therefore suitable for the internal microlens configuration as described previously in which a composite counter substrate is configured for manufacture.

In the same way as for the above described 2D–3D embodiments, the data is interlaced in columns across the display. In the example shown, the even columns would show image 1 data, while the odd columns would show image 2 data.

In one mode of operation, it may be desirable that the driver of the vehicle is not allowed to see the entertainment image even if he moves his head position. An additional sensor could be implemented such that if the driver attempts to move in to the incorrect viewing position, the display is turned off.

Figure 42:
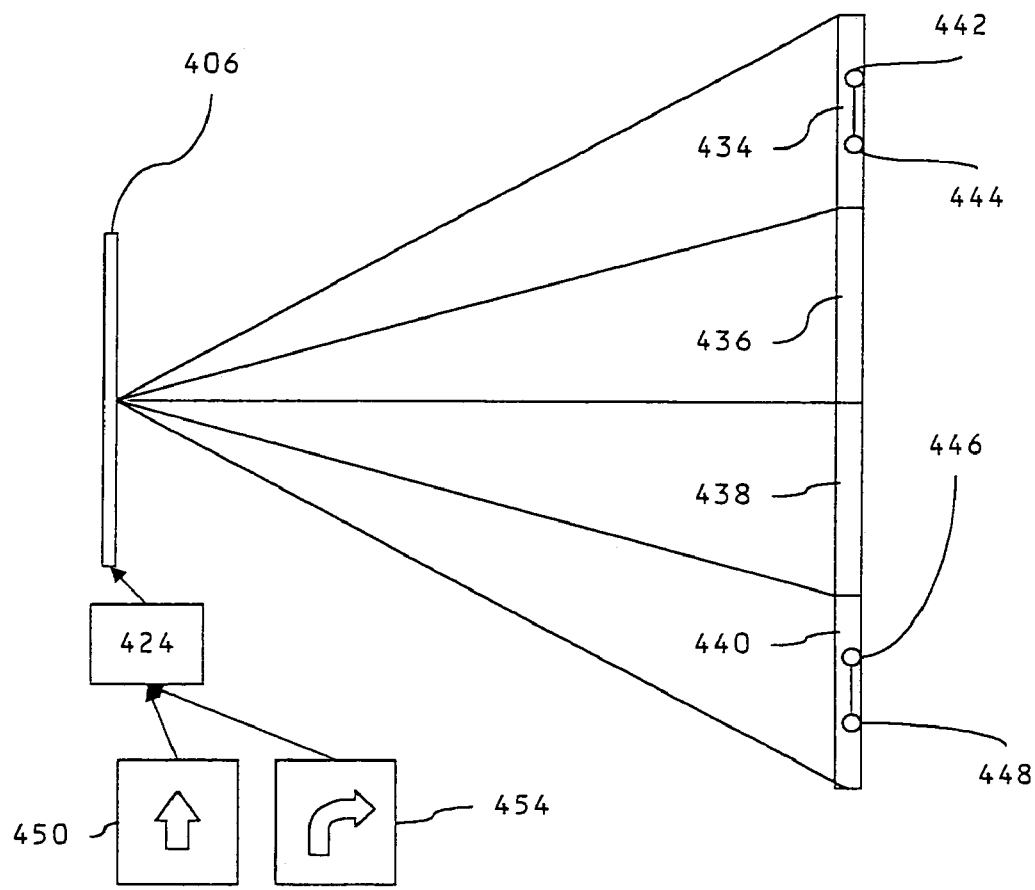
FIG. 42 shows a traffic light display system using the birefringent microlens display of the type described above.

In another embodiment of a multi-user display, a traffic light display system can be configured as shown in FIG. 42. FIG. 42 shows in plan view a birefringent microlens display 406 of the invention for use for example in traffic lane signalling system, producing viewing windows 434,436, 438,440. The window size is arranged to be greater than the interocular separation of the viewers. A driver in one traffic lane driver places his right eye 442 in window 434, and his left eye 444 in window 434. Similarly the driver in another lane places his left eye 448 and right eye 446 in window 440. If a first image 450 and a second image 454 are input, then an image signal interlacer 424 will put a composite interlaced image on the display 406 such that the correct images are sent in the correct directions. The optical elements of the display will direct image 450 to the driver in window 440 and image 454 to the driver in window 434, e.g. separate instructions for separate lanes. At other times the display will display the same instructions to both lanes by switching to a non-directional output mode (equivalent to the 2D mode in 2D–3D embodiments).

The display may also be configured with different data in different windows for the purposes of attracting attention for a user walking past the display. Such a display may be applicable for example to information kiosks, vending machines and public display information systems.

The birefringent microlens display 406 may be formed of any suitable display incorporating a light direction switching apparatus according to this invention, i.e. the spatial light modulator may be an LED display for example. In one mode of operation. the signal displays the same image to all observers, while in a second mode of operation, observers in one traffic lane can see the signal from a limited range of directions only. This may have application for example so that only users who are close to the lights can proceed on their instruction.

Switchable Transflective Display System

In further embodiments, a light directional distribution switching apparatus of this invention may be used as a brightness enhancement aid for a transflective or reflective display.

Referring back to FIG. 33d, a light source 314 may be imaged by the lens array 138 on to the pixel reflector plane 302 of a 3D display to increase the brightness of the 3D image at the viewing windows 37,40.

Figure 43:
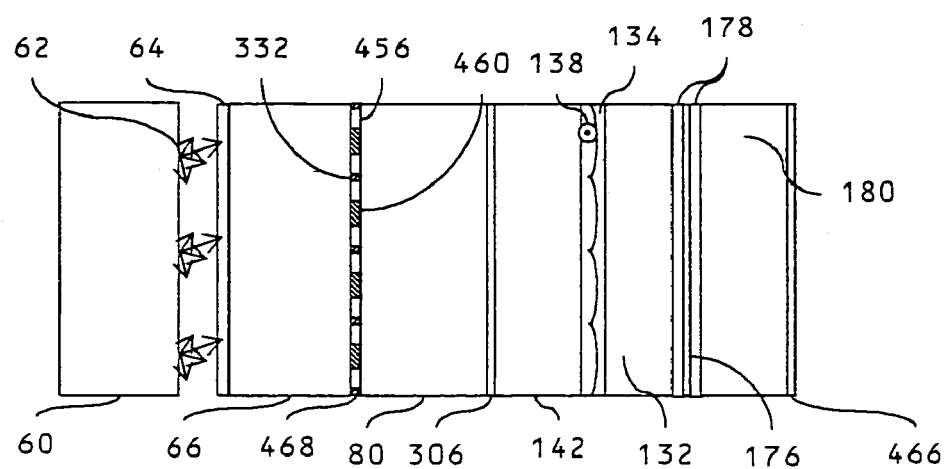
FIG. 43 shows a switchable high brightness transflective display.

FIG. 43 shows a side view of a transflective display of a first switchable brightness aid embodiment. A backlight 60 illuminates an LCD input polariser 64 which is followed by an LCD TFT substrate 66 and a transflective pixel plane 468. An LCD counter substrate 80 is provided, followed by a birefringent microlens array 138, an isotropic lens microstructure 134, a lens substrate 132 and a polarisation modifying device comprising a linear polariser 466 and a switchable 90 degree polarisation rotator 176.

This transflective LCD is arranged to modulate transmitted and reflected light.

Figure 44:
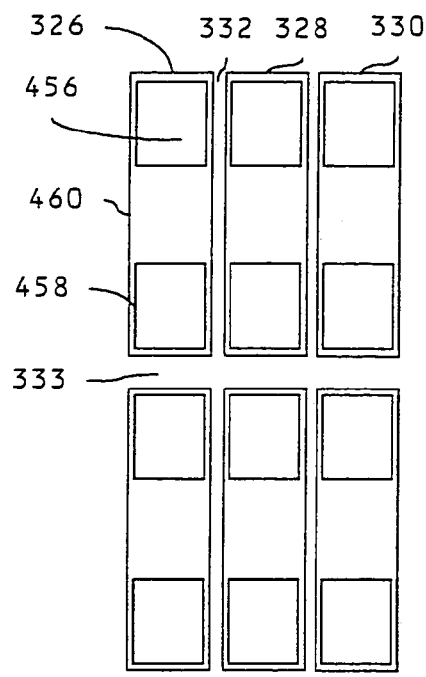
FIG. 44 shows the pixel structure of a switchable high brightness transflective type display.

FIG. 44 shows one pixel configuration of a 2D transflective display system with an enhanced brightness mode. The pixels are arranged as columns of red pixels 326, blue pixels 328 and green pixels 330 separated by vertical pixel gaps 332 and horizontal pixel gaps 333. The clear pixel aperture in this case is divided in to two regions 456, 458 with the remaining area of the pixel reflective 460. Thus the pixels each comprise regions of reflective electrode with holes in which light may be transmitted from a backlight.

FIG. 45 shows one other pixel configuration in which the arrangement of reflective and transmissive regions is varied with a single pixel aperture 462 covering substantially half of the pixel 326 with the remainder being reflective pixel aperture 336.

The birefringent microlens structure of the display operates in a similar manner to that described for FIG. 33e. However, in the current embodiment, the lenses are arranged in rows rather than columns so that each eye sees the same image on the display with the same image brightness. The pitch of the lenses is substantially equal to the pitch of the pixel rows.

The windows generated by the display in this embodiment do not have the purpose of providing a 3D image to an observer, but instead are regions of increased display brightness, as will now be described.

Figure 46:
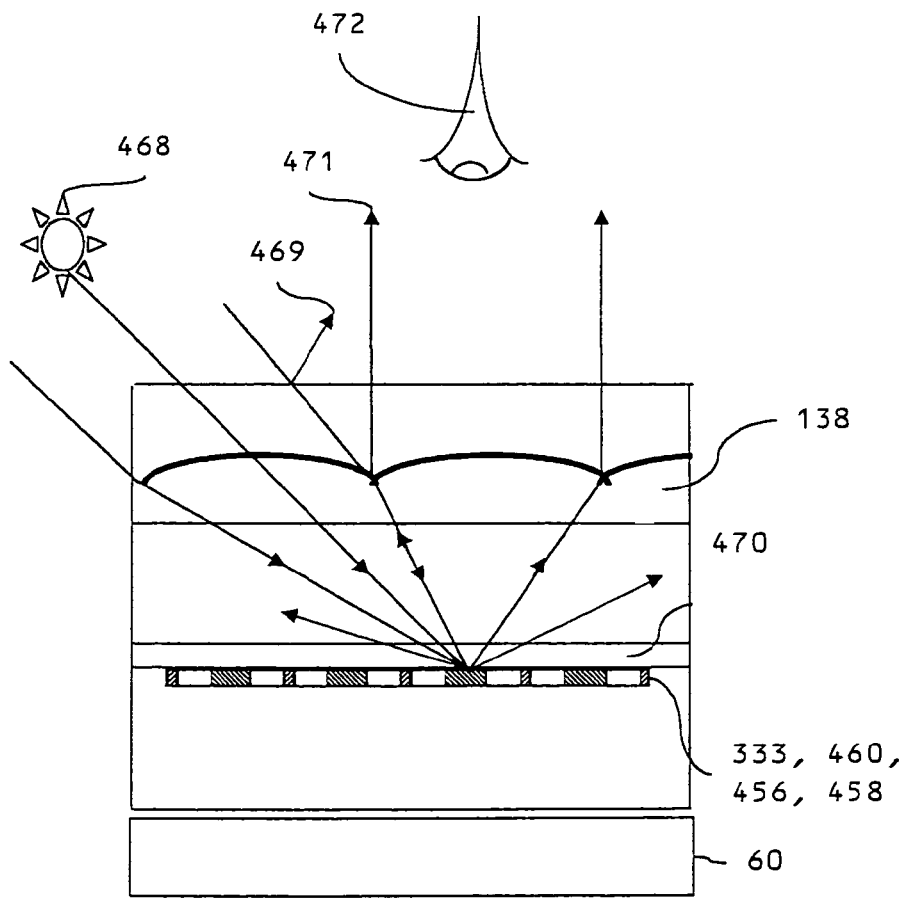
FIG. 46 shows the method of operation of a switchable high brightness transflective type display.

FIG. 46 shows the array of birefringent lenses 138 placed over the reflective backplane with the transflective pixel structure 333, 460, 456, 458. Light from an external illuminant 468 is focussed through the lenses 138 on to the reflective portions of the backplane from which it is scattered back towards an observer 472. Light from a backlight will pass through the transmissive regions 456, 458 of the pixels and also be focussed towards an observer.

In a first mode of operation, the polarisation modifying device is configured such that the lenses do not exhibit any optical power, and thus the device operates as a standard transflective display. In a second mode of operation, the polarisation modifying device is configured such that the lenses have optical power, and image an external light source as an array of images onto the reflective portion of the pixel plane as illustrated in FIG. 46. The reflective portions of the pixel plane are substantially in the image plane of the array of images of the external light source, although there may be some relative displacement to defocus the images to increase the spot size of the images on the reflective portions.

The light is diffused by the reflector, and a portion of it is incident on a microlens, which is shown as a different microlens to the input lens but may be the same lens. The lens collects the light from the pixel and distributes it towards the observer, giving an increased brightness image. Each of the lenses of the array will create substantially the same directional distribution from the respective image of the array of images. This directional distribution defines the viewing zone. However, in practice there may be small differences in the directional distribution of the light from each of the images of the array of images. This could be for at least the following reasons:

- the relative position of the image with respect to the respective output lens optical axis may vary across the display, for example as required to produce viewing windows. This could be caused for example by a closely positioned external light source in which the pitch of the array of images is slightly different from the pitch of the array of lenses;
- the aberrational characteristics of the lenses may vary with relative position of the spot with respect to the optical axis of the microlens array;
- the angular distribution of the light from the reflection at the reflector may be different for different images (for example in the case of a random diffuser positioned substantially at the image).

As discussed in more detail below, the direction 471 of the required light imaged to the observer is different from the direction 469 of the specular reflection of light from planar surfaces in the display, and thus advantageously, the display contrast is not degraded by the specular reflection of light from planar interfaces in the device.

The lenses may also be used to collect the light efficiently from the transmissive portions of the pixel and distribute them towards the observer, with increased brightness.

The advantage of this system is that the display brightness may be improved by the focussing action of the lens, although the region of increased brightness may be limited in extent, requiring the user to orient the display appropriately. If the ambient lighting is inappropriate, then the user can choose to use the display in its conventional wide-angle mode of operation. This may be particularly effective for handheld battery powered devices in which a high brightness low power mode is configured. The brightness enhancement is fall colour and thus the apparatus may be used in full colour or monochrome displays.

It may be required for the display to operate permanently in a single enhanced brightness mode of operation, in which no switching of the lenses is required. In this case, the lenses could be passive and would not be required to be birefringent. Alternatively, active birefringent lenses may be used in the invention in place of the passive birefringent lenses and polarisation modifying device in accordance with the first aspect of the invention, as described previously. Active birefringent lenses comprise for example a switchable liquid crystal layer and associated switching electrodes sandwiched between a microstructured lens surface and a planar substrate and have the disadvantages as described previously.

Figure 49:
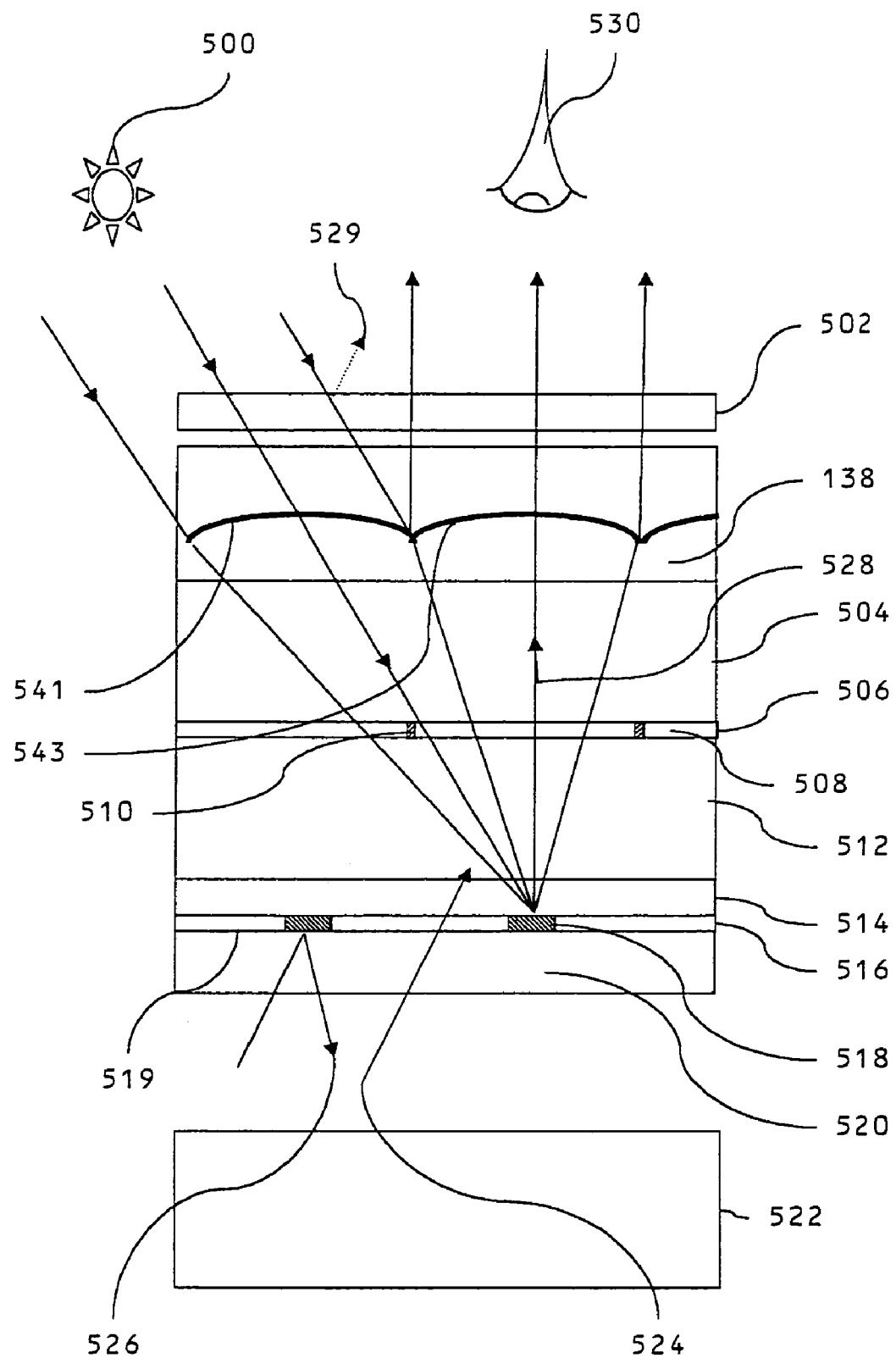
FIG. 49 shows an enhanced brightness reflective display configuration using external optical components.

In another embodiment of the invention, the reflective layer may be positioned at the rear of a transmissive display operating in a reflective configuration, as illustrated in FIG. 49. An external light source 500 illuminates the front of a display comprising on its front surface a switchable polariser 502 and a birefringent microlens array 138 which in a first mode of operation serves to focus the incident light through the display. Each individual lens of the lens array comprises an imaging optical aperture 541.

The light from the aperture 541 of a first lens passes through an LCD substrate 504, and a phase modulating LC layer 506 comprising pixel aperture regions 508 and pixel gap regions 510. The light then passes through a second LCD substrate 512 and a rear polariser 514, falling on a patterned deflecting reflector layer 516 mounted on a substrate 520. The patterned deflecting reflector layer 516 comprises reflective regions 518 and aperture regions 519. The pitch of the reflective regions 518 is substantially the same as the pitch of the lenses 138.

Light from the ambient light source 500 that passes through the aperture regions 519 is incident on a backlight unit 522 arranged to reflect light from the input. In a transflective display, the backlight unit 522 may also provide illumination from the rear of the display by means of an additional light source (not shown).

The light ray 524 that is incident from the backlight is transmitted through the aperture regions 519, whereas the light 526 incident on the reflective regions 518 will be redirected towards the backlight unit where it may be recycled.

In operation in the first mode, the external light source is substantially focussed by the lenses 138 as an array of images on to the deflecting reflector regions 518 substantially in the image plane of the array of images. These regions may for example comprise a diffusing reflector, for example a roughened metallised surface so as to provide a deflection of the light source. In particular, the deflector may provide horizontal deflection properties only, while the lenses provide diffusion in the vertical direction. The deflecting reflector 518 thus has the function of deflecting the light from the first lens aperture 541 to a second lens aperture 543, which is different from the lens aperture to which the first lens aperture 541 forming the image would be imaged by a planar reflector extending along the image plane. This is described in more detail below with reference to FIGS. 51a and 51b.

The light 528 reflected from the deflecting reflective regions is thus captured by the adjacent lens aperture 543 and imaged towards an observer 530 positioned in a cone in front of the display. Each image of the external light source is directed by a respective second lens aperture 543 into substantially the same directional distribution. The direction 528 is separated from the direction of the specular reflection 529 in order to increase the contrast ratio of the display.

The deflecting reflector 518 therefore serves to direct light from the first aperture to a second aperture of the lens array.

Figure 50:
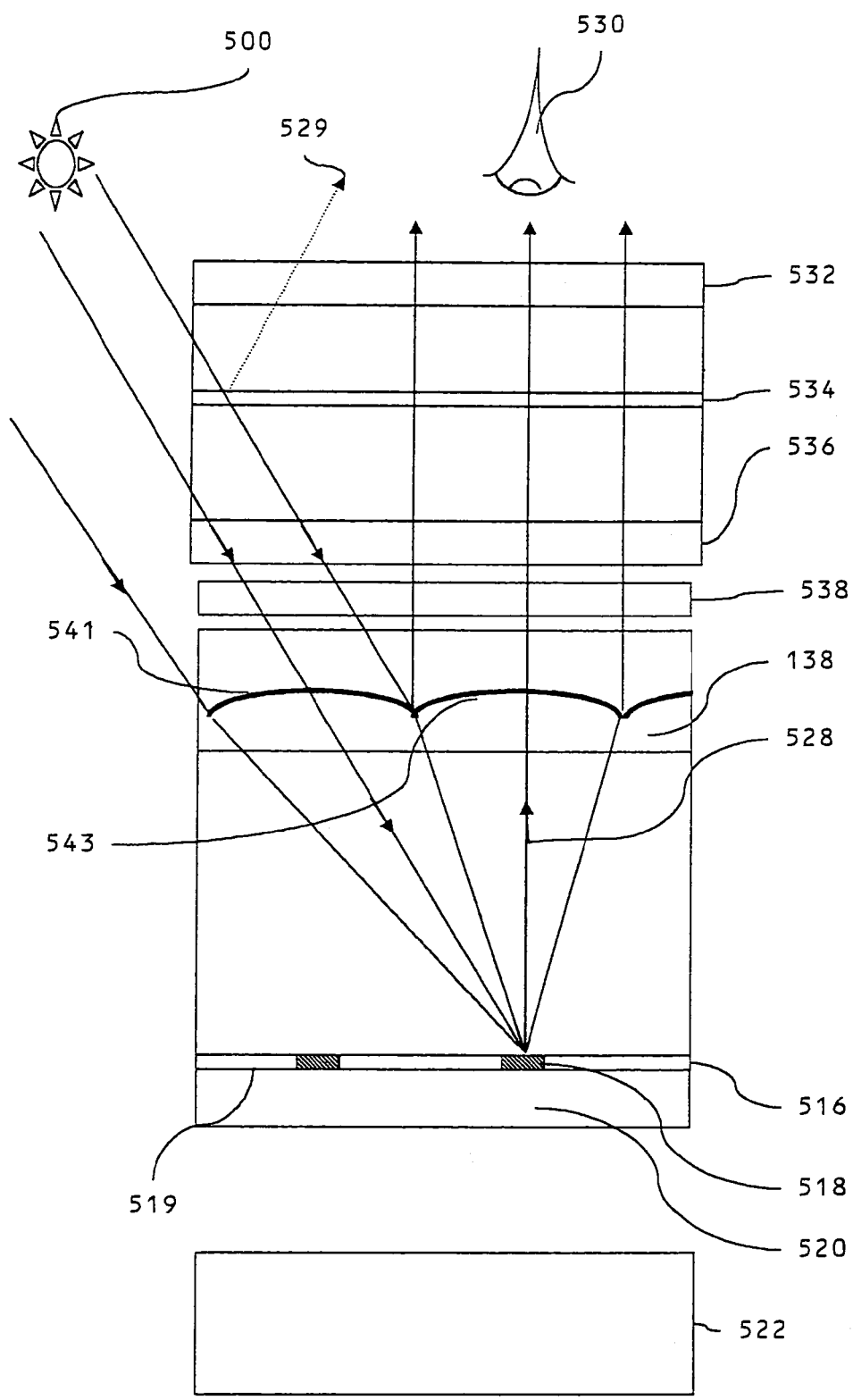
FIG. 50 shows and enhanced brightness reflective display configuration using components positioned at the rear of the display.

In the orientation illustrated in FIGS. 49 and 50 the first and second lens apertures 541 and 543 are different lenses of the array but this is not the case for all positions of the ambient light source 500. For some ambient light source positions, it may be possible for different portions of the same lens (i.e. a different lens aperture) to produce the brightness enhancement of the invention. For example, the display may be arranged as an array 138 of cylindrical lenses in which the geometric microlens axis of the cylindrical lenses is horizontal. In the standard mode of operation, the light source 500 will be positioned above the display, so that light enters through a first lens 541, is reflected and imaged by a second lens 543 to the output directional distribution as illustrated in FIG. 49. In his case, clearly the respective image is reflected through a different lens from the lens forming the respective image. Alternatively, the light source 500 could be positioned to one side of the display, but on the optical axis of the cylindrical lenses of the array 138. The lens array 138 would then image the light source 500 to a first array of images substantially at the plane of the reflector. The same lens could then collect the light from the reflector and produce an output directional distribution with the brightness enhancement advantage. However, by use of a light deflecting reflector, each respective finite portion of the image would be reflected to an area of lens (i.e. lens aperture) different from the portion of the lens (i.e. lens aperture) to which the portion of the lens (i.e. lens aperture) forming the finite portion of the image would be reflected by a planar reflector extending along the image plane. Therefore it is better to consider the deflecting reflector 518 as shifting or changing the lens aperture through which light is directed rather than shifting changing the lens. This applies to all the embodiments described herein.

Advantageously, the lenses of the array 138 are continuous surface relief lenses without facets. The possibility of using lenses without facets allows the brightness and contrast enhancement advantages to be achieved without suffering from unwanted image artefacts and light loss.

The width of the deflecting reflector regions 518 compared to the width of the aperture regions 519 may be increased to increase the viewing freedom of the display in the enhanced reflective mode, or reduced to increase the viewing freedom of the display in the backlit mode.

In this manner, external light sources may be used to efficiently illuminate the display and provide a higher brightness mode of operation from a range of viewing positions. Of particular advantage for this embodiment is that no modification of the internal structure of the display device is required; the brightness enhancement elements are added to the external surfaces of the display. This reduces the cost of the system by minimising the changes to the existing manufacturing methods for the base LCD panel.

The display may operate for example in normally black configuration in a first mode and normally white configuration in a second mode. The lenses 138 may be arranged in rows and the optimum brightness may be arranged by tilting the display with respect to a horizontal axis.

In a second mode of operation, the optical effect of the lenses may be removed as described elsewhere for example by reconfiguring the polariser 502. This will serve to remove the effect of the birefringent lenses 138. In this case, the display will have a substantially uniform viewing region with reduced brightness compared to the best viewing positions of the first mode. Alternatively, the lenses 138 and switchable polariser 502 may be replaced by lenses which have a fixed focal length so that the display is permanently operated in the focussing configuration.

It will be apparent that the passive birefringent lenses and switching polariser of this embodiment may be replaced by non-switching lenses or active switching lenses. This applies to the embodiments described herein.

FIG. 50 shows an alternative brightness enhancing display system in which differs from the embodiment of FIG. 49 in that all the additional components are positioned at the rear of the display. In this case, the display is a transmissive type display comprising a front polariser 532, a phase modulating pixel layer 534 and a rear polariser 536. In a first mode of operation, light from an ambient light source 500 passes through the display and is polarised at the rear display polariser 536. A switchable 90 degree polarisation rotator such as a half waveplate is arranged to orient the polarisation of the light falling on an array of birefringent lenses 138 such that they have a focussing action. The light is then focussed on to a patterned deflecting reflector 516, formed on a substrate 520, comprising reflective regions 518 and aperture regions 519. The light from the first aperture 541 that is reflected from the deflecting reflector 518 to the second aperture 543 is imaged towards the viewing zone of the display in which the observers eyes 530 are positioned. Regions of increased brightness are again generated as described previously.

In a second mode of operation, the switchable polarisation rotator 538 is configured such that the output polarisation direction falling on the lenses 138 is arranged so that the lenses show substantially no focussing action. The light then falls on to the patterned reflective element 516. Some of the light will be reflected, while the remainder will be transmitted in to the backlight where it will be diffused and re-reflected. An integer number of pitches of the reflective elements 518 may be set substantially the same as the vertical pitch of the pixels of the display in order to avoid a Moire effect in this mode of operation.

The relative position of the deflecting reflectors with respect to the lenses are set so as to separate the output of the reflectors 518 from the specular reflection of the light source 529 at the plane surfaces of the device. Advantageously, such an element could be used with a number of different panel pixel pitches.

The device may be configured with the switchable rotator 538 and birefringent lenses 138 replaced with fixed focus lenses. In this case, the pitch of the reflectors will not need to be based on the vertical pitch of the pixels of the panel to avoid Moire.

Advantageously, the additional element may be assembled as a separate element to the display, reducing assembly time and thus display cost. Of particular advantage, such an element could be used with a number of different panel designs which will serve to reduce inventory and to reduce non recurring engineering costs.

Figure 51A:
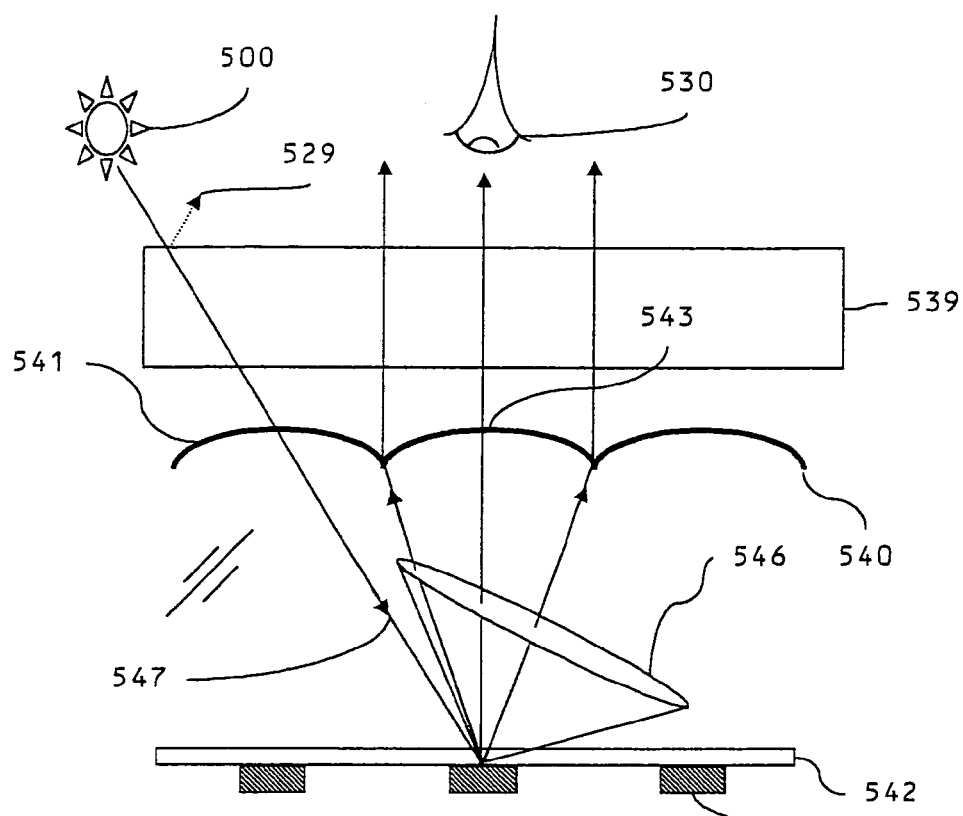
FIG. 51a shows the operation of the deflective reflector to image the first optical aperture to the second optical aperture.

FIG. 51a shows further the action of the deflecting reflector of the invention. The lens array 540 is arranged to image the ambient light source 500 through a display panel 539 comprising image data pixels. The light is imaged by a first lens aperture 541 and is focussed on to the deflecting reflective element which may comprise for example a diffuser 542 and a patterned plane reflector 544. The reflected light distribution from the reflector for the single input ray 547 is shown for example by the cone 546.

Thus light from the deflecting reflector 542,544 is directed to a second lens aperture 543. The second lens aperture may be a separate lens or may be part of the same lens. At the second lens aperture, light from the deflecting reflector is substantially collimated and directed towards an observer 530.

Figure 51B:
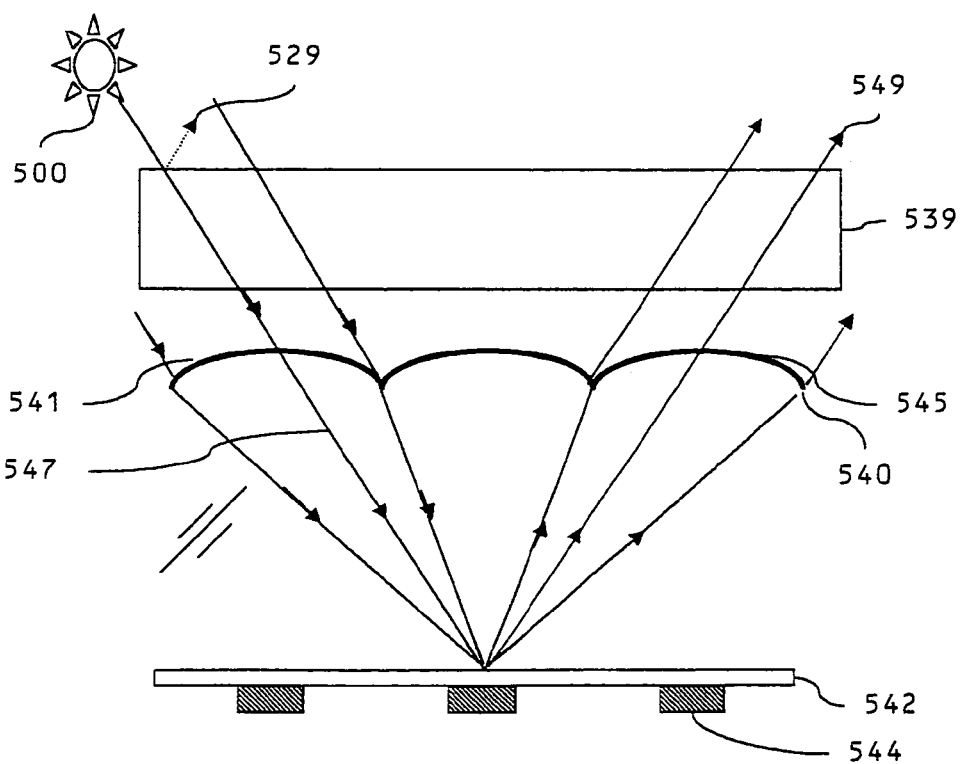
FIG. 51b shows the operation of a planar surface substantially at the plane of the deflective reflector to image the first optical aperture to a third optical aperture.

FIG. 51b shows the action of a plane reflector compared to a deflecting reflector of the invention. The lens at the aperture 541 focusses the light from the light source 500 on to the reflecting plane. A plane reflector, for example as could be formed due to plane Fresnel reflections at the boundary of the diffuser 54 with the lens substrate will reflect ray 547 to ray 549, and the associated light input light cone will be collimated by the lens at aperture 545. However, the direction of the output ray 549 from the plane reflector will be parallel to the direction of the specular reflection 529 from other plane surfaces of the system for example as marked. Therefore, without the action of the deflecting reflector, the system will direct light in the specular direction. Therefore, the required modulated light will be added to the specular reflection and the contrast of the image will be reduced. Additionally, in the orthogonal (out of page) direction, there will not be any directionality imposed on the light cone by the reflector, and thus the range of illumination in this direction will be limited. The deflecting reflector thus serves to increase the viewing freedom of the display in the direction parallel to the geometric lens axes of the cylindrical microlenses.

Alternatively, lenses with optical power in the second direction can be used to increase the viewing freedom of the display.

Figure 51C:
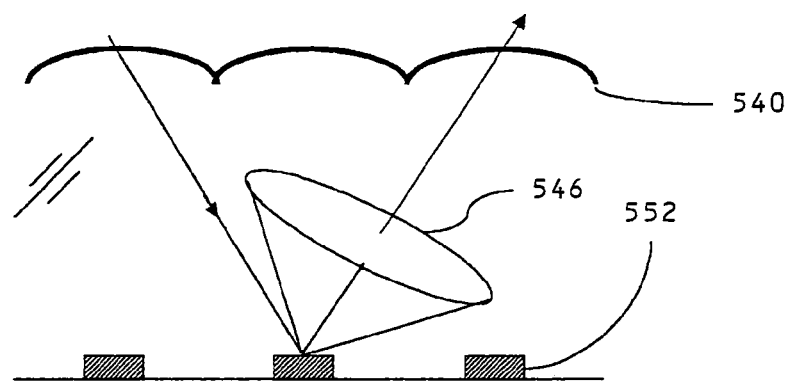
FIG. 51c shows an alternative deflecting reflector.

FIG. 51c shows the use of a patterned deflecting reflector such as formed by a rough surface with a patterned metallised structure 552. Alternatively, the surface of the deflecting reflector could have the form of at least one fine pitch microlens array. The deflecting reflector may be formed from holographic elements either individually or in combination with refractive optical components.

Figure 51D:
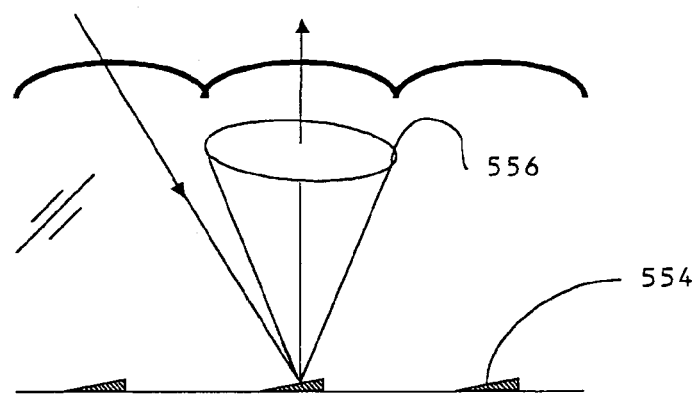
FIG. 51d shows an apparatus in which the deflecting reflector comprises tilted diffusing reflective surfaces so as to direct the incident light beam to the required collection aperture of the output lens array.

FIG. 51d shows an alternative configuration in which the deflecting reflectors are formed on a patterned metallised tilted surface 554 so as to direct the light cone to the observer and away from the direction of the specular reflection of plane surfaces in the remainder of the display. Such a configuration would advantageously increase the display brightness by reducing the size of the output diffused cone 556 required in order to fill the necessary lens aperture. In general it would be expected that the light source would be positioned above the display with respect to the user position, so the orientation of the deflection can be matched to meet the user geometry. The patterned deflecting reflectors 554 can also be made up of arrays of microprisms in each patterned area to advantageously reduce the height of the prisms and ease the manufacturing tolerances.

The reflector element 544 may be configured as a patterned layer of polarisation sensitive reflective film such as DBEF™ from 3M Corporation.

Figure 52:
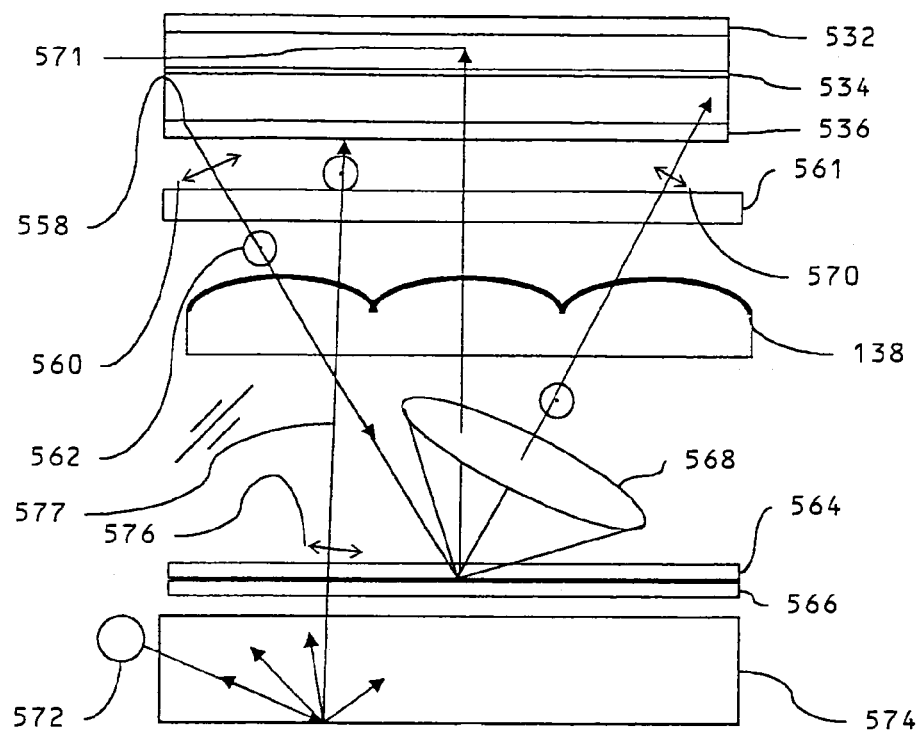
FIG. 52 shows the first mode of operation of an enhanced brightness reflective display in which a birefringent lens is used in cooperation with a polarisation modifying element.

FIG. 52 shows an embodiment of the invention in which a transmissive spatial light modulator comprising a front polariser 532, a phase modulating pixel layer 534 and a rear polariser 536 is illuminated by an ambient light source (not shown). Incident light rays 558 are modulated by the transmissive display 532,534,536 and polarised with a polarisation direction 560. In a first mode of operation, a switchable polarisation rotator 561 is arranged to rotate the polarisation direction 560 such that the polarisation state 562 is parallel to the extraordinary index of an array of passive birefringent lenses 138. The lenses thus have a focussing action, and serve to substantially produce an image of the light source at the plane of a reflecting element comprising a diffuser 564 and a sheet of polarisation sensitive reflecting film 566. The film 566 may be for example DBEF™ from 3M corporation. The light that is reflected from the film 566 is diffused in to a cone 568 such that some light is directed away from the specular reflection direction. The polarised reflected light is collimated by the lenses 138 and transmitted through the polarisation rotator 561 such that the polarisation state 570 is parallel to the transmission direction of the rear display polariser 536. The light will then be directed towards the observer along for example the ray 571.

A transflective display system will also comprise a light source 572 and a light pipe 574. A light ray 577 from the source 572 will be polarised with a polarisation direction 576 by the film 566 and will be incident on the rear polariser 536 of the display orthogonal to its transmission direction and will thus be absorbed.

Figure 53:
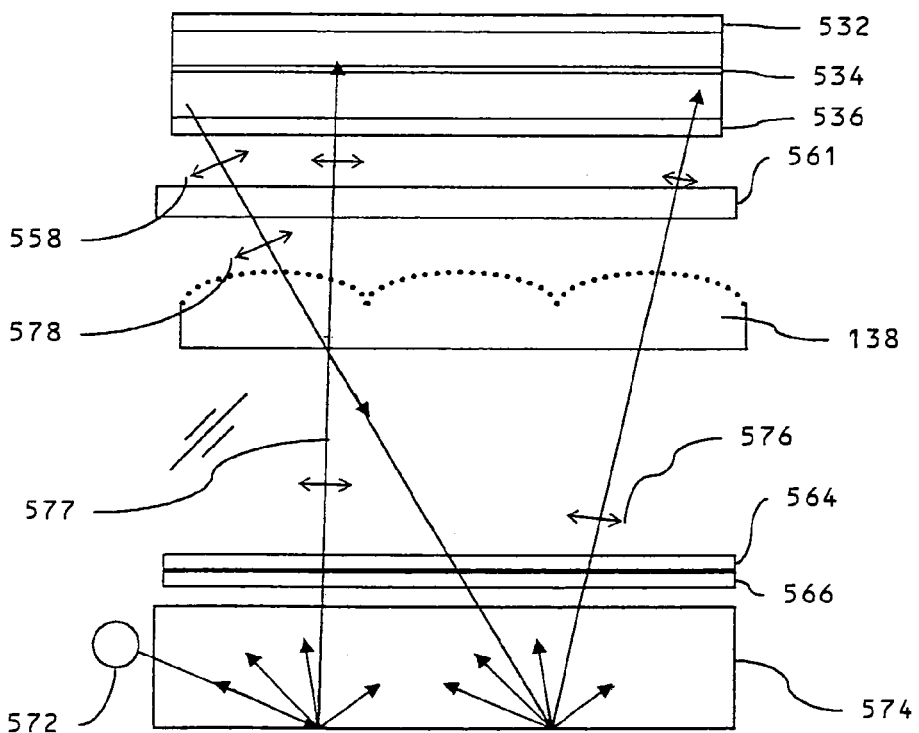
FIG. 53 shows the second mode of operation of the display of FIG. 52.

The second mode of operation is described in FIG. 53. The switchable polarisation rotator 561 is configured such that the output polarisation state 578 is parallel to the ordinary index of the birefringent lens 138 and will thus be transmitted with substantially no focussing action. The light passes through the diffuser 564 and polarisation reflecting film 566 where it is incident on the light pipe 574. The light is reflected by the light pipe and transmitted with a polarisation state back to the rear polariser of the display 536 where it is transmitted to an observer.

A light ray 577 from the light source 572 is directed by the light pipe 574 through the film 566 towards the display where it is transmitted by the-polariser 536.

In this way a switchable high brightness reflective mode display can be configured. Advantageously, the reflecting element may be a continuous layer rather than a patterned layer, which reduces the cost of fabrication and alignment of a patterned reflecting layer.

In order to reduce the thickness of the system, the switchable polarisation rotator 561 may be positioned between the lens 138 and the reflector 566. The polarisation rotator may be an electronic polarisation rotator switch such as a phase modulating liquid crystal layer.

Figure 54:
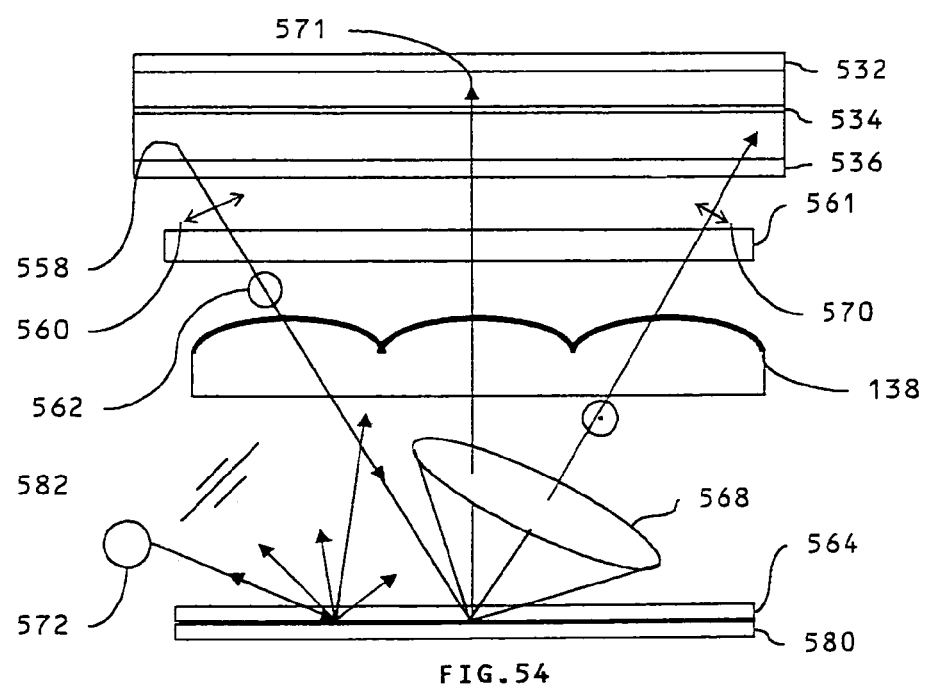
FIG. 54 shows an alternative backlight configuration for an enhanced brightness reflective display.

In the configuration of FIG. 52 in which the display is in the enhanced brightness mode, the light from the backlight is extinguished at the input polariser of the display. It is possible to additionally use the backlight for this mode as shown in FIG. 54. The polarised light from the polariser 536 is incident on a switchable polarisation rotator 561. The polarisation state is rotated through 90 degrees and is incident on the extraordinary index of the birefringent microlens 138. The light then is focussed on to the reflector comprising a diffuser 564 and mirror element 580. The light is then reflected in a cone back towards the lens array, where it is re-collimated and directed towards the viewing zone of the display through the panel 536, 534, 532 along light ray 571 for example A light ray 582 from the backlight light source 572 is reflected from the diffuse reflector 564, 580 and passes through the lens array 138 and polarisation rotator 561. The light is then incident on the polariser 536 where one linear polarisation state is transmitted. The display operates in a second mode with substantially unmodified directional distribution by switching of the switchable polarisation rotator 561 as described previously. As in all the previous embodiments the switchable polarisation rotator 561 and lens 138 may be replaced by an electronically switchable lens or fixed focal length lens.

Fibre-Optic Switching System

Figure 47:
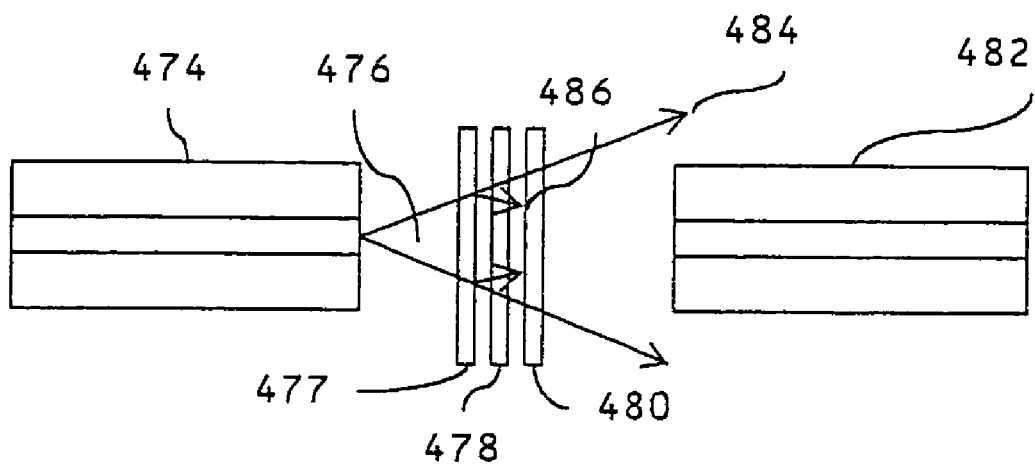
FIG. 47 shows a fibre optic switching system in a first mode of operation for distributing light substantially away from the input aperture of an optical fibre.

In another embodiment of the invention, a light direction switching apparatus of this invention may be used as a fibre-optic switching element, configured for example as shown in FIG. 47. An optical fibre 474 outputs a cone of light 476 which is incident on a light direction switching apparatus. In this example the light direction switching apparatus comprises a birefringent microlens 478 with a birefringent optical axis at 0 degrees, followed by a half waveplate switch 478 with an optical axis at 90 degrees and a polariser 480 with a transmission axis at 90 degrees. An output optical fibre 482 is positioned at the focus of the birefringent microlens 478. FIG. 47 shows the OFF configuration, in which the light cone 484 from the output of the polariser 480 diverges away from the optical acceptance cone of the output fibre 482.

The illumination from the input fibre is incident on the birefringent microlenses. The unpolarised output light is resolved in to two polarisations. One polarisation state is imaged by the microlens to an output optical fibre. The light is incident on an aligned half waveplate and thus unrotated, following which it is absorbed by a polariser. Therefore, the focussed light does not reach the output optical fibre.

Figure 48:
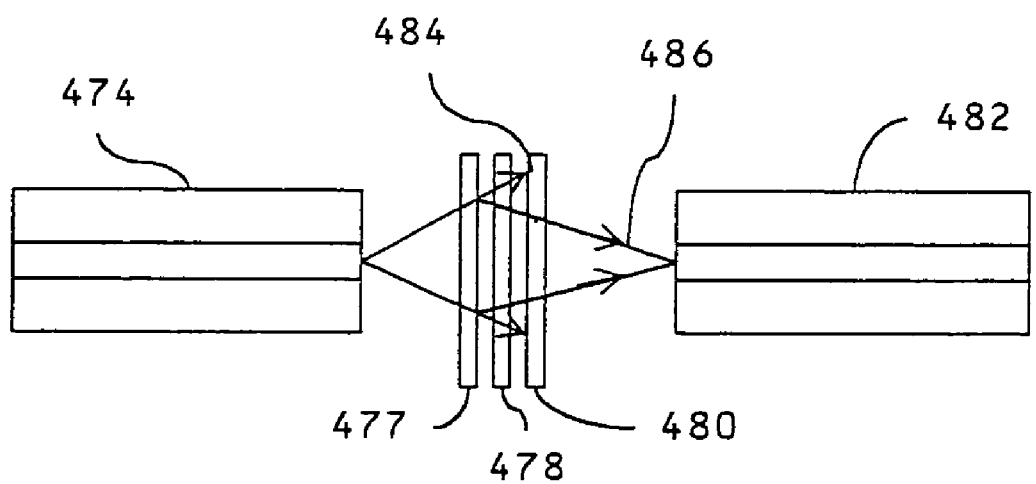
FIG. 48 shows a second mode of operation of the fibre optic switching system of FIG. 47 in which the light is directed towards the aperture of an output optical fibre.

FIG. 48 shows the configuration of the device in the ON state. The polarisation state of the light from the birefringent lens 478 is rotated through 90 degrees and so the light cone 486 that is focussed on the output fibre 482 is transmitted through the output polariser 480 and in to the acceptance cone of the output fibre.

In the orthogonal polarisation state, the index matching of the lens means that there is no focussing, and the light substantially misses the aperture of the optical fibre element.

When the waveplate is switched to rotate the output polarisation states, the light that is focussed meets the output aperture of the optical fibre while the light that is diverging is absorbed.

Thus the system is capable of switching the output of an optical fibre. Such a system has reduced number of components compared to conventional optical fibre switches, and is bi-directional.

It will be appreciated that the embodiments described above are merely exemplary; and that the present invention may be embodied in any apparatus, device, system or arrangement or the like in order to switch light between different directional distributions.

For example, the embodiments described in this invention generally refer to one of the first or second modes in which the output directional distribution is substantially the same as the input directional distribution. This can be achieved for example by setting the ordinary refractive index of the birefringent material to be substantially the same as the index of the isotropic material used to form the microstructured surface. Within the scope of this invention, both the first and second modes may be configured such that the input directional distribution is modified. This may be achieved, for example, by setting both the extraordinary and ordinary refractive indices of the birefringent material to be different from the refractive index of the adjacent material, for example the isotropic material used to form the microstructured surface or air if no isotropic material is provided. The first and second output directional distributions are then different to each other and different to the input directional distribution.

The invention claimed is:

1. A light direction switching apparatus for use in a directional display apparatus, comprising the following elements suitable for arrangement in series with a spatial light modulator:

a switchable polariser being switchable between a first polarisation mode that passes light of a first polarisation component and a second polarisation mode that passes light of a second polarisation component; and an array of birefringent microlenses of a birefringence such that in operation the array of birefringent microlenses directs light of the first polarisation component substantially into a first directional distribution and light of the second polarisation component substantially into a second directional distribution different from the first directional distribution;

the switchable polariser and the array of birefringent microlenses being positioned in series and arranged such that, when arranged in series with a spatial light modulator, light output by the light direction switching apparatus is substantially of the first polarisation component and is substantially directed into the first directional distribution when the switchable polariser is set to the first polarisation mode, whereas light output by the light direction switching apparatus is substantially of the second polarisation component and is substantially directed into the second directional distribution when the polariser is set to the second polarisation mode.

2. A light direction switching apparatus according to claim 1, arranged such that input light passes through the array of birefringent microlenses before the switchable polariser.

3. A light direction switching apparatus according to claim 1, arranged such that input light passes through the switchable polariser before the array of birefringent microlenses.

4. A light direction switching apparatus according claim 1, wherein the birefringence of the array of birefringent microlenses is arranged such that for one of the first or second polarisation components the array of birefringent microlenses has substantially no optical effect such that the corresponding first or second directional distribution is substantially the same as an input directional distribution.

5. A light direction switching apparatus according to claim 1, wherein the switchable polariser is mechanically switchable between the first and second polarisation modes.

6. A light direction switching apparatus according to claim 5, wherein the switchable polariser comprises a first polariser for the first polarisation mode and a second polariser for the second polarisation mode, and the device is adapted such that the first and second polariser may be interchanged by a user of the apparatus to provide the switching of the polarisation modes.

7. A light direction switching apparatus according to claim 5, wherein the apparatus is adapted such that the switchable polariser is switchable between the first and second polarisation modes by being positioned with a first rotational alignment in a position and plane relative to the array of birefringent microlenses to provide the first polarisation mode and being positioned with a second rotational alignment in the same position and plane relative to the array of birefringent microlenses to provide the second polarisation mode.

8. A light direction switching apparatus according to claim 7, wherein the switchable polariser is a linear polariser and the second rotational alignment is substantially at 90 degrees to the first rotational alignment in the major plane of the switchable polariser.

9. A light direction switching apparatus according to claim 7, wherein the switchable polariser is arranged such that the second rotational alignment is achieved by rotating the switchable polariser 180 degrees from the first rotational alignment about an axis lying in the major plane of the switchable polariser.

10. A light direction switching apparatus according to claim 9, wherein the switchable polariser comprises a linear polariser in series with a 90 degree polarisation rotator, such that, in the first rotational alignment, light passing through the apparatus passes through the linear polariser before the 90 degree polarisation rotator thereby providing the first polarisation mode, whereas, in the second rotational alignment, light passing through the apparatus passes through the 90 degree polarisation rotator before the linear polariser thereby providing the second polarisation mode.

11. A light direction switching apparatus according to claim 1, wherein the switchable polariser is electrically switchable between the first and second polarisation modes.

12. A light direction switching apparatus according to claim 11, wherein the electrically switchable polariser comprises a fixed linear polariser and a switchable waveplate or switchable polarisation rotator.

13. A light direction switching apparatus according to claim 11, wherein the electrically switchable polariser is segmented such that segments may be selectively switched between the first and second polarisation modes.

14. A light direction switching apparatus according to claim 13, wherein the electrically switchable polariser comprises segment electrodes with gaps therebetween, and a polarisation modulating material of the electrically switchable polariser is aligned a same way in the gaps as the segments, for one of the first and second polarisation modes.

15. A light direction switching apparatus according to claim 13, wherein the electrically switchable polariser comprises electrode segments with gaps therebetween, and the gaps are sufficiently small that fringing fields switch a polarisation modulating material in the gaps.

16. A light direction switching apparatus according to claim 15, wherein the polarisation modulating material has a sharp threshold between switched states.

17. A light direction switching apparatus according to claim 1, wherein the microlenses are cylindrical such that the array of birefringent microlenses constitutes a lenticular screen.

18. A light direction switching apparatus according to claim 1, wherein the array of birefringent microlenses comprises a lens substrate, a planar substrate and a birefringent material sandwiched between the lens substrate and the planar substrate; and the refractive index and/or dispersion of the material of the lens substrate are respectively substantially the same as at least one refractive indicia and/or the dispersion of the birefringent material.

19. A light direction switching apparatus according to claim 1, wherein the array of birefringent microlenses comprises birefringent material aligned by an aligning means.

20. A light direction switching apparatus according to claim 19, wherein the aligning means is provided by one or more of the following processes:
   (i) an alignment layer;
   (ii) an electric field;
   (iii) a magnetic field.

21. A light direction switching apparatus according to claim 19, wherein the aligning means comprises at least one alignment layer provided by one or more of the following:
   (i) a rubbed polyimide layer;
   (ii) a photo-alignment layer;
   (iii) a micro-grooved surface.

22. A light direction switching apparatus according to claim 1, wherein a birefringent material of the array of birefringent microlenses comprises a liquid crystal.

23. A light direction switching apparatus according to claim 22, wherein the liquid crystal comprised by the array of birefringent microlenses comprises a cured polymer network.

24. A light direction switching apparatus according to claim 1, wherein only light of one of the first or second polarisation components forms a real image substantially in a window plane.

25. A light direction switching apparatus according to claim 1, wherein the light direction switching apparatus is adapted for switching a planar image, and the switchable polariser is arranged to be uniformly switched over the area of the planar image to either the first polarisation mode or the second polarisation mode.

26. A light direction switching apparatus according to claim 1, wherein the array of birefringent microlenses comprises a lens substrate, a planar substrate and a liquid crystal layer sandwiched between the lens substrate and the planar substrate; the liquid crystal layer being aligned with a relative twist between the alignment of the liquid crystal at the lens substrate and the alignment of the liquid crystal at the planar substrate.

27. A light direction switching apparatus according to claim 26, wherein the microlenses are cylindrical such that the array of birefringent microlenses constitutes a lenticular screen, and the liquid crystal at the lens substrate is aligned substantially parallel with the geometric microlens axis of the cylindrical microlenses.

28. A display apparatus switchable between a two dimensional mode and a three dimensional autostereoscopic mode, comprising a light direction switching apparatus according to claim 1 for switching between the two dimensional mode and the three dimensional mode.

29. A multi-user display system, comprising a light direction switching apparatus according to claim 1 for switching between a first and a second display mode arranged such that, in the first display mode different images are displayed to different viewers at different viewing windows formed by the first directional distribution, and in the second display mode a same image is displayed to the different viewers.

30. A multi-user display system according to claim 29, further comprising a sensor for sensing a position or movement of a given user so that the display system is controllable so that the given user is prevented from viewing an image in a viewing window not intended for use by the given user.

31. A multi-user display system according to claim 29, adapted for use in a vehicle such that in the first display mode different images are displayed to a driver of the vehicle compared to a passenger.

32. A multi-user display system according to claim 29, adapted for use in a traffic control display system such that in the first display mode different images are displayed to drivers in different traffic lanes.

33. A multi-user display system according to claim 29, adapted for use in a traffic control display system such that in the first display mode different images are displayed to drivers at different distances from the traffic control display system.

34. A transflective display device comprising a brightness enhancer comprising a light direction switching apparatus according to claim 1 for switching between a first brightness mode and a second brightness mode, arranged such that in the first brightness mode external light is directed according to the first directional distribution to reflective portions of pixels of the transflective display device.

35. A reflective display device comprising a brightness enhancer comprising a light direction switching apparatus according to claim 1 for switching between a first brightness mode and a second brightness mode, arranged such that in the first brightness mode external light is directed according to the first directional distribution to pixels of the reflective display device.

36. Use of a light direction switching apparatus according to claim 1 to switchably provide plural directional distributions of light in any of the following group of devices:
(i) a display apparatus switchable between a two dimensional mode and a three dimensional autostereoscopic mode;
(ii) a multi-user display system;
(iii) a transflective display device in which the light direction switching apparatus provides switchable brightness enhancement; or
(iv) a reflective display device in which the light direction switching apparatus provides switchable brightness enhancement.

37. A method of directionally switching light in a directional display apparatus, comprising:
inputting light from a spatial light modulator to a light direction switching apparatus comprising a switchable polariser and an array of birefringent microlenses positioned in series; and
switching the switchable polariser between a first polarisation mode that passes light of a first polarisation component and a second polarisation mode that passes light of a second polarisation component such that light is output by the light direction switching apparatus with a first directional distribution when the switchable polariser is set to the first polarisation mode and with a second directional distribution when the switchable polariser is set to the second polarisation mode, the second directional distribution being different to the first directional distribution.

38. A method according to claim 37, wherein the step of inputting light to the light direction switching apparatus is performed such that the light passes through the array of birefringent microlenses before the switchable polariser.

39. A method according to claim 37, wherein the step of inputting light to the light direction switching apparatus is performed such that input light passes through the switchable polariser before the array of birefringent microlenses.

40. A method according to claim 37, further comprising arranging the birefringence of the array of birefringent microlenses such that for one of the first or second polarisation components the birefringent lens has substantially no optical effect such that the corresponding first or second directional distribution is substantially the same as an input directional distribution.

41. A method according to claim 37, wherein the switchable polariser is mechanically switched between the first and second polarisation modes.

42. A method according to claim 41, wherein the switchable polariser comprises a first polariser for the first polarisation mode and a second polariser for the second polarisation mode, and the step of switching the switchable polariser between the first and second polarisation modes comprises interchanging the first and second polarisers.

43. A method according to claim 41, wherein the step of switching the switchable polariser between the first and second polarisation modes comprises positioning the switchable polariser with a first rotational alignment in a position and plane relative to the array of birefringent microlenses to provide the first polarisation mode and positioning the switchable polariser with a second rotational alignment in the same position and plane relative to the array of birefringent microlenses to provide the second polarisation mode.

44. A method according to claim 43, wherein the switchable polariser is a linear polariser and the second rotational alignment is substantially at 90 degrees to the first rotational alignment in the major plane of the switchable polariser.

45. A method according to claim 43, wherein the switchable polariser is arranged such that the second rotational alignment is achieved by rotating the switchable polariser 180 degrees from the first rotational alignment about an axis lying in the major plane of the switchable polariser.

46. A method according to claim 45, wherein the switchable polariser comprises a linear polariser in series with a 90 degree polarisation rotator, such that, in the first rotational alignment, light passing through the apparatus passes through the linear polariser before the 90 degree polarisation rotator thereby providing the first polarisation mode, whereas, in the second rotational alignment, light passing through the apparatus passes through the 90 degree polarisation rotator before the linear polariser thereby providing the second polarisation mode.

47. A method according to claim 37, wherein the switchable polariser is electrically switched between the first and second polarisation modes.

48. A method according to claim 47, wherein the electrically switchable polariser comprises a fixed linear polariser and a switchable waveplate or switchable polarisation rotator.

49. A method according to claim 47, wherein the electrically switchable polariser is segmented, and the method further comprises selectively switching segments between the first and second polarisation modes.

50. A method according to claim 37, comprising switching the switchable polariser such that only light of one of the first or second potarisation components forms a real image substantially in a window plane.

51. A method according to claim 37, wherein the light being directionally switched comprises a planar image; and the step of switching the switchable polariser comprises uniformly switching the switchable polariser over the area of the planar image.

52. A directional display apparatus, comprising:
a spatial light modulator comprising an array of pixels;
an array of birefringent microlenses aligned with the array of pixels;
a switchable polariser being switchable between a first polarisation mode that passes light of a first polarisation component and a second polarisation mode that passes light of a second polarisation component;
the birefringent microlenses being of a birefringence such that in operation the birefringent microlenses direct light of the first polarisation component substantially into a first directional distribution and light of the second polarisation component substantially into a second directional distribution different from the first directional distribution;
the array of pixels, the array of birefringent microlenses and the switchable polariser being positioned in series and arranged such that, in operation, light output from the spatial light modulator is directed by the birefringent microlenses and selectively passed by the switchable polariser to provide directionally modulated output light from the directional display apparatus, the directionally modulated output light being output with a first directional distribution when the switchable polariser is set to the first polarisation mode and with a second directional distribution, different to the first directional distribution, when the switchable polariser is set to the second polarisation mode.

53. A directional display apparatus according to claim 52, wherein the spatial light modulator comprises an output analysing polariser such that the light output from the spatial light modulator is substantially linearly polarised with a first linear polarisation direction.

54. A directional display apparatus according to claim 53, wherein
the birefringence of the microlenses is arranged such that the birefringent optical axis of each of the microlenses is substantially at 45 degrees to the first linear polarisation direction; and
the switchable polariser is arranged such that the first polarisation component is substantially parallel with the birefringent optical axis of each of the microlenses and the second polarisation component is substantially at 90 degrees to the birefringent optical axis of each of the microlenses;
whereby the first directional distribution comprises a distribution substantially provided by the lens function of the birefringent microlenses whereas the second directional distribution comprises a distribution provided substantially without any lens function of the birefringent microlenses.

55. A directional display apparatus according to claim 52, wherein the spatial light modulator provides a phase modulated output and the switchable polariser is arranged to provide output polarisation analysis of the phase modulated output in addition to providing switching between the first and second polarisation modes.

56. A directional display apparatus according to claim 55, comprising a liquid crystal display comprising a pixel array formed between a first and a second liquid crystal display substrate; an input polariser being provided on an outer surface of the first liquid crystal display substrate; the array of birefringent microlenses being provided between an outer surface of the second liquid crystal display substrate and the switchable polariser.

57. A directional display apparatus according to claim 55, wherein the spatial light modulator is a liquid crystal device and the directional display apparatus is arranged to provide a normally black mode for the first or second directional distribution; further comprising greyscale correction means for different display colours in the normally black mode.

58. A directional display apparatus according to claim 55, wherein the spatial light modulator is a liquid crystal device, and the directional display apparatus is arranged to provide a normally white mode for the first directional distribution and for the second directional distribution.

59. A directional display apparatus according to claim 58, wherein the normally white mode for both the first and second directional distributions is provided by a switchable 90 degree polarisation rotator provided between an input polariser of the spatial light modulator and the pixel array of the spatial light modulator.

60. A directional display apparatus according to claim 52, wherein the pixel array comprises a reflector substantially in the pixel plane such as to provide a reflective or transflective directional display apparatus.

61. A directional display apparatus according to claim 60, arranged such that one or more external light sources are focussed by the array of birefringent microlenses to form an image substantially at the pixel plane reflector for one of the directional distributions.

62. A directional display apparatus according to claim 61, arranged to operate as a reflective directional display apparatus, further arranged to provide:

a standard brightness mode, in which no imaging by the birefringent microlenses of external light sources takes place; and
an enhanced brightness mode in which external light sources are imaged on to the pixels.

63. A directional display apparatus according to claim 61, arranged to operate as a transflective directional display apparatus, further arranged to provide: a standard brightness mode, in which substantially no imaging by the birefringent microlenses of external light sources takes place and substantially no imaging by the birefringent microlenses of transmissive portions of the pixel takes place; and an enhanced brightness mode, in which external light sources are imaged on to the reflective portions of the pixels or transmissive portions of the pixels are imaged with a modified directional distribution.

64. A directional display apparatus according to claim 52, further comprising a sweet-spot indicator.

65. A directional display apparatus according to claim 64, wherein the sweet-spot indicator and a display area are separate from each other and are arranged to receive input light from a common backlight arrangement.

66. A directional display apparatus according to claim 64, wherein the sweet-spot indicator comprises a further microlens array and a mask aligned so as to obscure light from alternate microlenses of the further microlens array.

67. A directional display apparatus according to claim 64, wherein the sweet-spot indicator uses the array of birefringent microlenses and further comprises a mask for shielding alternate microlenses of the array.

68. A directional display apparatus according to claim 52, arranged such that input light passes through the array of birefringent microlenses before the switchable polariser.

69. A directional display apparatus according to claim 52, arranged such that input light passes through the switchable polariser before the array of birefringent microlenses.

70. A directional display apparatus according to claim 52, wherein the birefringence of the birefringent microlenses is arranged such that for one of the first or second polarisation components the birefringent microlenses have substantially no optical effect such that the corresponding first or second directional distribution is substantially the same as an input directional distribution.

71. A directional display switching apparatus according to claim 52, wherein the switchable polariser is mechanically switchable between the first and second polarisation modes.

72. A directional display apparatus according to claim 71, wherein the switchable polariser comprises a first polariser for the first polarisation mode and a second polariser for the second polarisation mode, and the device is adapted such that the first and second polariser may be interchanged by a user of the apparatus to provide the switching of the polarisation modes.

73. A directional display apparatus according to claim 71, wherein the apparatus is adapted such that the switchable polariser is switchable between the first and second polarisation modes by being positioned with a first rotational alignment in a position and plane relative to the birefringent microlenses to provide the first polarisation mode and being positioned with a second rotational alignment in the same position and plane relative to the birefringent microlenses to provide the second polarisation mode.

74. A directional display apparatus according to claim 73, wherein the switchable polariser is a linear polariser and the second rotational alignment is substantially at 90 degrees to the first rotational alignment in the major plane of the switchable polariser.

75. A directional display apparatus according to claim 73, wherein the switchable polariser is arranged such that the second rotational alignment is achieved by rotating the switchable polariser 180 degrees from the first rotational alignment about an axis lying in the major plane of the switchable polariser.

76. A directional display apparatus according to claim 75, wherein the switchable polariser comprises a linear polariser in series with a 90 degree polarisation rotator, such that, in the first rotational alignment, light passing through the apparatus passes through the linear polariser before the 90 degree polarisation rotator thereby providing the first polarisation mode, whereas, in the second rotational alignment, light passing through the apparatus passes through the 90 degree polarisation rotator before the linear polariser thereby providing the second polarisation mode.

77. A directional display apparatus according to claim 52, wherein the switchable polariser is electrically switchable between the first and second polarisation modes.

78. A directional display apparatus according to claim 77, wherein the electrically switchable polariser comprises a fixed linear polariser and a switchable waveplate or switchable polarisation rotator.

79. A directional display apparatus according to claim 77, wherein the electrically switchable polariser is segmented such that segments may be selectively switched between the first and second polarisation modes.

80. A directional display apparatus according to claim 79, wherein the electrically switchable polariser comprises segment electrodes with gaps therebetween, and a polarisation modulating material of the electrically switchable polariser is aligned a same way in the gaps as the segments for one of the first and second polarisation modes.

81. A directional display apparatus according to claim 79, wherein the electrically switchable polariser comprises electrode segments with gaps therebetween, and the gaps are sufficiently small that fringing fields switch a polarisation modulating material in the gaps.

82. A directional display apparatus according to claim 81, wherein the polarisation modulating material has a sharp threshold between switched states.

83. A directional display apparatus according to claim 52, wherein the microlenses are cylindrical such that the array of birefringent microlenses is a lenticular screen.

84. A directional display apparatus according to claim 52, wherein the array of array of birefringent microlenses comprises a lens substrate, a planar substrate and a birefringent material sandwiched between the lens substrate and the planar substrate; and the refractive index and/or dispersion of the material of the lens substrate are respectively substantially the same as at least one refractive indicia and/or the dispersion of the birefringent material.

85. A directional display apparatus according to claim 52, wherein the birefringent microlenses comprise birefringent material aligned by an aligning means.

86. A directional display apparatus according to claim 85, wherein the aligning means is provided by one or more of the following processes:
(i) use of an alignment layer;
(ii) use of an electric field;
(iii) use of a magnetic field.

87. A directional display apparatus according to claim 85, wherein the aligning means comprises at least one alignment layer provided by one or more of the following:
(i) a rubbed polyimide layer;
(ii) a photo-alignment layer;
(iii) a micro-grooved surface.

88. A directional display apparatus according to claim 52, wherein a birefringent material of the birefringent microlenses comprises a liquid crystal.

89. A directional display apparatus according to claim 88, wherein the liquid crystal comprised by the birefringent microlenses comprises a cured polymer network.

90. A directional display apparatus according to claim 52, arranged such that:
the first directional distribution provides, by virtue of the birefringent microlenses having an optical effect on the light output in the first polarisation mode, output light forming plural viewing windows in a viewing plane, with light from a first group of the pixels being in one viewing window and light from a second group of pixels being in another viewing window, the second group of pixels comprising the remaining pixels, such that different images may be provided in the different viewing windows by forming different images using the first group of pixels and the second plurality of pixels respectively; and
the second directional distributions provides, by virtue of the birefringent microlenses having no optical effect on the light output in the second polarisation mode, no separate viewing windows.

91. A directional display apparatus according to claim 90, wherein the viewing windows in the viewing plane are arranged such that different images may be provided to different eyes of a viewer, thereby providing an autostereoscopic 3D image, in the first polarisation mode, thereby providing an apparatus switchable between a 2D mode and an autostereoscopic 3D mode.

92. A directional display apparatus according to claim 90, wherein the viewing windows in the viewing plane are arranged such that different images may be provided to different viewers in the first polarisation mode; thereby providing an apparatus switchable between a mode showing different images to different users and a mode showing a same image to different users.

93. A directional display apparatus according to claim 92, further comprising a sensor for sensing a position or movement of a given user so that the display system is controllable so that the given user is prevented from viewing an image in a viewing window not intended for use by the given user.

94. A directional display apparatus according to claim 92, adapted for use in a vehicle such that, in the mode showing different images to different users, different images are displayed to a driver of the vehicle compared to a passenger.

95. A directional display apparatus according to claim 92, adapted for use in a traffic control display system such that, in the mode showing different images to different users, different images are displayed to drivers in different traffic lanes.

96. A directional display apparatus according to claim 92, adapted for use in a traffic control display system such that, in the mode showing different images to different users, different images are displayed to drivers at different distances from the traffic control display system.

97. A directional display apparatus according to claim 52, wherein only light of one of the first or second polarisation components forms a real image substantially in a window plane.

98. A directional display apparatus according to claim 52, wherein the switchable polariser is arranged to be uniformly switched in an area corresponding to two or more of the pixels.

99. A directional display apparatus according to claim 52, wherein the array of birefringent microlenses comprises a lens substrate, a planar substrate and a liquid crystal layer sandwiched between the lens substrate and the planar substrate; the liquid crystal layer being aligned with a relative twist between the alignment of the liquid crystal at the lens substrate and the alignment of the liquid crystal at the planar substrate.

100. A directional display apparatus according to claim 99, wherein the relative twist is such as to align the output polarisation of the spatial light modulator with the alignment of the liquid crystal at the planar substrate.

101. A directional display apparatus according to claim 99, wherein the microlenses are cylindrical such that the array of microlenses is a lenticular screen, and the liquid crystal at the lens substrate is aligned substantially parallel with the geometric microlens axis of the cylindrical microlenses.

102. A direct view reflective optical display apparatus, comprising:
   an array of lenses capable of forming an array of images of an external light source in an image plane;
   reflector means provided substantially in said image plane to reflect said array of images, the reflector means and the array of lenses being arranged such that said array of images are reflected by said reflector means through the array of lenses to direct the light of each image into substantially the same directional distribution; and
   an image display apparatus having an array of pixels arranged to modulate the light of the reflected images,
   wherein the reflector means is a light-deflecting reflector such that each respective finite portion of the image is reflected through a lens aperture different from the lens aperture to which the lens aperture forming the respective finite portion of the image would be imaged by a planar reflector extending along the image plane.

103. A reflective optical display apparatus according to claim 102, wherein the reflector means and the array of lenses are arranged such that each respective finite portion of the image is reflected through a different lens aperture from the lens aperture forming the respective finite portion of the image.

104. A reflective optical display apparatus according to claim 102, wherein the light-deflecting reflector means comprises:
   a planar reflector; and
   a diffuser adjacent the reflector.

105. A reflective optical display apparatus according to claim 102, wherein the light-deflecting reflector means comprises a reflector providing diffuse reflection.

106. A reflective optical display apparatus according to claim 102, wherein the light-deflecting reflector means is a hologram.

107. A reflective optical display apparatus according to claim 102, wherein the light-deflecting reflector means has an angled reflection surface in respect of each image extending at an angle to the image plane.

108. A reflective optical display apparatus according to claim 102, wherein the reflector means comprises an array of separated reflectors each for reflecting a respective said image.

109. A reflective optical display apparatus according to claim 108, wherein the array of separated reflectors are at substantially the same pitch as the array of lenses.

110. A reflective optical display apparatus according to claim 108, wherein the array of separated reflectors are arranged at substantially the same pitch as the pixels of the image display.

111. A reflective optical display apparatus according to claim 108, wherein the array of separated reflectors are arranged at a pitch substantially equal to the pitch of the pixels of the image display divided by an integer greater than one.

112. A reflective optical display apparatus according to claim 102, wherein the reflector means constitutes at least a portion of respective pixels of the image display apparatus.

113. A reflective optical display apparatus according to claim 102, wherein the array of lenses and the reflector means are positioned behind the image display apparatus relative to a predetermined viewing direction.

114. A reflective optical display apparatus according to claim 102, wherein relative to a predetermined viewing direction, the array of lenses is positioned in front of the image display apparatus and the reflector means is positioned behind the image display apparatus.

115. A reflective optical display apparatus according to claim 102, wherein the lenses of the array are cylindrical.

116. A reflective optical display apparatus according to claim 115, wherein the lenses extend in a horizontal direction relative to a predetermined viewing orientation of the display.

117. A reflective optical display apparatus according to claim 102, wherein the image display apparatus is one of:
   a transmissive display operable in a reflective mode;
   a reflective display; or
   a transflective display.

118. A reflective optical display apparatus according to claim 102, wherein the lenses are passive lenses.

119. A reflective optical display apparatus according to claim 102, wherein the optical display apparatus is arranged to allow switching between a first mode in which the array of lenses form an array of images of an external light source in the image plane and a second mode in which the lenses have substantially no optical effect.

120. A reflective optical display apparatus according to claim 119, further comprising a switchable polariser being switchable between a first polarisation mode that passes light of a first polarisation component and a second polarisation mode that passes light of a second polarisation component,
   wherein:
   said array of lenses is an array of birefringent microlenses of a birefringence such that in operation the array of birefringent microlenses directs light of the first polarisation component substantially into a first directional distribution and light of the second polarisation component substantially into a second directional distribution different from the first directional distribution; and
   the switchable polariser and the array of birefringent microlenses are positioned in series with said image display apparatus and arranged such that light output by the reflective optical display apparatus is substantially of the first polarisation component and is substantially directed into the first directional distribution, when the switchable polariser is set to the first polarisation mode, whereas light output by the reflective optical display apparatus is substantially of the second polarisation component and is substantially directed into the second directional distribution when the polariser is set to the second polarisation mode.

121. A reflective optical display apparatus according to claim 119, wherein the lenses are formed of a birefringent material.

122. A reflective optical display apparatus according to claim 121, wherein the reflector means is polarisation sensitive so as predominantly to reflect light polarised in a polarisation direction of the reflector means and to transmit light polarised perpendicular to said polarisation direction, the optical display apparatus further comprising a further reflector means arranged behind the first mentioned reflector means.

123. A reflective optical display apparatus according to claim 122, wherein the polarisation direction of the reflector means is aligned with one of the ordinary axis or the extraordinary axis of the birefringent material of the lenses.

124. A reflective optical display apparatus according to claim 121, wherein disposed over the curved surfaces of the lenses is a layer having a refractive index equal to one of the ordinary refractive index or the extraordinary refractive index of the birefringent material such that the lenses have substantially no optical effect on light polarised in the direction of the corresponding one of the ordinary axis and the extraordinary axis of the birefringent material.

125. A reflective optical display apparatus according to claim 121, further comprising a switchable polariser in series with the array of lenses switchable between a first state in which it passes light polarised in the direction of the ordinary axis of the birefringent material and a second state in which it passes light polarised in the direction of the extraordinary axis of the birefringent material.

126. A reflective optical display apparatus according to claim 122, wherein the lenses are active birefringent lenses.

* * * * *